United States Patent
Hwang et al.

(10) Patent No.: US 11,438,871 B2
(45) Date of Patent: Sep. 6, 2022

(54) METHOD FOR TRANSMITTING AND RECEIVING SIGNAL IN WIRELESS COMMUNICATION SYSTEM AND DEVICE THEREFOR

(71) Applicant: LG ELECTRONICS INC., Seoul (KR)

(72) Inventors: Seunggye Hwang, Seoul (KR); Changhwan Park, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/264,251

(22) PCT Filed: Aug. 9, 2019

(86) PCT No.: PCT/KR2019/010165
§ 371 (c)(1),
(2) Date: Jan. 28, 2021

(87) PCT Pub. No.: WO2020/032746
PCT Pub. Date: Feb. 13, 2020

(65) Prior Publication Data
US 2021/0297987 A1    Sep. 23, 2021

(30) Foreign Application Priority Data

Aug. 9, 2018   (KR) .................. 10-2018-0093426
Sep. 21, 2018  (KR) .................. 10-2018-0114504
(Continued)

(51) Int. Cl.
*H04W 68/02* (2009.01)
*H04J 13/00* (2011.01)
*H04W 52/02* (2009.01)

(52) U.S. Cl.
CPC ......... *H04W 68/02* (2013.01); *H04J 13/0062* (2013.01); *H04W 52/0235* (2013.01)

(58) Field of Classification Search
CPC ............... H04W 68/02; H04W 52/0235; H04J 13/0062; H04L 5/0048; H04L 5/0091; Y02D 30/70
See application file for complete search history.

(56) References Cited

U.S. PATENT DOCUMENTS 11,129,104 B2 *  9/2021  Shrestha ................. H04W 4/70
11,290,957 B2 *  3/2022  Lin ................... H04W 52/0229
(Continued)

FOREIGN PATENT DOCUMENTS

KR          101857580           5/2018
WO      WO-2018175760 A1 *   9/2018    ........ H04W 52/0216
(Continued)

OTHER PUBLICATIONS

PCT International Application No. PCT/KR2019/010165, International Search Report dated Nov. 27, 2019, 18 pages.
(Continued)

*Primary Examiner* — Chi H Pham
*Assistant Examiner* — Vladislav Y Agureyev
(74) *Attorney, Agent, or Firm* — Lee Hong Degerman Kang Waimey

(57) ABSTRACT

The present invention relates to a method for transmitting and receiving a signal in a wireless communication system and a device therefor and, more particularly, the present invention relates to a method and a device therefor which comprise generating at least one wake-up signal (WUS) sequence, attempting to detect at least one WUS on the basis of the generated WUS sequence, and monitoring a paging signal in a paging occasion (PO) associated with at least one WUS if at least one WUS has been detected, wherein the
(Continued)

WUS sequence is generated on the basis of a cyclic shift, a Zadoff-Chu sequence and a complex value associated with a scrambling sequence.

17 Claims, 31 Drawing Sheets

(30) Foreign Application Priority Data

| | | |
|---|---|---|
| Nov. 9, 2018 | (KR) | 10-2018-0137663 |
| Feb. 14, 2019 | (KR) | 10-2019-0017261 |
| May 2, 2019 | (KR) | 10-2019-0051385 |

(56) References Cited

U.S. PATENT DOCUMENTS

| | | | |
|---|---|---|---|
| 2018/0018185 A1 | 1/2018 | Sun et al. | |
| 2018/0279274 A1* | 9/2018 | Sun | H04L 1/1864 |
| 2019/0090193 A1* | 3/2019 | Liu | H04W 52/028 |
| 2019/0103950 A1* | 4/2019 | Liu | H04L 5/0053 |
| 2019/0159128 A1* | 5/2019 | Lin | H04L 5/0048 |
| 2019/0200296 A1* | 6/2019 | Liu | H04W 52/0235 |
| 2019/0239189 A1* | 8/2019 | Hwang | H04W 52/0216 |
| 2019/0254110 A1* | 8/2019 | He | H04W 76/28 |
| 2020/0029302 A1* | 1/2020 | Cox | H04W 52/0235 |
| 2020/0077338 A1* | 3/2020 | Sui | H04W 52/0229 |
| 2020/0196242 A1* | 6/2020 | Höglund | H04W 72/042 |
| 2020/0229095 A1* | 7/2020 | Shrestha | H04W 8/08 |
| 2021/0037469 A1* | 2/2021 | Åström | H04L 1/08 |
| 2021/0045060 A1* | 2/2021 | Sui | H04W 52/0258 |
| 2021/0367707 A1* | 11/2021 | Wu | H04L 5/0048 |

FOREIGN PATENT DOCUMENTS

| | | | | |
|---|---|---|---|---|
| WO | WO-2018202693 A1 * | 11/2018 | | H04W 24/10 |
| WO | WO-2018202751 A * | 11/2018 | | H04W 4/70 |

OTHER PUBLICATIONS

LG Electronics, "Discussion on wake up signal in MTC," 3GPP TSG RAN WG1 Meeting #93, R1-1806587, May 2018, 5 pages.

Huawei, HiSilicon, "Feature lead summary on detailed design of Wake-up signal in NB-IoT," 3GPP TSG RAN WG1 Meeting #93, R1-1807472, May 2018, 10 pages.

Qualcomm, "Summary of 6.2.6.3 Wake-up signal," 3GPP TSG RAN WG1 Meeting #93, R1-1807444, May 2018, 8 pages.

* cited by examiner (a) In-band system (b) Guard-band system (c) Stand-alone system

METHOD FOR TRANSMITTING AND RECEIVING SIGNAL IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2019/010165, filed on Aug. 9, 2019, which claims the benefit of earlier filing date and right of priority to Korean Application Nos. 10-2018-0093426 filed on Aug. 9, 2018, 10-2018-0114504 filed on Sep. 21, 2018, 10-2018-0137663 filed on Nov. 9, 2018, 10-2019-0017261 filed on Feb. 14, 2019 and 10-2019-0051385 filed on May 2, 2019, the contents of which are all hereby incorporated by reference herein in their entirety.

TECHNICAL FIELD

The present disclosure relates to a wireless communication system, and more particularly, to a method for transmitting and receiving a Wake UP Signal (WUS) in a wireless communication system and apparatus therefor.

BACKGROUND ART

Mobile communication systems were developed to provide voice services while ensuring mobility of users. However, mobile communication systems have been extended to data services as well as voice services, and more advanced communication systems are needed as the explosive increase in traffic now leads to resource shortages and users demand higher speed services.

Requirements of the next generation mobile communication systems are to support accommodation of explosive data traffics, dramatic increases in throughputs per user, accommodation of significantly increased number of connected devices, very low end-to-end latency, and high energy efficiency. To this end, various technologies such as Dual Connectivity, Massive Multiple Input Multiple Output (Massive MIMO), In-band Full Duplex, Non-Orthogonal Multiple Access (NOMA), support of Super wideband, and Device Networking are under research.

DETAILED DESCRIPTION OF DISCLOSURE

Technical Task

One technical task of the present disclosure is to provide a method and apparatus for transmitting and receiving a Wake UP Signal (WUS) efficiently.

Specifically, a technical task of the present disclosure is to provide a method and an apparatus for reducing unnecessary paging monitoring operations of WUS capable User Equipments (UEs) by providing a method of designing a WUS for UE sub-grouping.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In a first technical aspect of the present disclosure, provided herein is a method for receiving a signal by a User Equipment (UE) in a wireless communication system, the method including generating at least one Wake Up Signal (WUS) sequence, attempting to detect at least one WUS based on the generated WUS sequence, and monitoring a paging signal in a Paging Occasion (PO) associated with the at least one WUS if the at least on WUS is detected, wherein the WUS sequence may be generated based on a complex value related to a scrambling sequence, a Zadoff-Chu sequence and a cyclic shift.

In a second technical aspect of the present disclosure, provided herein is a User Equipment (UE) configured to receive a signal in a wireless communication system, the UE including a Radio Frequency (RF) transceiver and a processor connected to the RF transceiver operatively, wherein the processor is configured to generate at least one Wake Up Signal (WUS) sequence, attempt to detect at least one WUS based on the generated WUS sequence, and monitor a paging signal in a Paging Occasion (PO) associated with the at least one WUS if the at least on WUS is detected and wherein the WUS sequence may be generated based on a complex value related to a scrambling sequence, a Zadoff-Chu sequence and a cyclic shift.

In a third technical aspect of the present disclosure, provided herein is an apparatus for a User Equipment (UE) in a wireless communication system, the apparatus including a memory including executable codes and a processor operatively connected to the memory, the processor configured to perform specific operations by executing the executable codes, wherein the specific operations include generating at least one Wake Up Signal (WUS) sequence, attempting to detect at least one WUS based on the generated WUS sequence, and monitoring a paging signal in a Paging Occasion (PO) associated with the at least one WUS if the at least on WUS is detected, wherein the WUS sequence may be generated based on a complex value related to a scrambling sequence, a Zadoff-Chu sequence and a cyclic shift.

Preferably, the attempting to detect the at least one WUS may include attempting to detect a first WUS common to all UE groups associated with the PO based on a first WUS sequence in which a cyclic shift value is 0.

Preferably, the attempting to detect the at least one WUS further may include attempting to detect a second WUS common to all UE groups associated with the PO based on a second WUS sequence in which a cyclic shift value is not 0.

Preferably, configuration information for the WUS may be received by the UE and the configuration information may include information indicating a value of a cyclic shift for a UE group to which the UE belongs.

More preferably, the configuration information may be received through Radio Resource Control (RRC) layer signaling.

More preferably, the configuration information may be received through a System Information Block (SIB)

In a fourth technical aspect of the present disclosure, provided herein is a method for transmitting a signal by a Base Station (BS) in a wireless communication system, the method including generating at least one Wake Up Signal (WUS) sequence and transmitting at least one WUS based on the generated WUS sequence, wherein the WUS sequence may be generated based on a complex value related to a scrambling sequence, a Zadoff-Chu sequence and a cyclic shift.

In a fifth technical aspect of the present disclosure, provided herein is a Base Station (BS) configured to transmit a signal in a wireless communication system, the BS including a Radio Frequency (RF) transceiver and a processor connected to the RF transceiver operatively, wherein the processor is configured to generate at least one Wake Up Signal (WUS) sequence and transmit at least one WUS based on the generated WUS sequence and wherein the WUS sequence may be generated based on a complex value related to a scrambling sequence, a Zadoff-Chu sequence and a cyclic shift.

In a sixth technical aspect of the present disclosure, provided herein is an apparatus for a Base Station (BS) in a wireless communication system, the apparatus including a memory including executable codes and a processor operatively connected to the memory, the processor configured to perform specific operations by executing the executable codes, wherein the specific operations include generating at least one Wake Up Signal (WUS) sequence and transmitting at least one WUS based on the generated WUS sequence and wherein the WUS sequence may be generated based on a complex value related to a scrambling sequence, a Zadoff-Chu sequence and a cyclic shift.

Preferably, the transmitting the at least one WUS may include transmitting a first WUS common to all UE groups associated with the PO based on a first WUS sequence in which a cyclic shift value is 0.

More preferably, the first WUS may be transmitted to UEs failing to support a group WUS.

Preferably, the transmitting the at least one WUS may include transmitting a second WUS common to all UE groups associated with the PO based on a second WUS sequence in which a cyclic shift value is not 0.

More preferably, the second WUS may be transmitted to UEs supporting a group WUS.

Preferably, configuration information for the WUS may be transmitted by the BS and the configuration information may include information indicating a value of the cyclic shift.

More preferably, the configuration information may be transmitted through Radio Resource Control (RRC) layer signaling.

More preferably, the configuration information may be transmitted through a System Information Block (SIB).

Advantageous Effects

According to the present disclosure, a Wake UP Signal (WUS) may be transmitted and received efficiently.

Specifically, according to the present disclosure, unnecessary paging monitoring operations of WUS capable UEs may be reduced by a method of designing a WUS for UE sub-grouping.

The effects that can be achieved with the present disclosure are not limited to what has been particularly described hereinabove and other advantages not described herein will be more clearly understood by persons skilled in the art from the following detailed description of the present disclosure.

DESCRIPTION OF DRAWINGS

The accompanying drawings, which are included to provide a further understanding of the disclosure, illustrate embodiments of the disclosure and together with the description serve to explain the principle of the disclosure.

BEST MODE FOR DISCLOSURE

Figure 1:
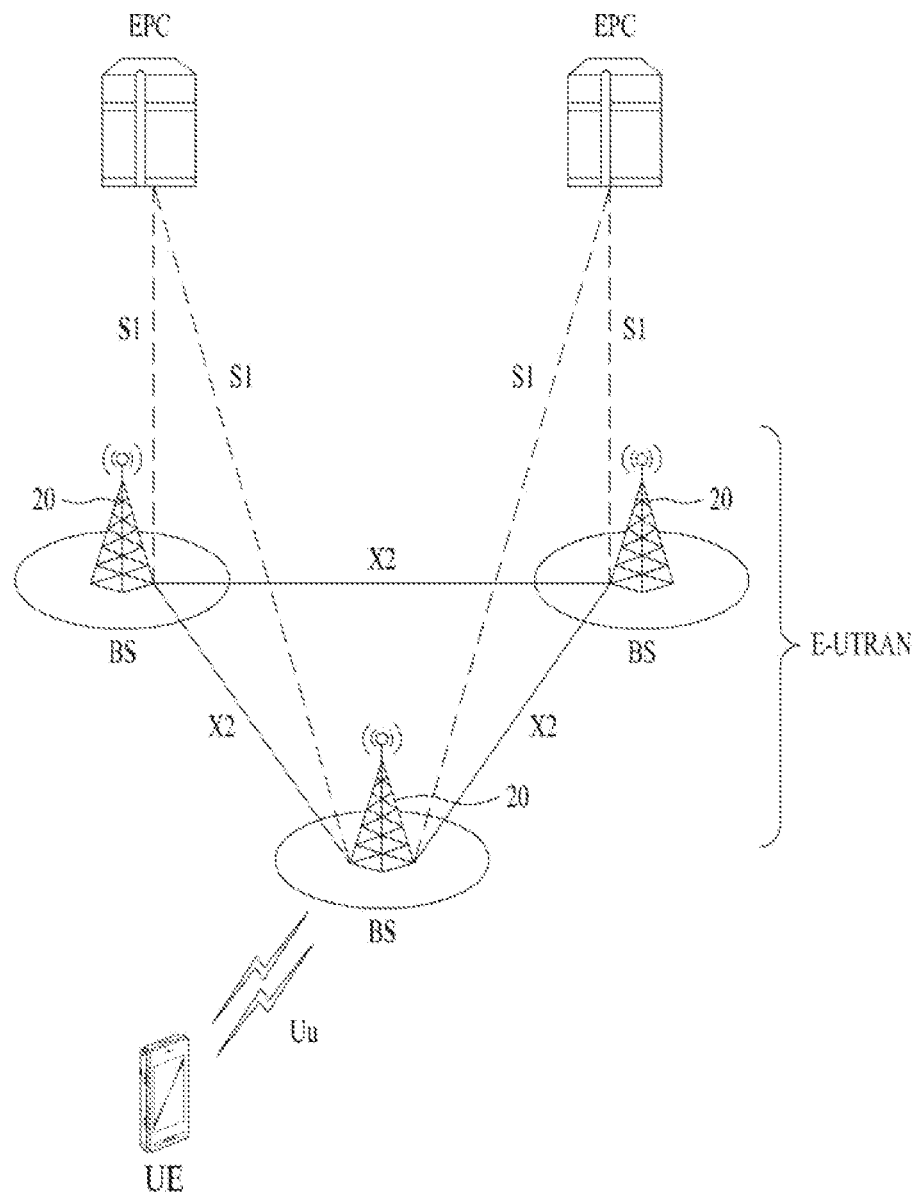
FIG. 1 illustrates an example of the 3GPP LTE system architecture.

In the following, DownLink (DL) refers to communication from a Base Station (BS) to a User Equipment (UE), and UpLink (UL) refers to communication from the UE to the BS. In the case of DL, a transmitter may be a part of the BS, and a receiver may be a part of the UE. In the case of UL, a transmitter may be a part of the UE, and a receiver may be a part of the BS.

The technology described herein is applicable to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented as radio technology such as universal terrestrial radio access (UTRA) or CDMA2000. The TDMA may be implemented as radio technology such as global system for mobile communications (GSM), general packet radio service (GPRS), or enhanced data rates for GSM evolution (EDGE). The OFDMA may be implemented as radio technology such as the Institute of Electrical and Electronics Engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). The 3rd generation partnership project (3GPP) long term evolution (LTE) is a part of an evolved UMTS (E-UMTS) using the E-UTRA. LTE-advance (LTE-A) or LTE-A pro is an evolved version of the 3GPP LTE. 3GPP new radio or new radio access technology (3GPP NR) is an evolved version of the 3GPP LTE, LTE-A, or LTE-A pro.

Although the present disclosure is described based on 3GPP communication systems (e.g., LTE-A, NR, etc.) for clarity of description, the spirit of the present disclosure is not limited thereto. The LTE refers to the technology beyond 3GPP technical specification (TS) 36.xxx Release 8. In particular, the LTE technology beyond 3GPP TS 36.xxx Release 10 is referred to as the LTE-A, and the LTE technology beyond 3GPP TS 36.xxx Release 13 is referred to as the LTE-A pro. The 3GPP NR refers to the technology beyond 3GPP TS 38.xxx Release 15. The LTE/NR may be called '3GPP system'. Herein, "xxx" refers to a standard specification number. The LTE/NR may be commonly referred to as '3GPP system'. Details of the background, terminology, abbreviations, etc. used herein may be found in documents published before the present disclosure. For example, the following documents may be referenced.

3GPP LTE
36.211: Physical channels and modulation
36.212: Multiplexing and channel coding
36.213: Physical layer procedures
36.300: Overall description
36.304: User Equipment (UE) procedures in idle mode
36.331: Radio Resource Control (RRC)

3GPP NR
38.211: Physical channels and modulation
38.212: Multiplexing and channel coding
38.213: Physical layer procedures for control
38.214: Physical layer procedures for data
38.300: NR and NG-RAN Overall Description
38.304: User Equipment (UE) procedures in Idle mode and RRC Inactive state
36.331: Radio Resource Control (RRC) protocol specification A. System Architecture FIG. 1 illustrates an example of the 3GPP LTE system architecture.

A wireless communication system may be referred to as an evolved-UMTS terrestrial radio access network (E-UTRAN) or a long term evolution (LTE)/LTE-A system. Referring to FIG. 1, the E-UTRAN includes at least one BS 20 that provides control and user planes to a UE 10. The UE 10 may be fixed or mobile. The UE 10 may be referred to as another terminology such as 'mobile station (MS)', 'user terminal (UT)', 'subscriber station (SS)', 'mobile terminal (MT)', or 'wireless device'. In general, the BS 20 may be a fixed station that communicates with the UE 10. The BS 20 may be referred to as another terminology such as 'evolved Node-B (eNB)', 'general Node-B (gNB)', 'base transceiver system (BTS)', or 'access point (AP)'. The BSs 20 may be interconnected through an X2 interface. The BS 20 may be connected to an evolved packet core (EPC) through an S1 interface. More particularly, the BS 20 may be connected to a mobility management entity (MME) through S1-MME and to a serving gateway (S-GW) through S1-U. The EPC includes the MME, the S-GW, and a packet data network-gateway (P-GW). Radio interface protocol layers between the UE and network may be classified into Layer 1 (L1), Layer 2 (L2), and Layer 3 (L3) based on three lower layers of the open system interconnection (OSI) model well known in communication systems. A physical (PHY) layer, which belongs to L1, provides an information transfer service over a physical channel. A radio resource control (RRC) layer, which belongs to L3, controls radio resources between the UE and network. To this end, the BS and UE may exchange an RRC message through the RRC layer.

Figure 2:
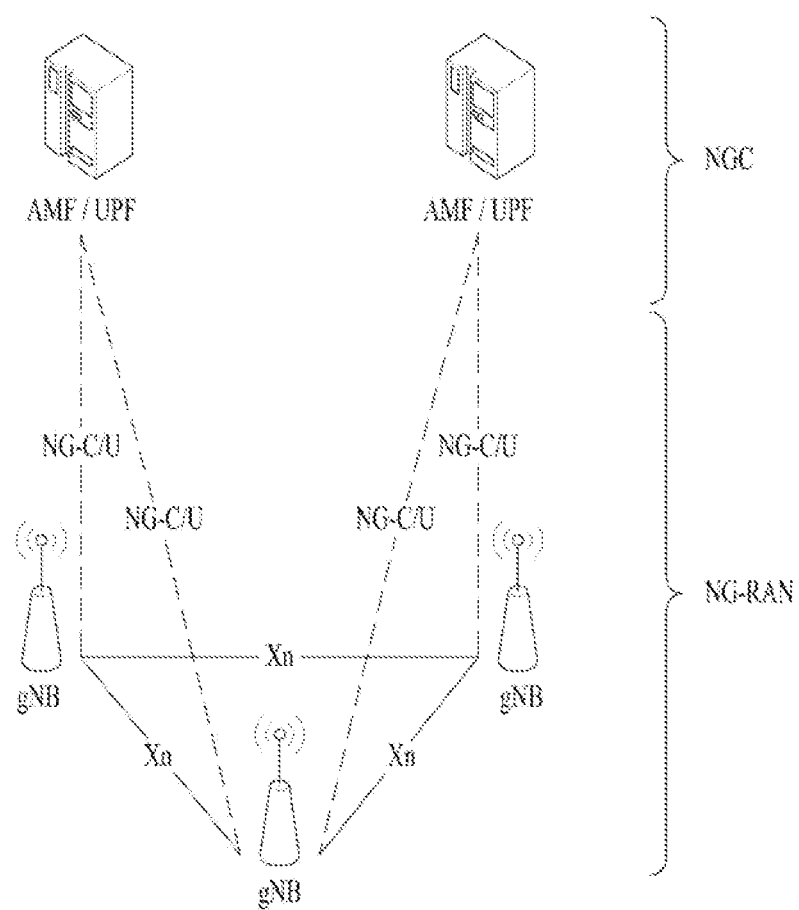
FIG. 2 illustrates an example of the 3GPP NR system architecture.

FIG. 2 illustrates an example of the 3GPP NR system architecture.

Referring to FIG. 2, a NG-RAN includes gNBs, each of which provides a NG-RA user plane (e.g., new AS sublayer/PDCP/RLC/MAC/PHY) and a control plane (RRC) protocol terminal to a UE. The gNBs are interconnected through an Xn interface. The gNB is connected to an NGC through a NG interface. More particularly, the gNB is connected to an access and mobility management function through an N2 interface and to a user plane function (UPF) through an N3 interface.

B. Frame Structure

Hereinafter, an LTE frame structure will be described.

In the LTE standards, the sizes of various fields in the time domain are expressed in a time unit (Ts=1/(15000×2048) seconds) unless specified otherwise. DL and UL transmissions are organized in radio frames, each of which has a duration of 10 ms (Tf=307200×Ts=10 ms). Two radio frame structures are supported.

Type 1 is applicable to frequency division duplex (FDD).
Type 2 is applicable to time division duplex (TDD).

(1) Frame Structure Type 1

Frame structure type 1 is applicable to both full-duplex FDD and half-duplex FDD. Each radio frame has a duration of $T_f=307200 \cdot T_s=10$ ms and is composed of 20 slots, each of which has a length of $T_{slot}=15360 \cdot T_s=0.5$ ms. The 20 slots are indexed from 0 to 19. A subframe is composed of two consecutive slots. That is, subframe i is composed of slot 2i and slot (2i+1). In the FDD, 10 subframes may be used for DL transmission, and 10 subframes may be available for UL transmissions at every interval of 10 ms. DL and UL transmissions are separated in the frequency domain. However, the UE may not perform transmission and reception simultaneously in the half-duplex FDD system.

Figure 3:
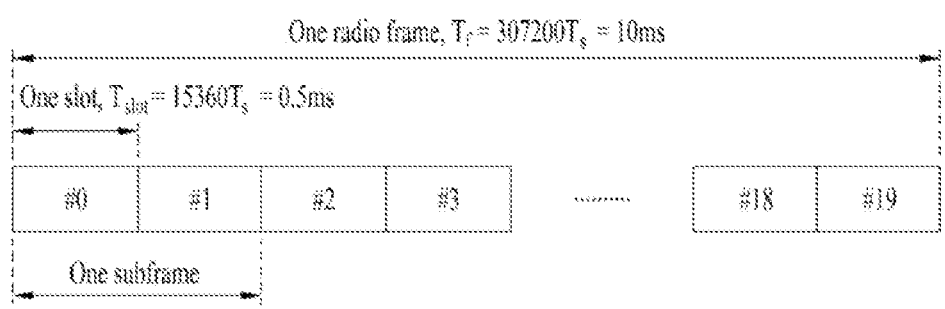
FIG. 3 illustrates a radio frame structure of frame structure type 1

FIG. 3 illustrates a radio frame structure of frame structure type 1.

Referring to FIG. 3, the radio frame includes 10 subframes. Each subframe includes two slots in the time domain. The time to transmit one subframe is defined as a transmission time interval (TTI). For example, one subframe may have a length of 1 ms, and one slot may have a length of 0.5 ms. One slot may include a plurality of orthogonal frequency division multiplexing (OFDM) symbols in the time domain. Since the 3GPP LTE system uses OFDMA in DL, the OFDM symbol may represent one symbol period. The OFDM symbol may be referred to as an SC-FDMA symbol or a symbol period. A resource block (RB) is a resource allocation unit and includes a plurality of consecutive subcarriers in one slot. This radio frame structure is merely exemplary. Therefore, the number of subframes in a radio frame, the number of slots in a subframe, or the number of OFDM symbols in a slot may be changed in various ways.

(2) Frame Structure Type 2

Frame structure type 2 is applicable to TDD. Each radio frame has a length of $T_f=307200 \times T_s=10$ ms and includes two half-frames, each of which has a length of $15360 \cdot T_s=0.5$ ms. Each half-frame includes five subframes, each of which has a length of $30720 \cdot T_s=1$ ms. Supported UL-DL configurations are defined in the standards. In each subframe of a radio frame, "D" denotes a subframe reserved for DL transmission, "U" denotes a subframe reserved for UL transmission, and "S" denotes a special subframe including the following three fields: downlink pilot time slot (DwPTS), guard period (GP), and uplink pilot time slot (UpPTS). The DwPTS may be referred to as a DL period, and the UpPTS may be referred to as a UL period. The lengths of the DwPTS and UpPTS depend on the total length of the DwPTS, GP, and UpPTS, which is equal to $30720 \cdot T_s=1$ ms. Subframe i is composed of two slots, slot 2i and slot (2i+1), each of which has a length of $T_{slot}=15360 \cdot T_s=0.5$ ms.

Figure 4:
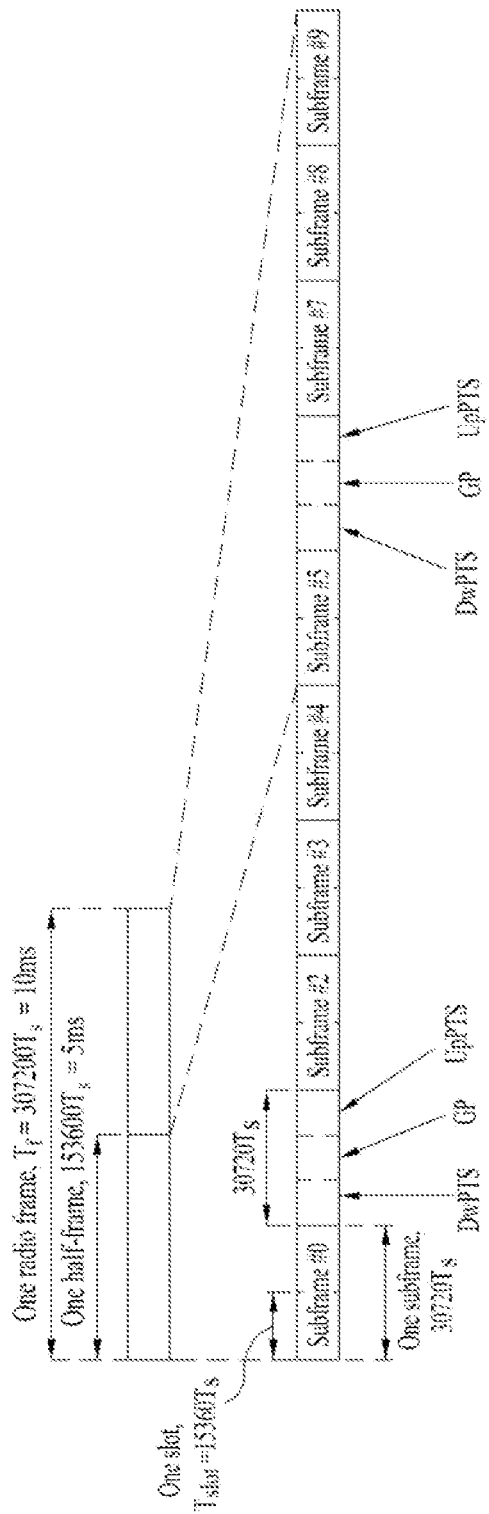
FIG. 4 illustrates a radio frame structure of frame structure type 2.

FIG. 4 illustrates a radio frame structure of frame structure type 2.

FIG. 4 shows that a UL-DL configuration supports DL-to-UL switch-point periodicities of 5 ms and 10 ms. In the case of the 5-ms DL-to-UL switch-point periodicity, the special subframe exists across two half-frames. In the case of the 10-ms DL-to-UL switch-point periodicity, the special subframe exists only in the first half-frame. The DwPTS and subframe 0 and 5 are always reserved for DL transmission, and the UpPTS and a subframe next to the special subframe are always reserved for UL transmission.

Next, a description will be given of a frame structure of NR.

Figure 5:
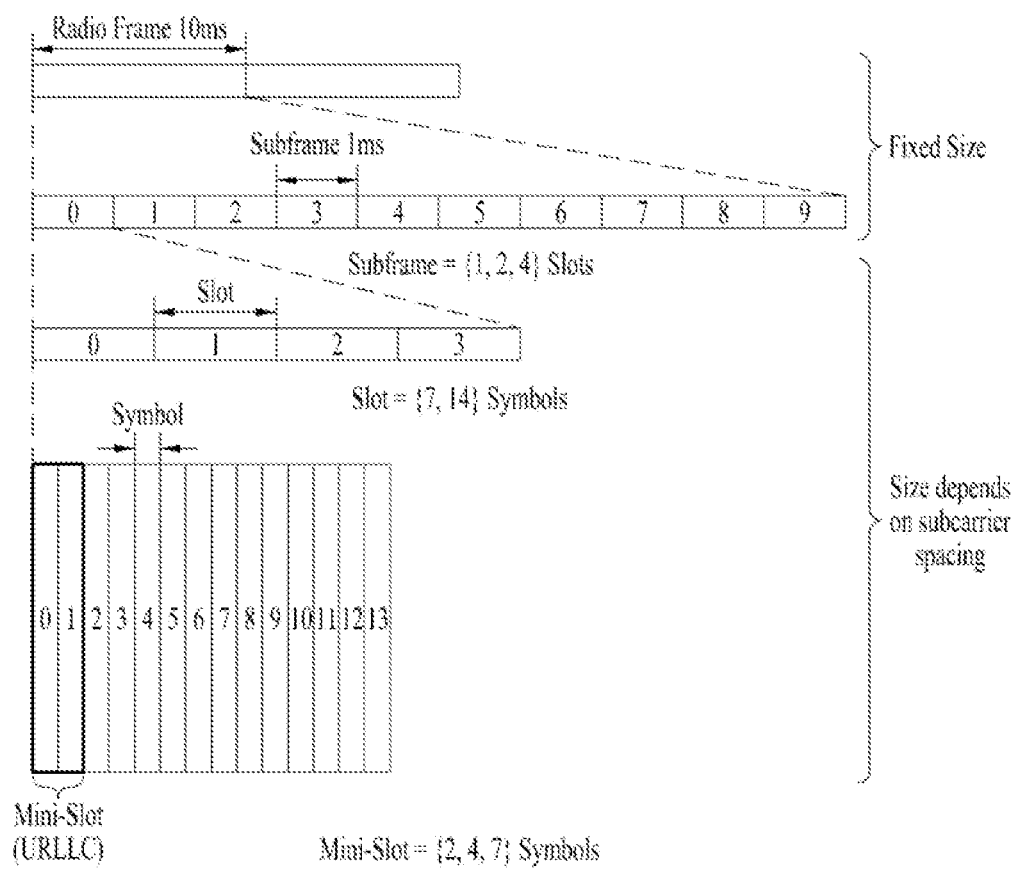
FIG. 5 illustrates an example of a frame structure in NR.

FIG. 5 illustrates an example of a frame structure in NR.

The NR system may support various numerologies. The numerology may be defined by subcarrier spacing and cyclic prefix (CP) overhead. Multiple subcarrier spacing may be derived by scaling basic subcarrier spacing by an integer N (or μ). In addition, even though very low subcarrier spacing is assumed not to be used at a very high subcarrier frequency, a numerology to be used may be selected independently from frequency bands. In the NR system, various frame structures may be supported based on multiple numerologies.

Hereinafter, an OFDM numerology and a frame structure, which may be considered in the NR system, will be described. Table 1 shows multiple OFDM numerologies supported in the NR system.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, the sizes of various fields in the time domain are expressed in multiples of a time unit, $T_s=1/(\Delta f_{max} \cdot N_f)$. In this case, $\Delta f_{max}=480 \cdot 10^3$ and $N_f=4096$. Downlink and uplink transmissions are configured in a radio frame having a duration of $T_f=(\Delta f_{max} N_f/100) \cdot T_s=10$ ms. The radio frame is composed of 10 subframes, each having a duration of $T_{sf}=(\Delta f_{max} N_f/1000) \cdot T_s=1$ ms In this case, there may be a set of uplink frames and a set of downlink frames. Transmission of an uplink frame with frame number i from a UE needs to be performed earlier by $T_{TA}=N_{TA}T_s$ than the start of a corresponding downlink frame of the UE. Regarding the numerology μ, slots are numbered in a subframe in the following ascending order: $n_s^\mu \in \{0, \ldots, N_{subframe}^{slots,\mu}-1\}$ and numbered in a frame in the following ascending order: $n_{s,f}^\mu \in \{0, \ldots, N_{frame}^{slots,\mu}-1\}$. One slot is composed of $N_{symb}^\mu$ consecutive OFDM symbols, and $N_{symb}^\mu$ is determined by the current numerology and slot configuration. The starts of $n_s^\mu$ slots in a subframe are temporally aligned with those of $n_s^\mu N_{symb}^\mu$ OFDM symbols in the same subframe. Some UEs may not perform transmission and reception at the same time, and this means that some OFDM symbols in a downlink slot or an uplink slot are unavailable. Table 2 shows the number of OFDM symbols per slot ($N_{symb}^{slot}$), the number of slots per radio frame ($N_{slot}^{frame,\mu}$), and the number of slots per subframe ($N_{slot}^{frame,\mu}$) in the case of a normal CP, and Table 3 shows the number of OFDM symbols per slot, the number of slots per radio frame, and the number of slots per subframe in the case of an extended CP.

TABLE 2

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 5 shows an example of μ=2, i.e., 60 kHz subcarrier spacing (SCS). Referring to Table 2, one subframe may include four slots. FIG. 5 shows slots in a subframe (subframe={1, 2, 4}). In this case, the number of slots included in the subframe may be defined as shown in Table 2 above.

In addition, a mini-slot may be composed of 2, 4, or 7 symbols. Alternatively, the number of symbols included in the mini-slot may vary.

C. Physical Resource

Figure 6:
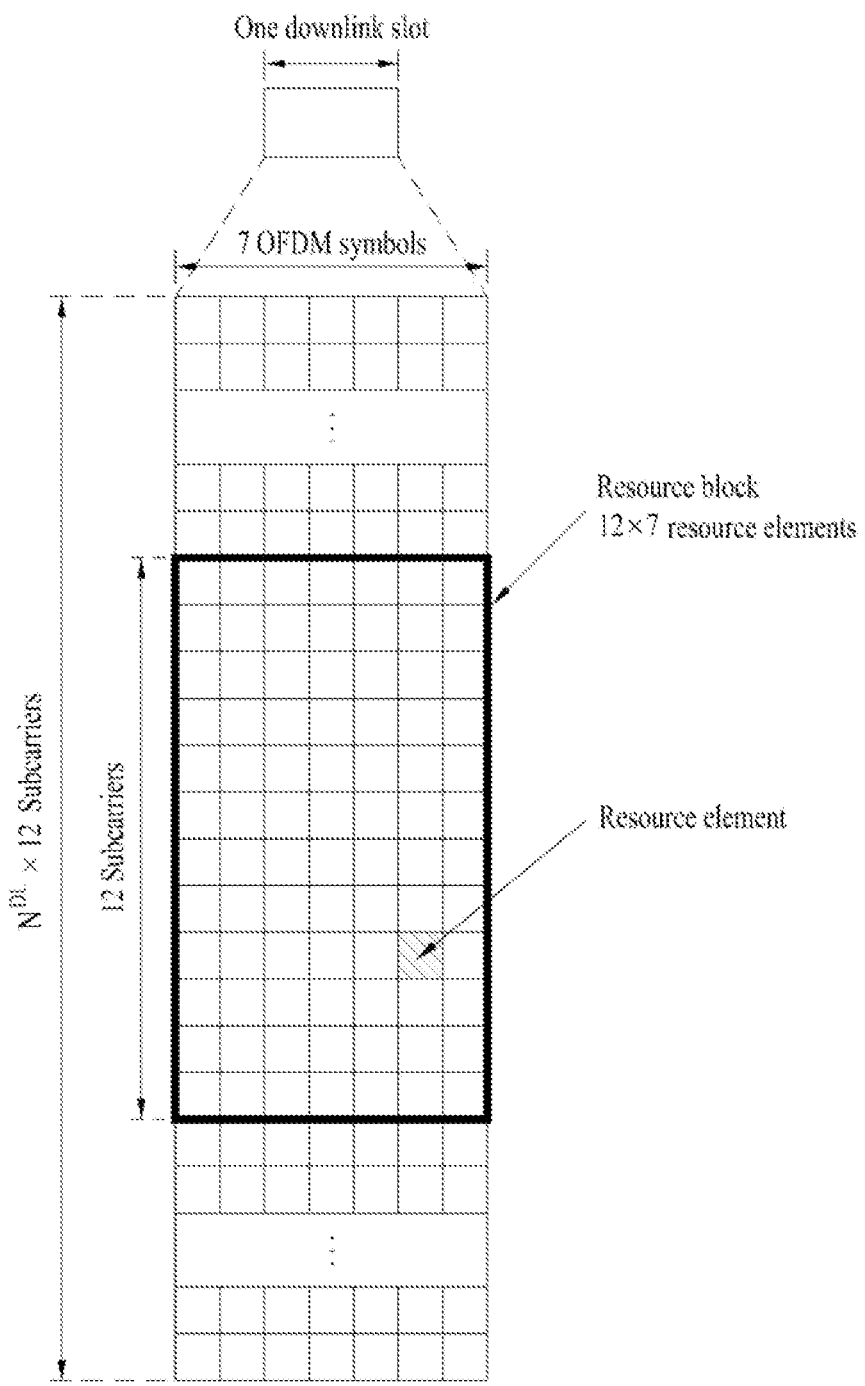
FIG. 6 illustrates a resource grid for one DL slot.

FIG. 6 illustrates a resource grid for one DL slot.

Referring to FIG. 6, a downlink slot includes a plurality of OFDM symbols in the time domain. One downlink slot includes 7 OFDM symbols in the time domain, and a Resource Block (RB) for example includes 12 subcarriers in the frequency domain. However, the present disclosure is not limited thereto. Each element of the resource grid is referred to as a Resource Element (RE). One RB includes 12×7 REs. The number of RBs in the DL slot depends on a downlink transmission bandwidth. An uplink slot may have the same structure as the downlink slot.

Figure 7:
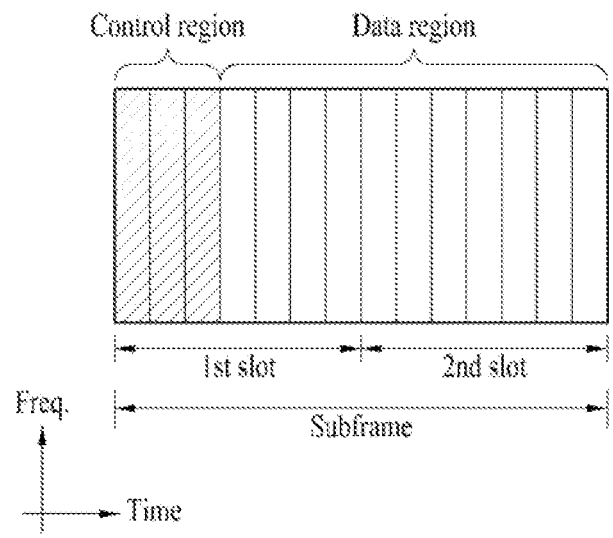
FIG. 7 illustrates the structure of a downlink subframe.

FIG. 7 illustrates the structure of a downlink subframe.

Referring to FIG. 7, up to three OFDM symbols at the start of the first slot in a downlink subframe are used as a control region to which a control channel is allocated. The remaining OFDM symbols are used as a data region to which a physical downlink shared channel (PDSCH) is allocated. Downlink control channels used in the 3GPP LTE system include a physical control format indicator channel (PCFICH), a physical downlink control channel (PDCCH), a physical hybrid ARQ indicator channel (PHICH), etc. The PCFICH is transmitted in the first OFDM symbol in a subframe and carries information for the number of OFDM symbols used for transmitting a control channel. The PHICH carries a hybrid automatic repeat request (HARQ) acknowledgement/negative-acknowledgement or not-acknowledgement (ACK/NACK) signal in response to uplink transmission. Control information transmitted on the PDCCH is referred to as downlink control information (DCI). The DCI contains uplink or downlink scheduling information or an uplink transmission (Tx) power control command for a random UE group. The PDCCH carries information for resource allocation for a downlink shared channel (DL-SCH), information for resource allocation for a uplink shared channel, paging information for a paging channel (PCH), and a DL-SCH voice over Internet protocol (VoIP) corresponding to resource allocation for a higher layer control message such as a random access response transmitted on the PDSCH, a set of Tx power control commands for individual UEs in a random UE group, a Tx power control command, activation of the Tx power control command, etc. Multiple PDCCHs may be transmitted in the control region, and the UE may monitor the multiple PDCCHs. The PDCCH may be transmitted on one control channel element (CCE) or aggregation of multiple consecutive CCEs. The CCE is a logical allocation unit used to provide the PDCCH with a coding rate based on the state of a radio channel. The CCE corresponds to a plurality of resource element groups (REGs). A PDCCH format and the number of available PDCCH bits are determined based on a relationship between the number of CCEs and the coding rate provided by the CCE. The base station determines the PDCCH format depending on DCI to be transmitted to the UE and adds a cyclic redundancy check (CRC) to control information. The CRC is masked with a unique identifier (e.g., radio network temporary identifier (RNTI)) according to the owner or usage of the PDCCH. If the PDCCH is for a specific UE, the CRC may be masked with a unique UE identifier (e.g., cell-RNTI). If the PDCCH is for a paging message, the CRC may be masked with a paging indication identifier (e.g., paging-RNTI (P-RNTI)). If the PDCCH is for system information (more specifically, for a system information block (SIB)), the CRC may be masked with a system information identifier and a system information RNTI (SI-RNTI). Further, the CRC may be masked with a random access-RNTI (RA-RNTI) to indicate a random access response in response to transmission of a random access preamble of the UE.

Figure 8:
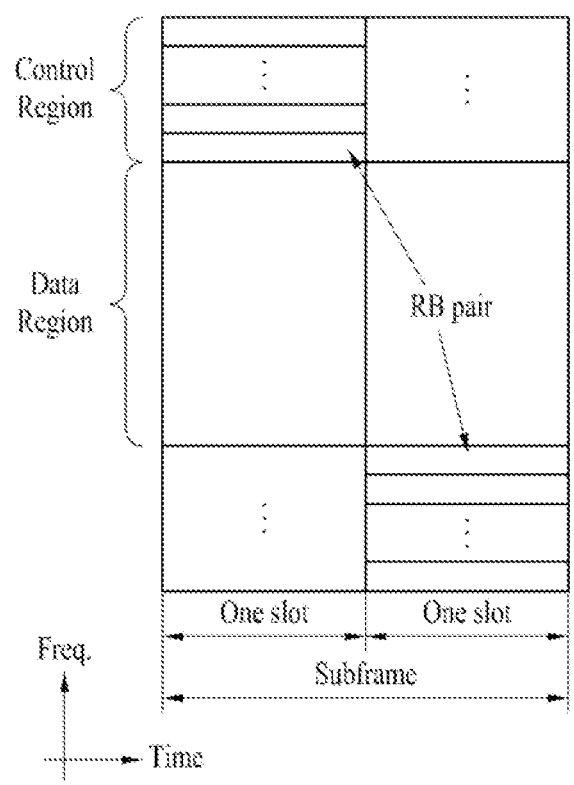
FIG. 8 illustrates the structure of an uplink subframe.

FIG. 8 illustrates the structure of an uplink subframe.

Referring to FIG. 8, an uplink subframe may be divided into a control region and a data region in the frequency domain. A physical uplink control channel (PUCCH) for carrying uplink control information may be allocated to the control region, and a physical uplink shared channel (PUSCH) for carrying user data may be allocated to the data region. The UE may not transmit the PUCCH and the PUSCH at the same time to maintain single-carrier characteristics. The PUCCH for the UE is allocated to an RB pair in a subframe. The RBs included in the RB pair occupy different subcarriers in two slots. In other words, the RB pair allocated for the PUCCH may be frequency-hopped at a slot boundary.

As physical resources in the NR system, an antenna port, a resource grid, a resource element, a resource block, a carrier part, etc. may be considered. Hereinafter, the above physical resources considered in the NR system will be described in detail. First, an antenna port may be defined such that a channel carrying a symbol on the antenna port is inferred from a channel carrying another symbol on the same antenna port. When the large-scale properties of a channel carrying a symbol on an antenna port are inferred from a channel carrying a symbol on another antenna port, the two antenna ports may be said to be in quasi co-located or quasi co-location (QC/QCL) relationship. The large-scale properties may include at least one of delay spread, Doppler spread, frequency shift, average received power, and received timing.

Figure 9:
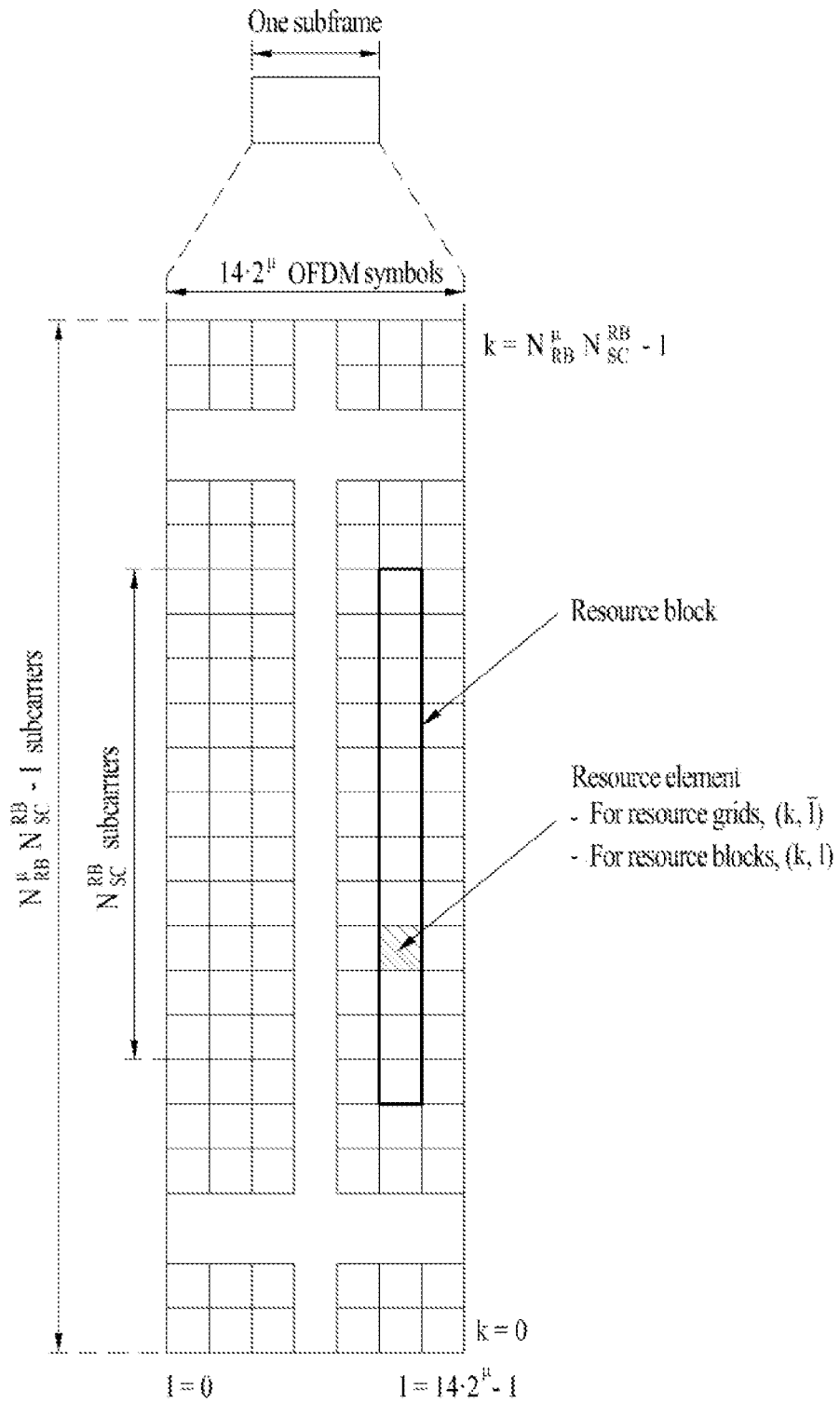
FIG. 9 illustrates an example of a resource grid in NR.

FIG. 9 illustrates an example of a resource grid in NR.

Referring to the resource grid of FIG. 9, there are $N_{RB}^{\mu} N_{sc}^{RB}$ subcarriers in the frequency domain, and there are $14 \cdot 2^{\mu}$ OFDM symbols in one subframe. However, the resource grid is merely exemplary and the present disclosure is not limited thereto. In the NR system, a transmitted signal is described by one or more resource grids, each including $N_{RB}^{\mu} N_{sc}^{RB}$ subcarriers, and $2^{\mu} N_{symb}^{(\mu)}$ OFDM symbols. In this case, $N_{RB}^{\mu} \leq N_{RB}^{max,\mu}$. $N_{RB}^{max,\mu}$ denotes the maximum transmission bandwidth and may change not only between numerologies but also between uplink and downlink. As shown in FIG. 9, one resource grid may be configured for each numerology $\mu$ and antenna port p. Each element of the resource grid for the numerology $\mu$ and antenna port p is referred to as a resource element, and it is uniquely identified by an index pair (k, $\bar{l}$), where k is an index in the frequency domain (k=0, ..., $N_{RB}^{\mu} N_{sc}^{RB}-1$) and $\bar{l}$ denotes the location of a symbol in the subframe ($\bar{l}$=0, ..., $2^{\mu} N_{symb}^{(\mu)}-1$). The resource element (k, $\bar{l}$) for the numerology $\mu$ and antenna port p corresponds to a complex value $a_{k,\bar{l}}^{(p,\mu)}$. When there is no risk of confusion or when a specific antenna port or numerology is not specified, the indexes p and $\mu$ may be dropped, and as a result, the complex value may be $a_{k,\bar{l}}^{(p)}$ or $a_{k,\bar{l}}$. In addition, a resource block (RB) is defined as $N_{sc}^{RB}=12$ consecutive subcarriers in the frequency domain.

Point A serves as a common reference point for resource block grids and may be obtained as follows.

OffsetToPointA for primary cell (PCell) downlink represents a frequency offset between point A and the lowest subcarrier of the lowest resource block in an SS/PBCH block used by the UE for initial cell selection. OffsetToPointA is expressed in the unit of resource block on the assumption of 15 kHz SCS for frequency range 1 (FR1) and 60 kHz SCS for frequency range 2 (FR2).

AbsoluteFrequencyPointA represents the frequency location of point A expressed as in absolute radio-frequency channel number (ARFCN).

Common resource blocks are numbered from 0 upwards in the frequency domain for SCS configuration $\mu$.

The center of subcarrier 0 of common resource block 0 for the SCS configuration $\mu$ is equivalent to point A.

The relation between a common RB number $n_{CRB}^{\mu}$ in the frequency domain and a resource element (k,l) for the SCS configuration $\mu$ is determined as shown in Equation 1.

$$n_{CRB}^{\mu} = \left\lfloor \frac{k}{N_{sc}^{RB}} \right\rfloor \qquad [\text{Equation 1}]$$

In Equation 1, k is defined relative to point A such that k=0 corresponds to a subcarrier centered on point A.

Physical resource blocks are defined within a bandwidth part (BWP) and numbered from 0 to $N_{BWP,i}^{size}-1$, where i denotes the number of the BWP.

The relationship between a physical resource block $n_{PRB}$ and a common resource block $n_{CRB}$ in BWP i is given by Equation 2.

$$n_{CRB} = n_{PRB} + N_{BWP,i}^{start} \quad \text{[Equation 2]}$$

In Equation 2, $N_{BWP,i}^{start}$ is a common resource block where the BWP starts relative to common resource block 0.

Figure 10:
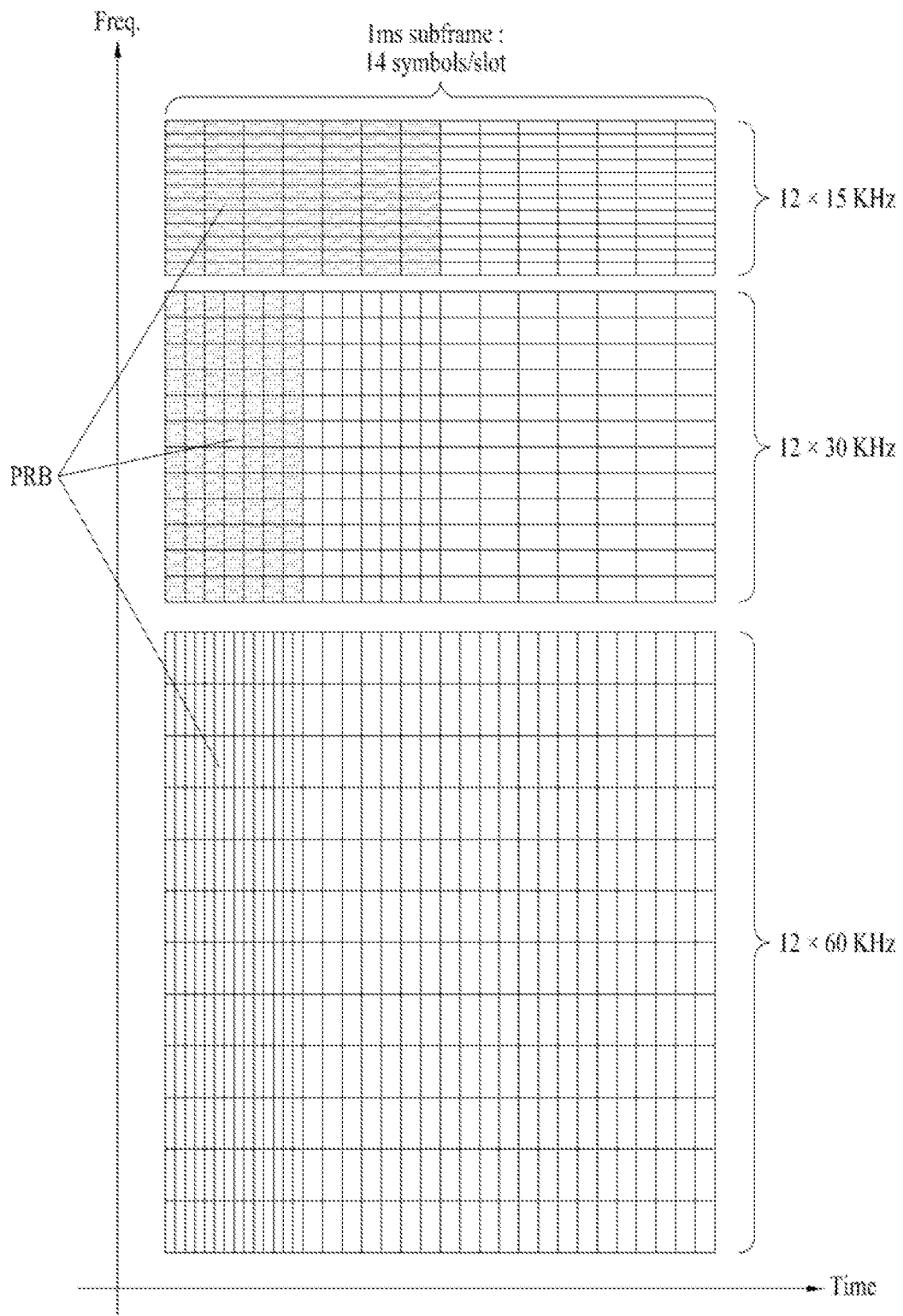
FIG. 10 illustrates an example of a physical resource block in NR.

FIG. 10 illustrates an example of a physical resource block in NR.

D. Wireless Communication Devices

Figure 11:
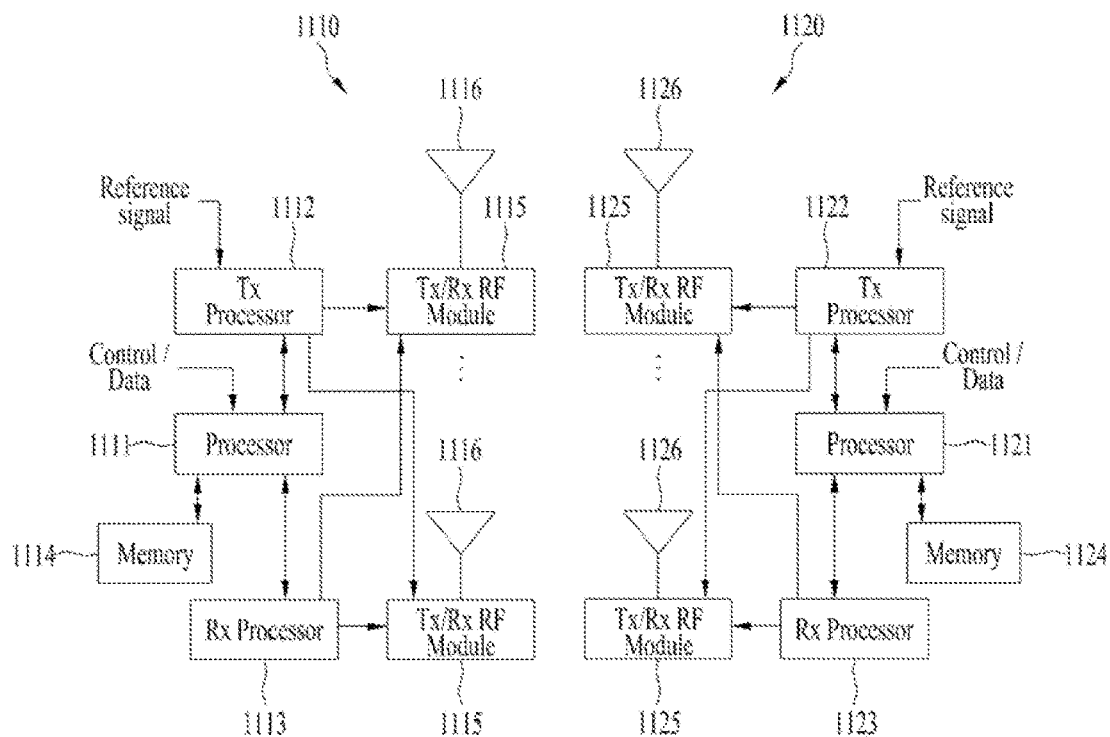
FIG. 11 illustrates a block diagram of a wireless communication apparatus to which the methods proposed in the present disclosure are applicable.

FIG. 11 illustrates a block diagram of a wireless communication apparatus to which the methods proposed in the present disclosure are applicable.

Referring to FIG. 11, a wireless communication system includes a base station 1110 and multiple UEs 1120 located within coverage of the base station 1110. The base station 1110 and the UE may be referred to as a transmitter and a receiver, respectively, and vice versa. The base station 1110 includes a processor 1111, a memory 1114, at least one transmission/reception (Tx/Rx) radio frequency (RF) module (or RF transceiver) 1115, a Tx processor 1112, an Rx processor 1113, and an antenna 1116. The UE 1120 includes a processor 1121, a memory 1124, at least one Tx/Rx RF module (or RF transceiver) 1125, a Tx processor 1122, an Rx processor 1123, and an antenna 1126. The processors are configured to implement the above-described functions, processes and/or methods. Specifically, the processor 1111 provides a higher layer packet from a core network for downlink (DL) transmission (communication from the base station to the UE). The processor implements the functionality of layer 2 (L2). In downlink (DL), the processor provides the UE 1120 with multiplexing between logical and transmission channels and radio resource allocation. That is, the processor is in charge of signaling to the UE. The Tx processor 1112 implements various signal processing functions of layer 1 (L1) (i.e., physical layers). The signal processing functions include facilitating the UE to perform forward error correction (FEC) and performing coding and interleaving. Coded and modulated symbols may be divided into parallel streams. Each stream may be mapped to an OFDM subcarrier, multiplexed with a reference signal (RS) in the time and/or frequency domain, and then combined together using an inverse fast Fourier transform (IFFT) to create a physical channel carrying a time domain OFDMA symbol stream. The OFDM stream is spatially precoded to produce multiple spatial streams. Each spatial stream may be provided to a different antenna 1116 through the Tx/Rx module (or transceiver) 1115. Each Tx/Rx module may modulate an RF carrier with each spatial stream for transmission. At the UE, each Tx/Rx module (or transceiver) 1125 receives a signal through each antenna 1126 thereof. Each Tx/Rx module recovers information modulated on the RF carrier and provides the information to the RX processor 1123. The Rx processor implements various signal processing functions of layer 1. The Rx processor may perform spatial processing on the information to recover any spatial streams toward the UE. If multiple spatial streams are destined for the UE, the multiple spatial streams may be combined by multiple Rx processors into a single OFDMA symbol stream. The RX processor converts the OFDMA symbol stream from the time domain to the frequency domain using a fast Fourier transform (FFT). A frequency-domain signal includes a separate OFDMA symbol stream for each subcarrier of an OFDM signal. The symbols and the reference signal on each subcarrier are recovered and demodulated by determining the most probable signal constellation points transmitted by the base station. Such soft decisions may be based on channel estimation values. The soft decisions are decoded and deinterleaved to recover data and control signals originally transmitted by the base station over the physical channel. The corresponding data and control signals are provided to the processor 1121.

Uplink (UL) transmission (communication from the UE to the base station) is processed by the base station 1110 in a similar way to that described in regard to the receiver functions of the UE 1120. Each Tx/Rx module (or transceiver) 1125 receives a signal through each antenna 1126. Each Tx/Rx module provides an RF carrier and information to the Rx processor 1123. The processor 1121 may be connected to the memory 1124 storing program codes and data. The memory may be referred to as a computer-readable medium.

E. Machine Type Communication (MTC)

The Machine Type Communication (MTC) refers to communication technology adopted by $3^{rd}$ Generation Partnership Project (3GPP) to meet Internet of Things (IoT) service requirements. Since the MTC does not require high throughput, it may be used as an application for machine-to-machine (M2M) and Internet of Things (IoT).

The MTC may be implemented to satisfy the following requirements: (i) low cost and low complexity; (ii) enhanced coverage; and (iii) low power consumption.

The MTC was introduced in 3GPP release 10. Hereinafter, the MTC features added in each 3GPP release will be described.

The MTC load control was introduced in 3GPP releases 10 and 11.

The load control method prevents IoT (or M2M) devices from creating a heavy load on the base station suddenly.

Specifically, according to release 10, when a load occurs, the base station may disconnect connections with IoT devices to control the load. According to release 11, the base station may prevent the UE from attempting to establish a connection by informing the UE that access will become available through broadcasting such as SIB14.

In release 12, the features of low-cost MTC were added, and to this end, UE category 0 was newly defined. The UE category indicates the amount of data that the UE is capable of processing using a communication modem.

Specifically, a UE that belongs to UE category 0 may use a reduced peak data rate, a half-duplex operation with relaxed RF requirements, and a single reception antenna, thereby reducing the baseband and RF complexity of the UE.

In Release 13, enhanced MTC (eMTC) was introduced. In the eMTC, the UE operates in a bandwidth of 1.08 MHz, which is the minimum frequency bandwidth supported by legacy LTE, thereby further reducing the cost and power consumption.

Although the following description relates to the eMTC, the description is equally applicable to the MTC, 5G (or NR) MTC, etc. For convenience of description, all types of MTC are commonly referred to as 'MTC'.

In the following description, the MTC may be referred to as another terminology such as 'eMTC', 'LTE-M1/M2', 'bandwidth reduced low complexity/coverage enhanced (BL/CE)', 'non-BL UE (in enhanced coverage)', 'NR MTC', or 'enhanced BL/CE'. Further, the term "MTC" may be replaced with a term defined in the future 3GPP standards.

1) General Features of MTC (1) The MTC operates only in a specific system bandwidth (or channel bandwidth).

The specific system bandwidth may use 6 RBs of the legacy LTE as shown in Table 4 below and defined by considering the frequency range and subcarrier spacing (SCS) shown in Tables 5 to 7. The specific system bandwidth may be referred to as narrowband (NB). Here, the legacy LTE may encompass the contents described in the 3GPP standards expect the MTC. In the NR, the MTC may use RBs corresponding to the smallest system bandwidth in Tables 6 and 7 as in the legacy LTE. Alternatively, the MTC may operate in at least one BWP or in a specific band of a BWP.

TABLE 4

| Channel bandwidth BWChannel [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Table 5 shows the frequency ranges (FRs) defined for the NR.

TABLE 5

| Frequency range designation | Corresponding frequency range |
|---|---|
| FR1 | 450 MHz-6000 MHz |
| FR2 | 24250 MHz-52600 MHz |

Table 6 shows the maximum transmission bandwidth configuration (NRB) for the channel bandwidth and SCS in NR FR1.

TABLE 6

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

Table 7 shows the maximum transmission bandwidth configuration (NRB) for the channel bandwidth and SCS in NR FR2.

TABLE 7

| SCS (kHz) | 50 MHz NRB | 100 MHz NRB | 200 MHz NRB | 400 MHz NRB |
|---|---|---|---|---|
| 60 | 66 | 132 | 264 | N.A |
| 120 | 32 | 66 | 132 | 264 |

Hereinafter, the MTC narrowband (NB) will be described in detail.

The MTC follows narrowband operation to transmit and receive physical channels and signals, and the maximum channel bandwidth is reduced to 1.08 MHz or 6 (LTE) RBs.

The narrowband may be used as a reference unit for allocating resources to some downlink and uplink channels, and the physical location of each narrowband in the frequency domain may vary depending on the system bandwidth.

The 1.08 MHz bandwidth for the MTC is defined to allow an MTC UE to follow the same cell search and random access procedures as those of the legacy UE.

The MTC may be supported by a cell with a much larger bandwidth (e.g., 10 MHz), but the physical channels and signals transmitted/received in the MTC are always limited to 1.08 MHz.

The larger bandwidth may be supported by the legacy LTE system, NR system, 5G system, etc.

The narrowband is defined as 6 non-overlapping consecutive physical RBs in the frequency domain.

If $N_{RB}^{UL} \geq 4$, a wideband is defined as four non-overlapping narrowbands in the frequency domain. If $N_{RB}^{UL} < 4$, $N_{WB}^{UL} = 1$ and a single wideband is composed of $N_{NB}^{UL}$ non-overlapping narrowband(s).

For example, in the case of a 10 MHz channel, 8 non-overlapping narrowbands are defined.

Figure 12:
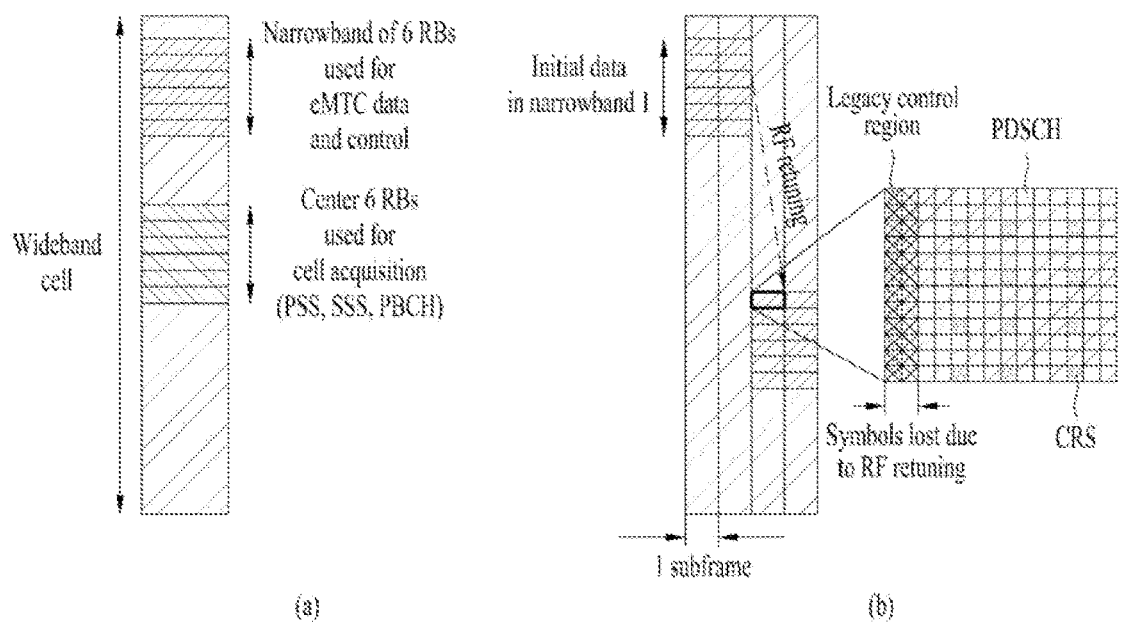
FIG. 12 illustrates examples of narrowband operations and frequency diversity.

FIG. 12 illustrates examples of narrowband operations and frequency diversity.

Specifically, FIG. 12 (a) illustrates an example of the narrowband operation, and FIG. 12(b) illustrates an example of repetitions with RF retuning.

Hereinafter, frequency diversity by RF retuning will be described with reference to FIG. 12(b).

The MTC supports limited frequency, spatial, and time diversity due to the narrowband RF, single antenna, and limited mobility. To reduce the effects of fading and outages, frequency hopping is supported between different narrowbands by the RF retuning.

The frequency hopping is applied to different uplink and downlink physical channels when repetition is enabled.

For example, if 32 subframes are used for PDSCH transmission, the first 16 subframes may be transmitted on the first narrowband. In this case, the RF front-end is retuned to another narrowband, and the remaining 16 subframes are transmitted on the second narrowband.

The MTC narrowband may be configured by system information or DCI.

(2) The MTC operates in half-duplex mode and uses limited (or reduced) maximum transmission power.

(3) The MTC does not use a channel (defined in the legacy LTE or NR) that should be distributed over the full system bandwidth of the legacy LTE or NR.

For example, the MTC does not use the following legacy LTE channels: PCFICH, PHICH, and PDCCH.

Thus, a new control channel, an MTC PDCCH (MPDCCH), is defined for the MTC since the above channels are not monitored.

The MPDCCH may occupy a maximum of 6 RBs in the frequency domain and one subframe in the time domain.

The MPDCCH is similar to an evolved PDCCH (EPDCCH) and supports a common search space for paging and random access.

In other words, the concept of the MPDCCH is similar to that of the EPDCCH used in the legacy LTE.

(4) The MTC uses newly defined DCI formats. For example, DCI formats 6-0A, 6-0B, 6-1A, 6-1B, 6-2, etc. may be used.

In the MTC, a physical broadcast channel (PBCH), physical random access channel (PRACH), MPDCCH, PDSCH, PUCCH, and PUSCH may be repeatedly transmitted. The MTC repeated transmission enables decoding of an MTC channel in a poor environment such as a basement, that is, when the signal quality or power is low, thereby increasing the radius of a cell or supporting the signal propagation effect. The MTC may support a limited number of transmission modes (TMs), which are capable of operating on a single layer (or single antenna), or support a channel or reference signal (RS), which are capable of operating on a single layer. For example, the MTC may operate in TM 1, 2, 6, or 9.

(6) In the MTC, HARQ retransmission is adaptive and asynchronous and performed based on a new scheduling assignment received on the MPDCCH.

(7) In the MTC, PDSCH scheduling (DCI) and PDSCH transmission occur in different subframes (cross-subframe scheduling).

(8) All resource allocation information (e.g., a subframe, a transport block size (TBS), a subband index, etc.) for SIB1 decoding is determined by a master information block (MIB) parameter (in the MTC, no control channel is used for the SIB1 decoding).

(9) All resource allocation information (e.g., a subframe, a TBS, a subband index, etc.) for SIB2 decoding is determined by several SIB1 parameters (in the MTC, no control channel is used for the SIB2 decoding).

(10) The MTC supports an extended discontinuous reception (DRX) cycle.

(11) The MTC may use the same primary synchronization signal/secondary synchronization signal/common reference signal (PSS/SSS/CRS) as that used in the legacy LTE or NR. In the NR, the PSS/SSS is transmitted in the unit of SS block (or SS/PBCH block or SSB), and a tracking RS (TRS) may be used for the same purpose as the CRS. That is, the TRS is a cell-specific RS and may be used for frequency/time tracking.

2) MTC Operation Mode and Level

Hereinafter, MTC operation modes and levels will be described. To enhance coverage, the MTC may be divided into two operation modes (first and second modes) and four different levels as shown in Table 8 below.

The MTC operation mode may be referred to CE mode. The first and second modes may be referred to CE mode A and CE mode B, respectively.

TABLE 8

| Mode | Level | Description |
| --- | --- | --- |
| Mode A | Level 1 | No repetition for PRACH |
|  | Level 2 | Small Number of Repetition for PRACH |
| Mode B | Level 3 | Medium Number of Repetition for PRACH |
|  | Level 4 | Large Number of Repetition for PRACH |

The first mode is defined for small coverage where full mobility and channel state information (CSI) feedback are supported. In the first mode, the number of repetitions is zero or small. The operation in the first mode may have the same operation coverage as that of UE category 1. The second mode is defined for a UE with a very poor coverage condition where CSI feedback and limited mobility are supported. In the second mode, the number of times that transmission is repeated is large. The second mode provides up to 15 dB coverage enhancement with reference to the coverage of UE category 1. Each level of the MTC is defined differently in RACH and paging procedures.

Hereinafter, a description will be given of how to determine the MTC operation mode and level.

The MTC operation mode is determined by the base station, and each level is determined by the MTC UE. Specifically, the base station transmits RRC signaling including information for the MTC operation mode to the UE. The RRC signaling may include an RRC connection setup message, an RRC connection reconfiguration message, or an RRC connection reestablishment message. Here, the term "message" may refer to an information element (IE).

The MTC UE determines a level within the operation mode and transmits the determined level to the base station. Specifically, the MTC UE determines the level within the operation mode based on measured channel quality (e.g., RSRP, RSRQ, SINR, etc.) and informs the base station of the determined level using a PRACH resource (e.g., frequency, time, preamble, etc.).

3) MTC Guard Period

As described above, the MTC operates in the narrowband. The position of the narrowband may vary in each specific time unit (e.g., subframe or slot). The MTC UE tunes to a different frequency in every time unit. Thus, all frequency retuning may require a certain period of time. In other words, the guard period is required for transition from one time unit to the next time unit, and no transmission and reception occurs during the corresponding period.

The guard period varies depending on whether the current link is downlink or uplink and also varies depending on the state thereof. An uplink guard period (i.e., guard period defined for uplink) varies depending on the characteristics of data carried by a first time unit (time unit N) and a second time unit (time unit N+1). In the case of a downlink guard period, the following conditions need to be satisfied: (1) a first downlink narrowband center frequency is different from a second narrowband center frequency; and (2) in TDD, a first uplink narrowband center frequency is different from a second downlink center frequency.

The MTC guard period defined in the legacy LTE will be described. A guard period consisting of at most $N_{symb}^{retune}$ SC-FDMA symbols is created for Tx-Tx frequency retuning between two consecutive subframes. When the higher layer parameter ce-RetuningSymbols is configured, $N_{symb}^{retune}$ is equal to ce-RetuningSymbols. Otherwise, $N_{symb}^{retune}$ is 2. For an MTC UE configured with the higher layer parameter srs-UpPtsAdd, a guard period consisting of SC-FDMA symbols is created for Tx-Tx frequency retuning between a first special subframe and a second uplink subframe for frame structure type 2.

Figure 13:
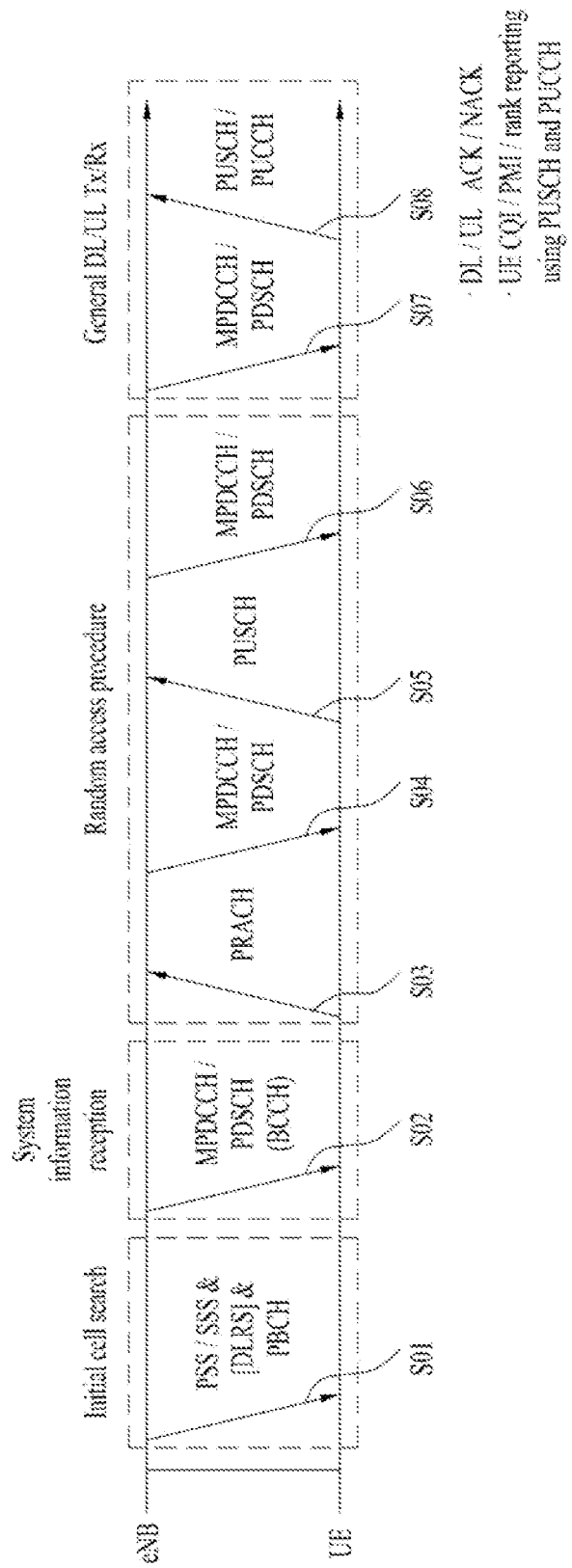
FIG. 13 illustrates physical channels available in MTC and a general signal transmission method using the same.

FIG. 13 illustrates physical channels available in MTC and a general signal transmission method using the same.

When an MTC UE is powered on or enters a new cell, the MTC UE performs initial cell search in step S1301. The initial cell search involves acquisition of synchronization with a base station. Specifically, the MTC UE synchronizes with the base station by receiving a primary synchronization signal (PSS) and a second synchronization signal (SSS) from the base station and obtains information such as a cell identifier (ID). The PSS/SSS used by the MTC UE for the initial cell search may be equal to a PSS/SSS or a resynchronization signal (RSS) of the legacy LTE.

Thereafter, the MTC UE may acquire broadcast information in the cell by receiving a PBCH signal from the base station.

During the initial cell search, the MTC UE may monitor the state of a downlink channel by receiving a downlink reference signal (DL RS). The broadcast information transmitted on the PBCH corresponds to the MIB. In the MTC, the MIB is repeated in the first slot of subframe #0 of a radio frame and other subframes (subframe #9 in FDD and subframe #5 in the TDD).

The PBCH repetition is performed such that the same constellation point is repeated on different OFDM symbols to estimate an initial frequency error before attempting PBCH decoding.

Figure 14:
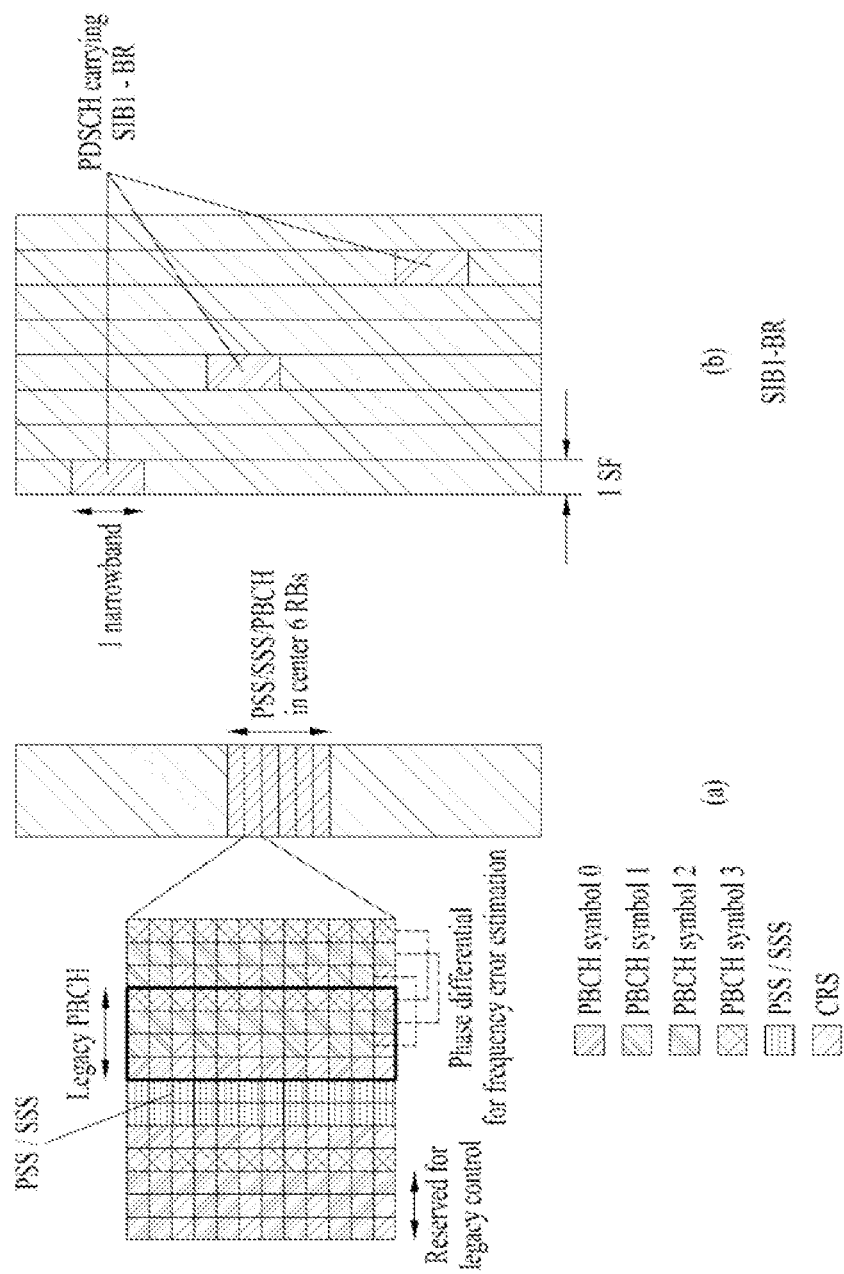
FIG. 14 illustrates an example of system information transmissions in MTC.

FIG. 14 illustrates an example of system information transmissions in MTC.

Specifically, FIG. 14 (a) illustrates an example of a repetition pattern for subframe #0 in FDD and a frequency error estimation method for a normal CP and repeated symbols, and FIG. 14 (b) illustrates an example of transmission of an SIB-BR on a wideband LTE channel.

Five reserved bits in the MIB are used in the MTC to transmit scheduling information for a new system information block for bandwidth reduced device (SIB1-BR) including a time/frequency location and a TBS.

The SIB-BR is transmitted on a PDSCH directly without any related control channels.

The SIB-BR is maintained without change for 512 radio frames (5120 ms) to allow a large number of subframes to be combined.

Table 9 shows an example of the MIB.

TABLE 9

| | |
|---|---|
| -- ASN1START | |
| MasterInformationBlock ::= | SEQUENCE { |
| dl-Bandwidth | ENUMERATED { |
| | n6, n15, n25, n50, n75, n100}, |
| phich-Config | PHICH-Config, |
| systemFrameNumber | BIT STRING (SIZE (8)), |
| schedulingInfoSIB1-BR-r13 | INTEGER (0..31), |
| systemInfoUnchanged-BR-r15 | BOOLEAN, |
| spare | BIT STRING (SIZE (4)) |
| } | |
| -- ASN1STOP | |

In Table 9, the schedulingInfoSIB1-BR field indicates the index of a table that defines SystemInformationBlockType1-BR scheduling information. The zero value means that SystemInformationBlockType1-BR is not scheduled. The overall function and information carried by SystemInformationBlockType1-BR (or SIB1-BR) is similar to SIB1 of the legacy LTE. The contents of SIB1-BR may be categorized as follows: (1) PLMN; (2) cell selection criteria; and (3) scheduling information for SIB2 and other SIBs.

After completing the initial cell search, the MTC UE may acquire more detailed system information by receiving a MPDCCH and a PDSCH based on information in the MPDCCH in step S1302. The MPDCCH has the following features: (1) The MPDCCH is very similar to the EPDCCH; (2) The MPDCCH may be transmitted once or repeatedly (the number of repetitions is configured through higher layer signaling); (3) Multiple MPDCCHs are supported and a set of MPDCCHs are monitored by the UE; (4) the MPDCCH is generated by combining enhanced control channel elements (eCCEs), and each CCE includes a set of REs; and (5) the MPDCCH supports an RA-RNTI, SI-RNTI, P-RNTI, C-RNTI, temporary C-RNTI, and semi-persistent scheduling (SPS) C-RNTI.

To complete the access to the base station, the MTC UE may perform a random access procedure in steps S1303 to S1306. The basic configuration of an RACH procedure is carried by SIB2. SIB2 includes parameters related to paging. A paging occasion (PO) is a subframe in which the P-RNTI is capable of being transmitted on the MPDCCH. When a P-RNTI PDCCH is repeatedly transmitted, the PO may refer to a subframe where MPDCCH repetition is started. A paging frame (PF) is one radio frame, which may contain one or multiple POs. When DRX is used, the MTC UE monitors one PO per DRX cycle. A paging narrowband (PNB) is one narrowband, on which the MTC UE performs paging message reception.

To this end, the MTC UE may transmit a preamble on a PRACH (S1303) and receive a response message (e.g., random access response (RAR)) for the preamble on the MPDCCH and the PDSCH related thereto (S1304). In the case of contention-based random access, the MTC UE may perform a contention resolution procedure including transmission of an additional PRACH signal (S1305) and reception of a MPDCCH signal and a PDSCH signal related thereto (S1306). In the MTC, the signals and messages (e.g., Msg 1, Msg 2, Msg 3, and Msg 4) transmitted during the RACH procedure may be repeatedly transmitted, and a repetition pattern may be configured differently depending on coverage enhancement (CE) levels. Msg 1 may represent the PRACH preamble, Msg 2 may represent the RAR, Msg 3 may represent uplink transmission for the RAR at the MTC UE, and Msg 4 may represent downlink transmission for Msg 3 from the base station.

For random access, signaling of different PRACH resources and different CE levels is supported. This provides the same control of the near-far effect for the PRACH by grouping UEs that experience similar path loss together. Up to four different PRACH resources may be signaled to the MTC UE.

The MTC UE measures RSRP using a downlink RS (e.g., CRS, CSI-RS, TRS, etc.) and selects one of random access resources based on the measurement result. Each of four random access resources has an associated number of PRACH repetitions and an associated number of RAR repetitions.

Thus, the MTC UE in poor coverage requires a large number of repetitions so as to be detected by the base station successfully and needs to receive as many RARs as the number of repetitions such that the coverage levels thereof are satisfied.

The search spaces for RAR and contention resolution messages are defined in the system information, and the search space is independent for each coverage level.

A PRACH waveform used in the MTC is the same as that in the legacy LTE (for example, OFDM and Zadoff-Chu sequences).

After performing the above-described processes, the MTC UE may perform reception of an MPDCCH signal and/or a PDSCH signal (S1307) and transmission of a PUSCH signal and/or a PUCCH signal (S1308) as a normal uplink/downlink signal transmission procedure. Control information that the MTC UE transmits to the base station is commonly referred to as uplink control information (UCI). The UCI includes a HARQ-ACK/NACK, scheduling request, channel quality indicator (CQI), precoding matrix indicator (PMI), rank indicator (RI), etc.

When the MTC UE has established an RRC connection, the MTC UE blindly decodes the MPDCCH in a configured search space to obtain uplink and downlink data assignments.

In the MTC, all available OFDM symbols in a subframe are used to transmit DCI. Accordingly, time-domain multiplexing is not allowed between control and data channels in the subframe. Thus, the cross-subframe scheduling may be performed between the control and data channels as described above.

If the MPDCCH is last repeated in subframe #N, the MPDCCH schedules a PDSCH assignment in subframe #N+2.

DCI carried by the MPDCCH provides information for how many times the MPDCCH is repeated so that the MTC UE may know the number of repetitions when PDSCH transmission is started.

The PDSCH assignment may be performed on different narrowbands. Thus, the MTC UE may need to perform retuning before decoding the PDSCH assignment.

For uplink data transmission, scheduling follows the same timing as that of the legacy LTE. The last MPDCCH in subframe #N schedules PUSCH transmission starting in subframe #N+4.

Figure 15:
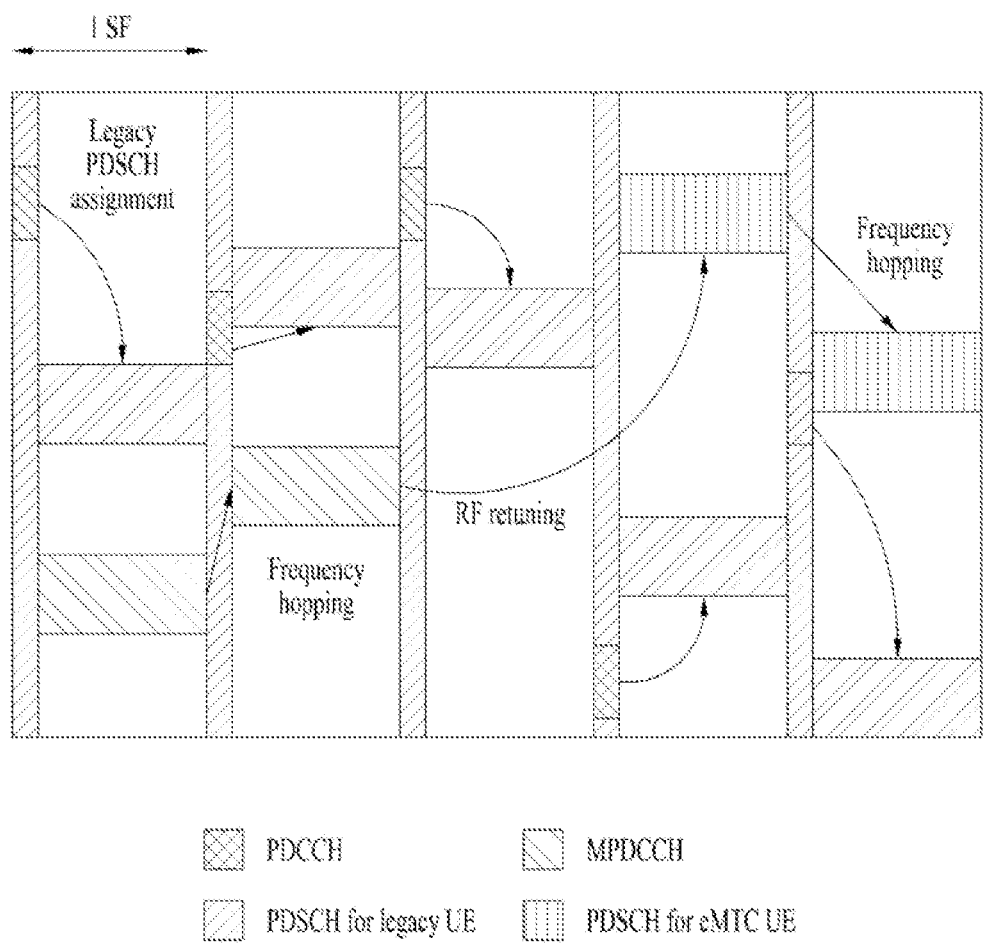
FIG. 15 illustrates an example of scheduling for each of MTC and legacy LTE.

FIG. 15 illustrates an example of scheduling for each of MTC and legacy LTE.

A legacy LTE assignment is scheduled using the PDCCH and uses the initial OFDM symbols in each subframe. The PDSCH is scheduled in the same subframe in which the PDCCH is received.

On the other hand, the MTC PDSCH is cross-subframe scheduled, and one subframe is defined between the MPDCCH and PDSCH to allow MPDCCH decoding and RF retuning.

MTC control and data channels may be repeated for a large number of subframes to be decoded in an extreme coverage condition. Specifically, the MTC control and data channels may be repeated for a maximum of 256 subframes for the MPDCCH and a maximum of 2048 subframes for the PDSCH F. Narrowband-Internet of Things (NB-IoT)

The NB-IoT may refer to a system for providing low complexity and low power consumption based on a system bandwidth (BW) corresponding to one physical resource block (PRB) of a wireless communication system (e.g., LTE system, NR system, etc.).

Herein, the NB-IoT may be referred to as another terminology such as 'NB-LTE', 'NB-IoT enhancement', 'further enhanced NB-IoT', or 'NB-NR'. The NB-IoT may be replaced with a term defined or to be defined in the 3GPP standards. For convenience of description, all types of NB-IoT is commonly referred to as 'NB-IoT'.

The NB-IoT may be used to implement the IoT by supporting an MTC device (or MTC UE) in a cellular system. Since one PRB of the system BW is allocated for the NB-IoT, frequency may be efficiently used. In addition, considering that in the NB-IoT, each UE recognizes a single PRB as one carrier, the PRB and carrier described herein may be considered to have the same meaning.

Although the present disclosure describes frame structures, physical channels, multi-carrier operation, operation modes, and general signal transmission and reception of the NB-IoT based on the LTE system, it is apparent that the present disclosure is applicable to the next-generation systems (e.g., NR system, etc.). In addition, the details of the NB-IoT described in the present disclosure may be applied to the MTC, which has similar purposes (e.g., low power, low cost, coverage enhancement, etc.).

1) Frame Structure and Physical Resource of NB-IoT

The NB-IoT frame structure may vary depending on subcarrier spacing.

Figure 16:
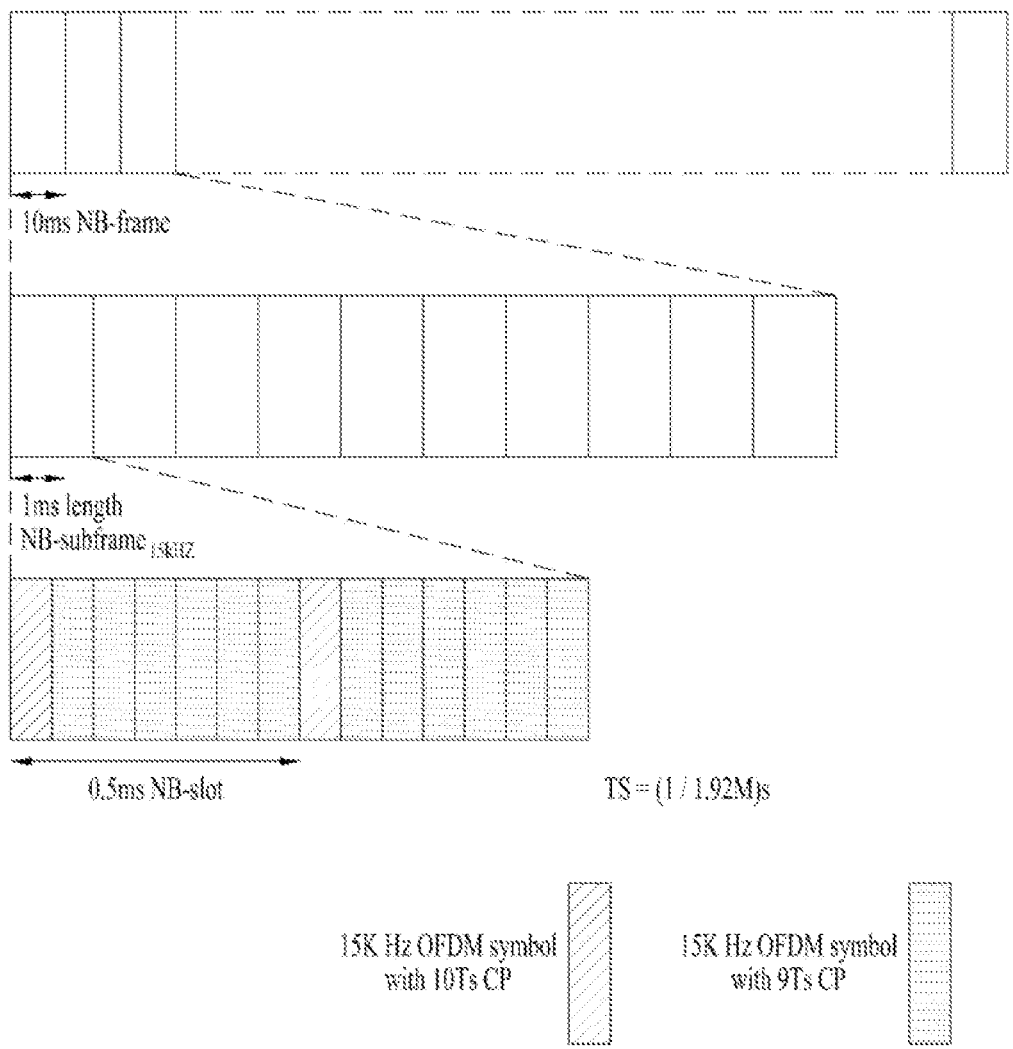
FIGS. 16 and 17 illustrate examples of NB-IoT frame structures according to subcarrier spacing.
Figure 17:
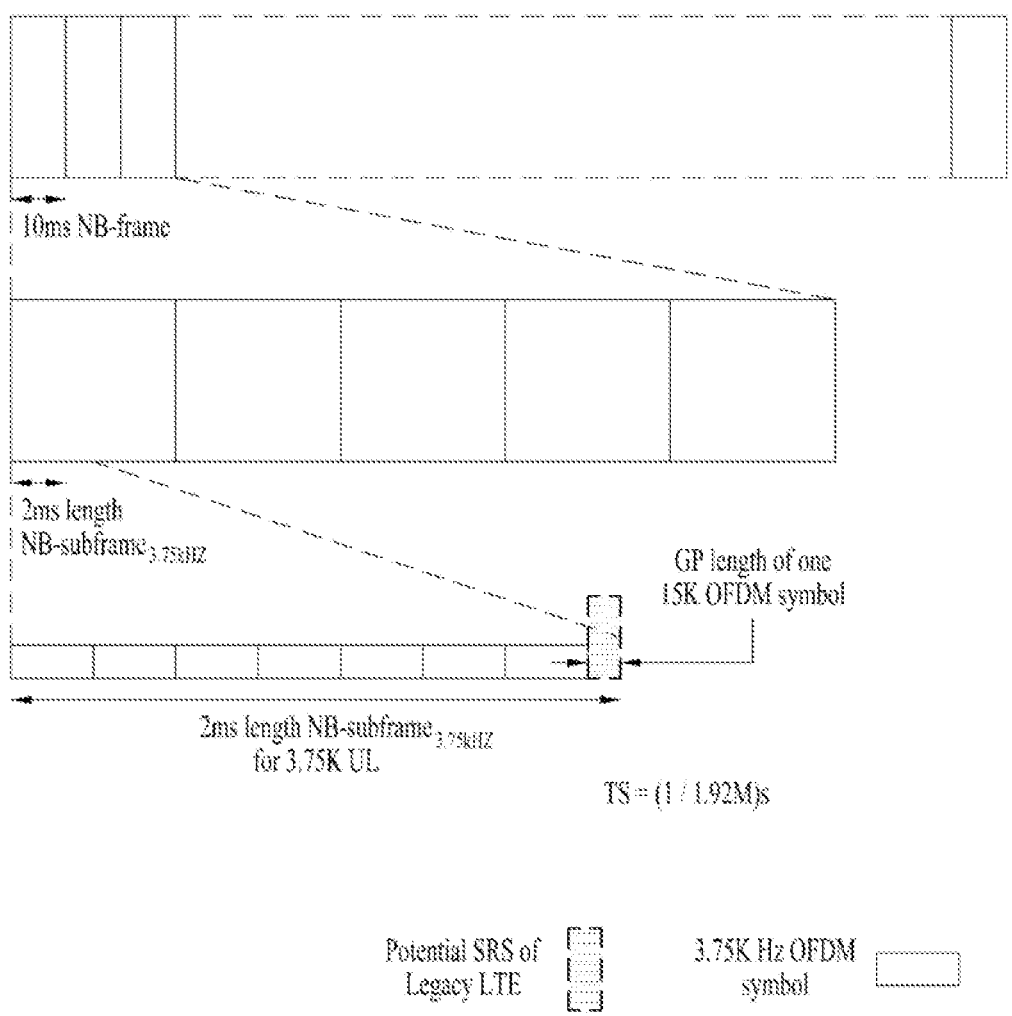

FIGS. 16 and 17 illustrate examples of NB-IoT frame structures according to subcarrier spacing (SCS). Specifically, FIG. 16 illustrates a frame structure with SCS of 15 kHz, and FIG. 17 illustrates a frame structure with SCS of 3.75 kHz. However, the NB-IoT frame structure is not limited thereto, and different SCS (e.g., 30 kHz, etc.) may be applied to the NB-IoT by changing the time/frequency unit.

Although the present disclosure describes the NB-IoT frame structure based on the LTE frame structure, this is merely for convenience of description and the present disclosure is not limited thereto. That is, the embodiments of the present disclosure are applicable to the NB-IoT based on the frame structure of the next-generation system (e.g., NR system).

Referring to FIG. 16, the NB-IoT frame structure for the 15 kHz subcarrier spacing is the same as the frame structure of the legacy system (LTE system). Specifically, a 10 ms NB-IoT frame may include 10 NB-IoT subframes of 1 ms each, and the 1 ms NB-IoT subframe may include two NB-IoT slots, each having a duration of 0.5 ms. Each 0.5 ms NB-IoT slot ms may include 7 OFDM symbols.

Referring to FIG. 17, a 10 ms NB-IoT frame may include five NB-IoT subframes of 2 ms each, and the 2 ms NB-IoT subframe may include 7 OFDM symbols and one guard period (GP). The 2 ms NB-IoT subframe may be expressed as an NB-IoT slot or an NB-IoT resource unit (RU).

Hereinafter, downlink and uplink physical resources for the NB-IoT will be described.

The NB-IoT downlink physical resource may be configured based on physical resources of other communication systems (e.g., LTE system, NR system, etc.) except that the system BW is composed of a specific number of RBs (e.g., one RB=180 kHz). For example, when NB-IoT downlink supports only the 15 kHz subcarrier spacing as described above, the NB-IoT downlink physical resource may be configured by limiting the resource grid of the LTE system illustrated in FIG. 6 to one RB (i.e., one PRB) in the frequency domain.

Figure 18:
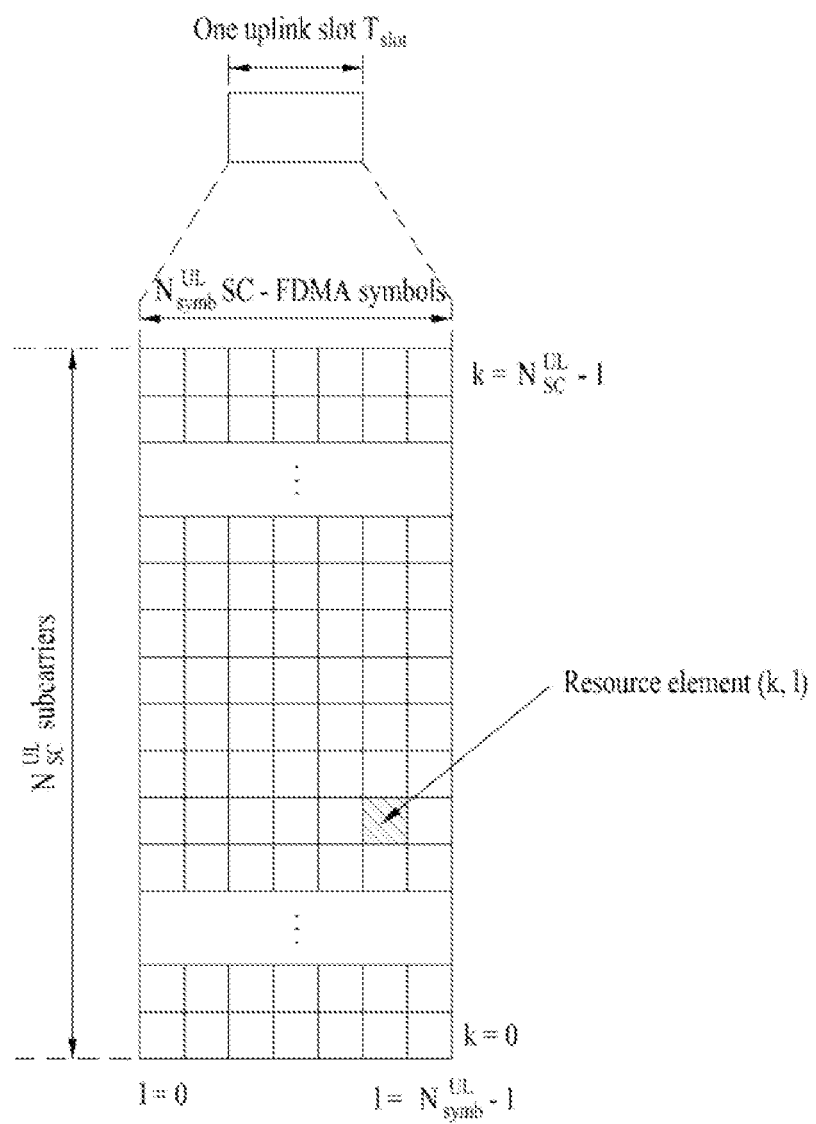
FIG. 18 illustrates an example of the resource grid for NB-IoT UL.

The NB-IoT uplink physical resource may be configured by limiting to the system bandwidth to one RB as in the NB-IoT downlink. For example, when NB-IoT uplink supports the 15 kHz and 3.75 kHz subcarrier spacing as described above, a resource grid for the NB-IoT uplink may be represented as shown in FIG. 18. The number of subcarriers $N_{UL}^{sc}$ and the slot period $T_{slot}$ may be given in Table 10 below.

FIG. 18 illustrates an example of the resource grid for NB-IoT uplink.

TABLE 10

| Subcarrier spacing | $N_{sc}^{UL}$ | $T_{slot}$ |
| --- | --- | --- |
| $\Delta f$ = 3.75 kHz | 48 | 61440 · $T_s$ |
| $\Delta f$ = 15 kHz | 12 | 15360 · $T_s$ |

A resource unit (RU) for the NB-IoT uplink may include SC-FDMA symbols in the time domain and $N_{symb}^{UL} N_{slots}^{UL}$ consecutive subcarriers in the frequency domain. In frame structure type 1 (i.e., FDD), the values of $N_{sc}^{RU}$ and $N_{symb}^{UL}$ may be given in Table 11 below. In frame structure type 2 (i.e., TDD), the values of $N_{sc}^{RU}$ and $N_{symb}^{UL}$ may be given in Table 12.

TABLE 11

| NPUSCH format | Δf | | $N_{sc}^{RU}$ | $N_{slots}^{UL}$ | $N_{symb}^{UL}$ |
|---|---|---|---|---|---|
| 1 | 3.75 | kHz | 1 | 16 | 7 |
|   | 15 | kHz | 1 | 16 |   |
|   |   |   | 3 | 8 |   |
|   |   |   | 6 | 4 |   |
|   |   |   | 12 | 2 |   |
| 2 | 3.75 | kHz | 1 | 4 |   |
|   | 15 | kHz | 1 | 4 |   |

TABLE 12

| NPUSCH format | Δf | | Supported uplink-downlink configurations | $N_{sc}^{RU}$ | $N_{slots}^{UL}$ | $N_{symb}^{UL}$ |
|---|---|---|---|---|---|---|
| 1 | 3.75 | kHz | 1, 4 | 1 | 16 | 7 |
|   | 15 | kHz | 1, 2, 3, 4, 5 | 1 | 16 |   |
|   |   |   |   | 3 | 8 |   |
|   |   |   |   | 6 | 4 |   |
|   |   |   |   | 12 | 2 |   |
| 2 | 3.75 | kHz | 1, 4 | 1 | 4 |   |
|   | 15 | kHz | 1, 2, 3, 4, 5 | 1 | 4 |   |

2) Physical Channels of NB-IoT

A base station and/or UE that support the NB-IoT may be configured to transmit and receive physical channels and signals different from those in the legacy system. Hereinafter, the physical channels and/or signals supported in the NB-IoT will be described in detail.

First, the NB-IoT downlink will be described. For the NB-IoT downlink, an OFDMA scheme with the 15 kHz subcarrier spacing may be applied. Accordingly, orthogonality between subcarriers may be provided, thereby supporting coexistence with the legacy system (e.g., LTE system, NR system, etc.).

To distinguish the physical channels of the NB-IoT system from those of the legacy system, 'N (narrowband)' may be added. For example, DL physical channels may be defined as follows: 'narrowband physical broadcast channel (NPBCH)', 'narrowband physical downlink control channel (NPDCCH)', 'narrowband physical downlink shared channel (NPDSCH)', etc. DL physical signals may be defined as follows: 'narrowband primary synchronization signal (NPSS)', 'narrowband secondary synchronization signal (NSSS)', 'narrowband reference signal (NRS)', 'narrowband positioning reference signal (NPRS)', 'narrowband wake-up signal (NWUS)', etc.

Generally, the above-described downlink physical channels and physical signals for the NB-IoT may be configured to be transmitted based on time-domain multiplexing and/or frequency-domain multiplexing.

The NPBCH, NPDCCH, and NPDSCH, which are downlink channels of the NB-IoT system, may be repeatedly transmitted for coverage enhancement.

The NB-IoT uses newly defined DCI formats. For example, the DCI formats for the NB-IoT may be defined as follows: DCI format N0, DCI format N1, DCI format N2, etc.

Next, the NB-IoT uplink will be described. For the NB-IoT uplink, an SC-FDMA scheme with the subcarrier spacing of 15 kHz or 3.75 kHz may be applied. The NB-IoT uplink may support multi-tone and single-tone transmissions. For example, the multi-tone transmission may support the 15 kHz subcarrier spacing, and the single-tone transmission may support both the 15 kHz and 3.75 kHz subcarrier spacing.

In the case of the NB-IoT uplink, 'N (narrowband)' may also be added to distinguish the physical channels of the NB-IoT system from those of the legacy system, similarly to the NB-IoT downlink. For example, uplink physical channels may be defined as follows: 'narrowband physical random access channel (NPRACH)', 'narrowband physical uplink shared channel (NPUSCH)', etc. UL physical signals may be defined as follows: 'narrowband demodulation reference signal (NDMRS)'.

The NPUSCH may be configured with NPUSCH format 1 and NPUSCH format 2. For example, NPUSCH format 1 is used for UL-SCH transmission (or transfer), and NPUSCH format 2 may be used for UCI transmission such as HARQ ACK signaling.

The NPRACH, which is a downlink channel of the NB-IoT system, may be repeatedly transmitted for coverage enhancement. In this case, frequency hopping may be applied to the repeated transmission.

3) Multi-Carrier Operation in NB-IoT

Hereinafter, the multi-carrier operation in the NB-IoT will be described. The multi-carrier operation may mean that when the base station and/or UE uses different usage of multiple carriers (i.e., different types of multiple carriers) in transmitting and receiving a channel and/or a signal in the NB-IoT.

In general, the NB-IoT may operate in multi-carrier mode as described above. In this case, NB-IoT carriers may be divided into an anchor type carrier (i.e., anchor carrier or anchor PRB) and a non-anchor type carrier (i.e., non-anchor carrier or non-anchor PRB).

From the perspective of the base station, the anchor carrier may mean a carrier for transmitting the NPDSCH that carries the NPSS, NSSS, NPBCH, and SIB (N-SIB) for initial access. In other words, in the NB-IoT, the carrier for initial access may be referred to as the anchor carrier, and the remaining carrier(s) may be referred to as the non-anchor carrier. In this case, there may be one or multiple anchor carriers in the system.

4) Operation Mode of NB-IoT

Figure 19:
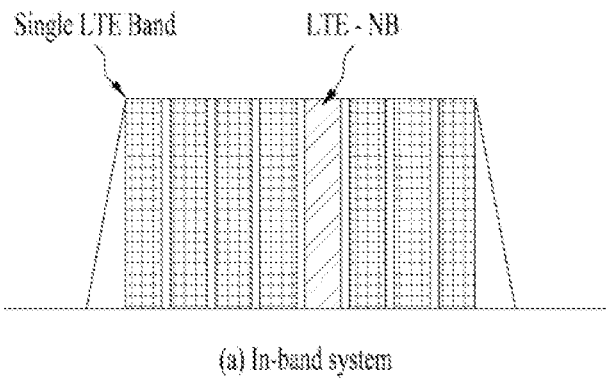
FIG. 19 illustrates examples of operation modes supported in the NB-IoT system.
Figure 19:
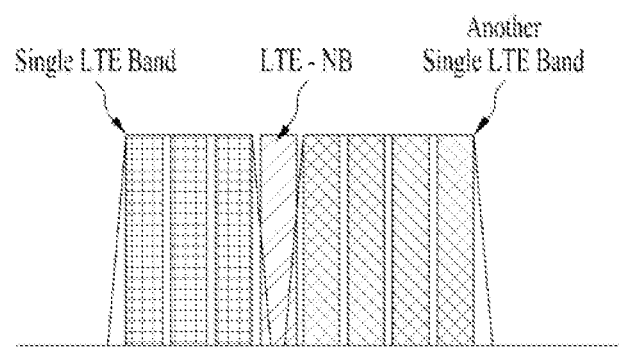
Figure 19:
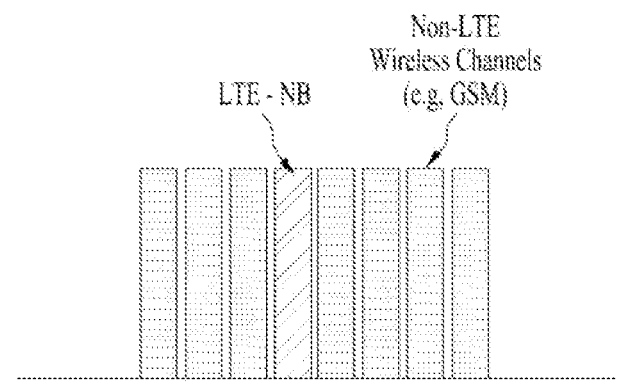

The operation mode of the NB-IoT will be described. The NB-IoT system may support three operation modes. FIG. 19 illustrates examples of operation modes supported in the NB-IoT system. Although the present disclosure describes the NB-IoT operation mode based on the LTE band, this is merely for convenience of description and the present disclosure is also applicable to other system bands (e.g., NR system band).

FIG. 19 (a) illustrates an in-band system, FIG. 19 (b) illustrates a guard-band system, and FIG. 19 (c) illustrates a stand-alone system. The in-band system, guard-band system, and stand-alone system may be referred to as in-band mode, guard-band mode, and stand-alone mode, respectively.

The in-band system may mean a system or mode that uses one specific RB (PRB) in the legacy LTE band for the NB-IoT. To operate the in-band system, some RBs of the LTE system carrier may be allocated.

The guard-band system may mean a system or mode that uses a space reserved for the guard band of the legacy LTE band for the NB-IoT. To operate the guard-band system, the guard band of the LTE carrier which is not used as the RB in the LTE system may be allocated. For example, the legacy LTE band may be configured such that each LTE band has the guard band of minimum 100 kHz at the end thereof. In order to use 200 kHz, two non-contiguous guard bands may be used.

The in-band system and the guard-band system may operate in a structure where the NB-IoT coexists in the legacy LTE band.

Meanwhile, the stand-alone system may mean a system or mode independent from the legacy LTE band. To operate the stand-alone system, a frequency band (e.g., reallocated GSM carrier) used in a GSM EDGE radio access network (GERAN) may be separately allocated.

The above three operation modes may be applied independently, or two or more operation modes may be combined and applied.

5) General Signal Transmission and Reception Procedure in NB-IoT

Figure 20:
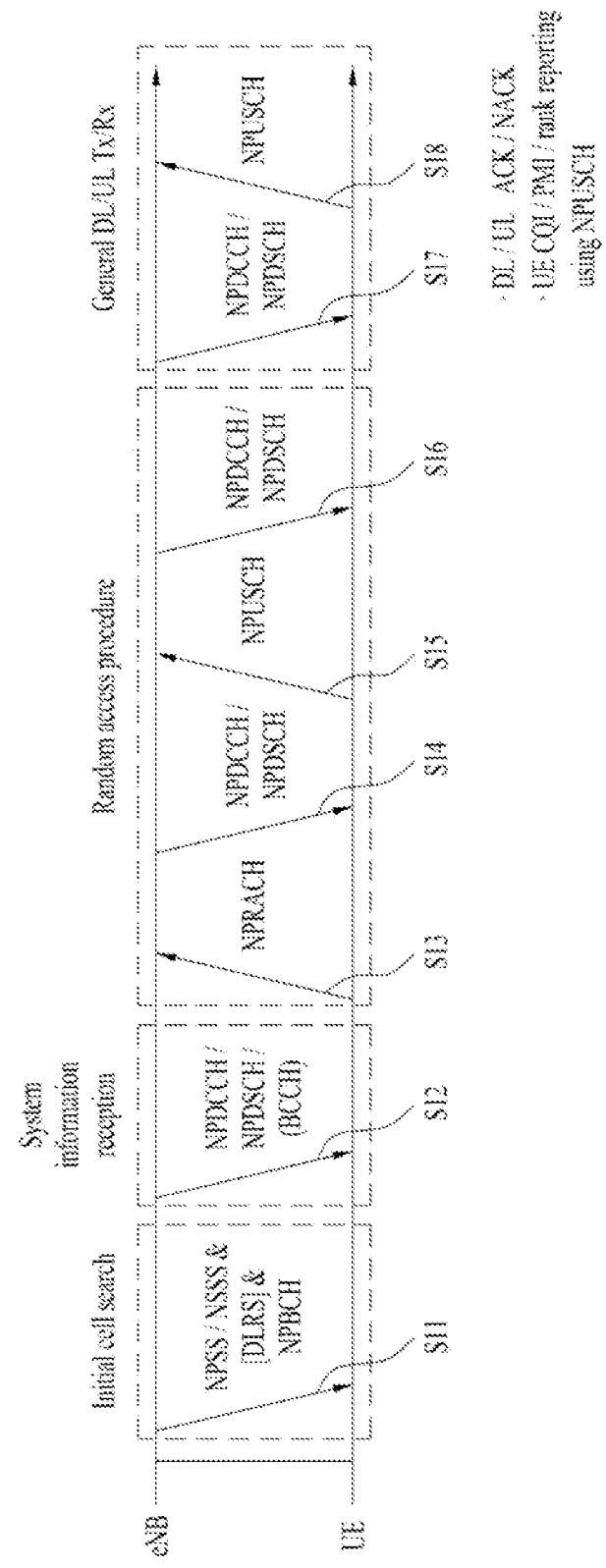
FIG. 20 illustrates an example of physical channels available in the NB-IoT and a general signal transmission method using the same.

FIG. 20 illustrates an example of physical channels available in the NB-IoT and a general signal transmission method using the same. In a wireless communication system, an NB-IoT UE may receive information from a base station in downlink (DL) and transmit information to the base station in uplink (UL). In other words, the base station may transmit the information to the NB-IoT UE in downlink and receive the information from the NB-IoT UE in uplink in the wireless communication system.

Information transmitted and received between the base station and the NB-IoT UE may include various data and control information, and various physical channels may be used depending on the type/usage of information transmitted and received therebetween. The NB-IoT signal transmission and reception method described with reference to FIG. 20 may be performed by the aforementioned wireless communication apparatuses (e.g., base station and UE in FIG. 11).

When the NB-IoT UE is powered on or enters a new cell, the NB-IoT UE may perform initial cell search (S11). The initial cell search involves acquisition of synchronization with the base station. Specifically, the NB-IoT UE may synchronize with the base station by receiving an NPSS and an NSSS from the base station and obtain information such as a cell ID. Thereafter, the NB-IoT UE may acquire information broadcast in the cell by receiving an NPBCH from the base station. During the initial cell search, the NB-IoT UE may monitor the state of a downlink channel by receiving a downlink reference signal (DL RS).

In other words, when the NB-IoT UE enters the new cell, the BS may perform the initial cell search, and more particularly, the base station may synchronize with the UE. Specifically, the base station may synchronize with the NB-IoT UE by transmitting the NPSS and NSSS to the UE and transmit the information such as the cell ID. The base station may transmit the broadcast information in the cell by transmitting (or broadcasting) the NPBCH to the NB-IoT UE. The BS may transmit the DL RS to the NB-IoT UE during the initial cell search to check the downlink channel state.

After completing the initial cell search, the NB-IoT UE may acquire more detailed system information by receiving a NPDCCH and a NPDSCH related to thereto (S12). In other words, after the initial cell search, the base station may transmit the more detailed system information by transmitting the NPDCCH and the NPDSCH related to thereto to the NB-IoT UE.

Thereafter, the NB-IoT UE may perform a random access procedure to complete the access to the base station (S13 to S16).

Specifically, the NB-IoT UE may transmit a preamble on an NPRACH (S13). As described above, the NPRACH may be repeatedly transmitted based on frequency hopping for coverage enhancement. In other words, the base station may (repeatedly) receive the preamble from the NB-IoT UE over the NPRACH.

Then, the NB-IoT UE may receive a random access response (RAR) for the preamble from the base station on the NPDCCH and the NPDSCH related thereto (S14). That is, the base station may transmit the random access response (RAR) for the preamble to the base station on the NPDCCH and the NPDSCH related thereto.

The NB-IoT UE may transmit an NPUSCH using scheduling information in the RAR (S15) and perform a contention resolution procedure based on the NPDCCH and the NPDSCH related thereto (S16). That is, the base station may receive the NPUSCH from the NB-IoT UE based on the scheduling information in the RAR and perform the contention resolution procedure.

After performing the above-described processes, the NB-IoT UE may perform NPDCCH/NPDSCH reception (S17) and NPUSCH transmission (S18) as a normal UL/DL signal transmission procedure. After the above-described processes, the base station may transmit the NPDCCH/NPDSCH to the NB-IoT UE and receive the NPUSCH from the NB-IoT UE during the normal uplink/downlink signal transmission procedure.

In the NB-IoT, the NPBCH, NPDCCH, NPDSCH, etc. may be repeatedly transmitted for the coverage enhancement as described above. In addition, UL-SCH (normal uplink data) and UCI may be transmitted on the NPUSCH. In this case, the UL-SCH and UCI may be configured to be transmitted in different NPUSCH formats (e.g., NPUSCH format 1, NPUSCH format 2, etc.)

As described above, the UCI means control information transmitted from the UE to the base station. The UCI may include the HARQ ACK/NACK, scheduling request (SR), CSI, etc. The CSI may include the CQI, PMI, RI, etc. Generally, the UCI may be transmitted over the NPUSCH in the NB-IoT as described above. In particular, the UE may transmit the UCI on the NPUSCH periodically, aperiodically, or semi-persistently according to the request/indication from the network (e.g., base station).

6) Initial Access Procedure in NB-IoT

The procedure in which the NB-IoT UE initially accesses the BS is briefly described in the section "General Signal Transmission and Reception Procedure in NB-IoT". Specifically, the above procedure may be subdivided into a procedure in which the NB-IoT UE searches for an initial cell and a procedure in which the NB-IoT UE obtains system information.

Figure 21:
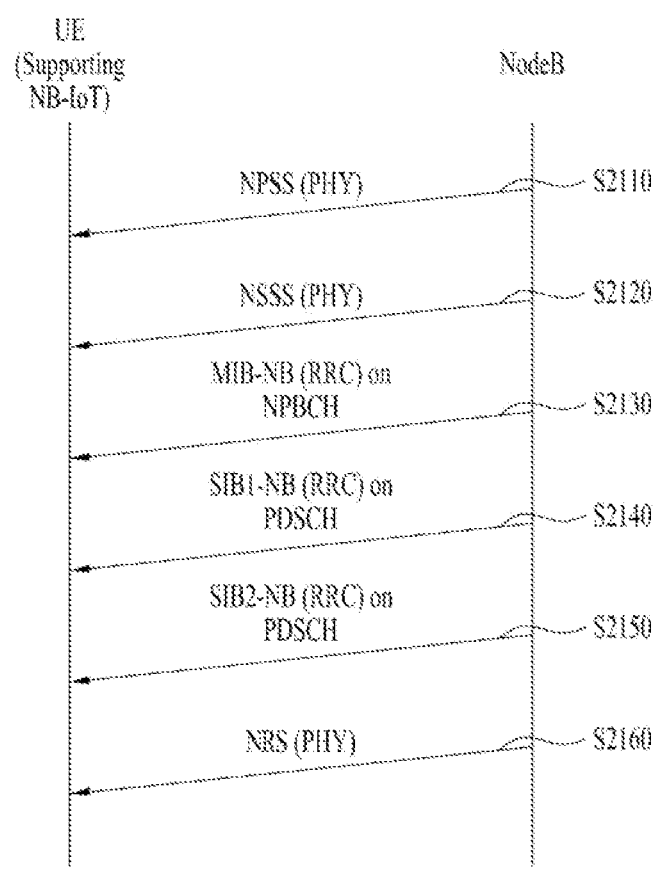
FIG. 21 illustrates an example of the initial access procedure in the NB-IoT.

FIG. 21 illustrates a particular procedure for signaling between a UE and a BS (e.g., NodeB, eNodeB, eNB, gNB, etc.) for initial access in the NB-IoT. In the following, a normal initial access procedure, an NPSS/NSSS configuration, and acquisition of system information (e.g., MIB, SIB, etc.) in the NB-IoT will be described with reference to FIG. 21.

FIG. 21 illustrates an example of the initial access procedure in the NB-IoT. The name of each physical channel and/or signal may vary depending on the wireless communication system to which the NB-IoT is applied. For example, although the NB-IoT based on the LTE system is considered in FIG. 21, this is merely for convenience of description and details thereof are applicable to the NB-IoT based on the NR system. The details of the initial access procedure are also applicable to the MTC.

Referring to FIG. 21, the NB-IoT UE may receive a narrowband synchronization signal (e.g., NPSS, NSSS, etc.)

from the base station (S2110 and S2120). The narrowband synchronization signal may be transmitted through physical layer signaling.

The NB-IoT UE may receive a master information block (MIB) (e.g., MIB-NB) from the base station on an NPBCH (S2130). The MIB may be transmitted through higher layer signaling (e.g., RRC signaling).

The NB-IoT UE may receive a system information block (SIB) from the base station on an NPDSH (S2140 and S2150). Specifically, the NB-IoT UE may receive SIB1-NB, SIB2-NB, etc. on the NPDSCH through the higher layer signaling (e.g., RRC signaling). For example, SIB1-NB may refer to system information with high priority among SIBs, and SIB2-NB may refer to system information with lower priority than SIB1-NB.

The NB-IoT may receive an NRS from the BS (S2160), and this operation may be performed through physical layer signaling.

7) Random Access Procedure in NB-IoT

The procedure in which the NB-IoT UE performs random access to the base station is briefly described in the section "General Signal Transmission and Reception Procedure in NB-IoT". Specifically, the above procedure may be subdivided into a procedure in which the NB-IoT UE transmits a preamble to the base station and a procedure in which the NB-IoT receives a response for the preamble.

Figure 22:
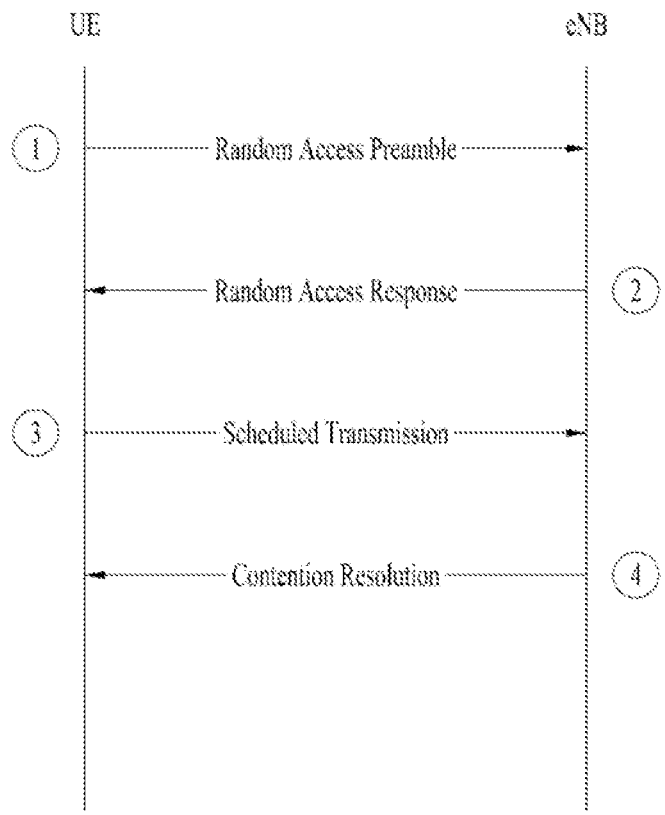
FIG. 22 illustrates an example of the random access procedure in the NB-IoT.

FIG. 22 illustrates a particular procedure for signaling between a UE and a base station (e.g., NodeB, eNodeB, eNB, gNB, etc.) for random access in the NB-IoT. In the following, detail of the random access procedure in the NB-IoT will be described based on messages (e.g., msg1, msg2, msg3, msg4) used therefor.

FIG. 22 illustrates an example of the random access procedure in the NB-IoT. The name of each physical channel, physical signal, and/or message may vary depending on the wireless communication system to which the NB-IoT is applied. For example, although the NB-IoT based on the LTE system is considered in FIG. 22, this is merely for convenience of description and details thereof are applicable to the NB-IoT based on the NR system. The details of the initial access procedure are also applicable to the MTC.

Referring to FIG. 22, the NB-IoT may be configured to support contention-based random access.

First, the NB-IoT UE may select an NPRACH resource based on the coverage level of the corresponding UE. The NB-IoT UE may transmit a random access preamble (i.e., message 1, msg1) to the base station on the selected NPRACH resource.

The NB-IoT UE may monitor an NPDCCH search space to search for an NPDCCH for DCI scrambled with an RA-RNTI (e.g., DCI format N1). Upon receiving the NPDCCH for the DCI scrambled with the RA-RNTI, the UE may receive an RAR (i.e., message 2, msg2) from the base station on an NPDSCH related to the NPDCCH. The NB-IoT UE may obtain a temporary identifier (e.g., temporary C-RNTI), a timing advance (TA) command, etc. from the RAR. In addition, the RAR may also provide an uplink grant for a scheduled message (i.e., message 3, msg3).

To start a contention resolution procedure, the NB-IoT UE may transmit the scheduled message to the base station. Then, the base station may transmit an associated contention resolution message (i.e., message 4, msg4) to the NB-IoT UE in order to inform that the random access procedure is successfully completed.

By doing the above, the base station and the NB-IoT UE may complete the random access.

G. Discontinuous Reception (DRX) Operation

A UE may perform a DRX operation while performing the procedures and/or methods described/proposed in the present specification. A DRX configured UE may reduce power consumption by receiving a DL signal discontinuously. DRX may be performed in Radio Resource Control_IDLE (RRC_IDLE) state, RRC_INACTIVE STATE, or RRC_CONNECTED state.

RRC_CONNECTED DRX

In RRC_CONNECTED state, DRX is used for discontinuous reception of PDCCH. For clarity, DRX performed in RRC_CONNECTED state will be referred to as RRC_CONNECTED DRX.

Figure 23:
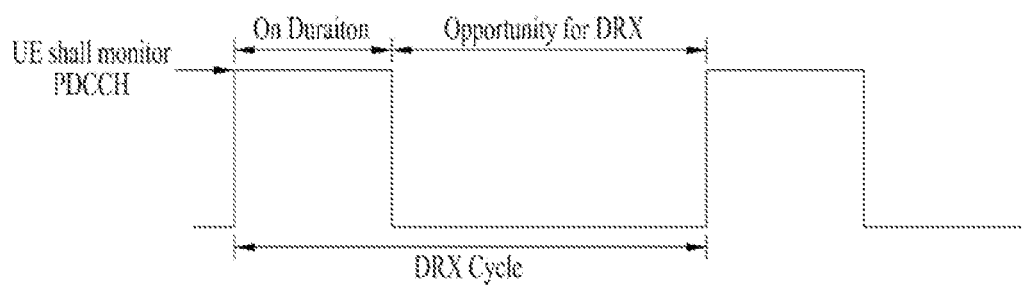
FIG. 23 illustrates a DRX cycle for discontinuous reception of PDCCH.

FIG. 23 illustrates a DRX cycle for discontinuous reception of PDCCH.

Referring to FIG. 23, a DRX cycle is configured with On Duration and Opportunity for DRX. The DRX cycle defines a time interval in which the On Duration is repeated periodically. The On Duration refers to a time interval monitored by a UE to receive PDCCH (e.g., MPDCCH or NPDCCH). Once DRX is configured, a UE performs PDCCH monitoring for On Duration. If there is a PDCCH successfully detected for the PDCCH monitoring, the UE activates an inactivity timer and maintains an awake state. On the contrary, if there is no PDCCH successfully detected for the PDCCH monitoring, the UE enters a sleep mode after the end of the On Duration. Hence, in case that DRX is configured, PDCCH monitoring/reception may be performed discontinuously in time domain in performing the procedure and/or method described/proposed in the foregoing description. For example, in case that DRX is configured, PDCCH monitoring in the present disclosure may be performed discontinuously according to the DRX configuration in activated cell(s). Particularly, in case that a PDCCH occasion (e.g., a time interval (e.g., one or more continuous OFDM symbols) set to monitor PDCCH) corresponds to On Duration, PDCCH monitoring is performed. If a PDCCH occasion corresponds to Opportunity for DRX, PDCCH monitoring may be skipped. On the contrary, if DRX is not configured, PDCCH monitoring/reception may be performed continuously in time domain in performing the procedure and/or method described/proposed in the foregoing description. For example, if DRX is not configured, a PDCCH reception occasion may be configured continuously in the present disclosure. On the other hand, irrespective of presence or non-presence of DRX configuration, PDCCH monitoring may be restricted in a time interval set as a measurement gap.

RRC_IDLE DRX

DRX is used to receive a paging signal discontinuously in RRC_IDLE or RRC_INACTIVE state. For clarity, DRX performed in RRC_IDLE (or RRC_INACTIVE) state will be referred to as RRC_IDLE DRX. Hence, in case that DRX is configured, PDCCH monitoring/reception may be performed discontinuously in time domain in performing the procedure and/or method described/proposed in the present specification.

Figure 24:
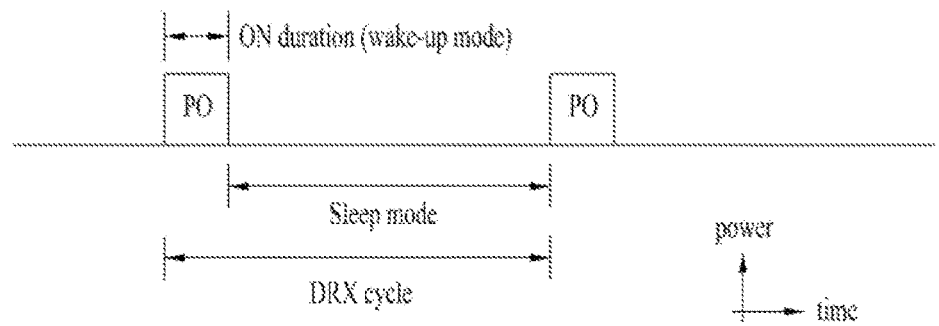
FIG. 24 illustrates a DRX cycle for paging.

FIG. 24 illustrates a DRX cycled for paging.

Referring to FIG. 24, DRX may be configured for discontinuous reception of a paging signal. A UE may receive DRX configuration information from a Base Station (BS) through higher layer (e.g., RRC) signaling. The DRX configuration information may include configuration information on a DRX cycle, a DRX offset, and a DRX timer, etc. The UE repeats On Duration and Sleep Duration. The UE may operate in wakeup mode for On Duration or operate in sleep mode for Sleep Duration. In the wakeup mode, the UE may monitor PO to receive a paging message. The PO means a time resource/interval (e.g., subframe, slot) for the UE to expect a reception of a paging message. The PO monitoring includes the monitoring of PDCCH (or, MPDCCH, NPDCCH) (referred to as paging PDCCH) scrambled with P-RNTI in PO. The paging message may be included in the paging PDCCH or PDSCH scheduled by the paging PDCCH. One or more PO(s) are included in a Paging Frame (PF), and the PF may be periodically configured based on UE ID. Here, the PF corresponds to a single radio frame, and the UE ID may be determined based on International Mobile Subscriber Identity (IMSI) of the UE. If DRX is configured, the UE monitors only a single PO per DRX cycle. In case of receiving a paging message indicating a change of ID and/or system information of its own in PO, the UE may perform an RACH process to initialize (or reset) connection with the BS or receive (or obtain) new system information from the BS. Hence, in performing the procedure and/or method described/proposed in the foregoing description, in order to perform RACH for the connection to the BS or receive (or obtain) new system information from the BS, PO monitoring may be performed discontinuously in time domain.

Figure 25:
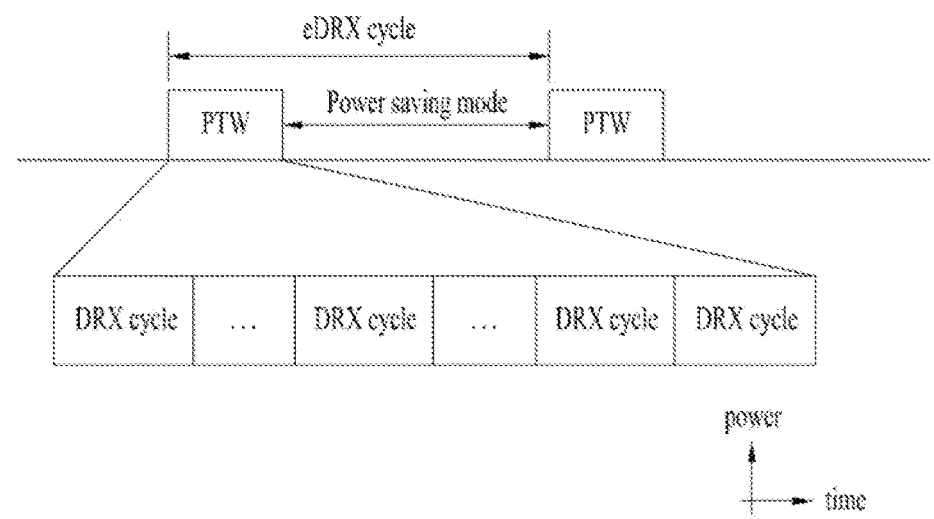
FIG. 25 illustrates an extended DRX (eDRX) cycle.

FIG. 25 illustrates an extended DRX (eDRX) cycle.

According to DRX cycle configuration, a maximum cycle duration may be limited to 2.56 seconds. Yet, In case of a UE that performs data transmission and reception intermittently like an MTC or NB-IoT UE, unnecessary power consumption may occur during a DRX cycle. To further reduce UE's power consumption, a scheme of greatly extending a DRX cycle based on a Power Saving Mode (PSM) and a Paging Time Window (PTW) has been introduced, and an extended DRX cycle is schematically referred to as an eDRX cycle. Particularly, Paging Hyper-frames (PH) are periodically configured based on UE ID, and PTW is defined in the PH. A UE may monitor a paging signal in a manner of switching to a wakeup mode in PO of its own by performing a DRX cycle in a PTW duration. In the PTW duration, one or more DRX cycles (e.g., a wakeup mode and a sleep mode) shown in FIG. 24 may be included. The number of DRX cycles in the PTW duration may be configured by a BS through a higher layer (e.g., RRC) signal.

H. Method Proposed in the Present Disclosure

In the LTE system, a UE may determine a position to monitor a paging (or a paging signal, a paging channel) based on a Paging Occasion (PO) or Paging Frame (PF) determined on the basis of UE_ID of its own, and this principle identically applies to the case of NB-IoT and eMTC newly introduced into the 3GPP LTE Rel-13 standard. There may exist a plurality of UEs expecting a paging in a single PO, and a size of the number of UEs may be determined depending on a configuration that a Base Station (BS) uses SIB. Hereinafter, in the present disclosure, a group of a plurality of UEs that may expect the paging in the same PO will be described in a manner of being defined as UE-group-per-PO.

In the Rel-15 NB-IoT and eMTC standard, a method of using a Wake Up Signal (WUS) has been introduced for the purpose of UE's power saving. In this method, prior to monitoring a search space (or a control channel (e.g., PDCCH) related with a paging or a control channel (e.g., PDCCH) scrambled with P-RNTI) for the paging purpose, a WUS capable UE which is capable of using a WUS, attempts to detect a WUS based on information configured by a BS. In this operation, if the WUS has been detected, the UE may expect that a paging (or a paging signal or a paging channel) will be transmitted in POs associated with the corresponding WUS detected position and monitor a search space (or a control channel (e.g., PDCCH) related with a paging or a control channel (e.g., PDCCH) scrambled with P-RNTI) for the paging purpose. If the WUS has not been detected, the UE may not monitor a search space (or a control channel (e.g., PDCCH) related with a paging or a control channel (e.g., PDCCH) scrambled with P-RNTI) for the paging purpose. In the Rel-15 standard, a WUS transmission position is determined as a relative position of a PO indicated by a WUS and all WUS capable UEs that monitor the same PO are defined to share the same WUS signal and the WUS transmission position. Therefore, if there exists a WUS transmitted by targeting a specific PO, all WUS capable UEs belonging to the UE-group-per-PO related to the corresponding PO should perform the paging monitoring.

Figure 26:
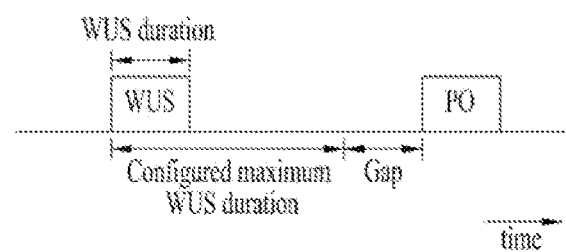
FIG. 26 illustrates the timing relationship between a WUS and a Paging Occasion (PO).

FIG. 26 illustrates the timing relationship between a WUS and a Paging Occasion (PO).

A UE may receive configuration information for a WUS from a BS and monitor the WUS based on the WUS configuration information. Particularly, the UE receives configuration information related with the WUS from the BS through higher layer signaling. Then, the UE monitors/receives the WUS from the BS for a configured maximum WUS duration.

The configuration information for the WUS may include a maximum WUS duration, the number of consecutive POs associated with the WUS, gap information and the like for example. The maximum WUS duration indicates a maximum duration for transmitting the WUS and may be represented as a ratio with a maximum repetition count (e.g., Rmax) related with PDCCH. A WUS may be repeatedly transmitted one or more times within the maximum WUS duration. The number of consecutive POs associated with the WUS indicates the number of POs for not monitoring a channel related with the paging if the UE fails to detect a WUS (or the number of POs for monitoring a channel related to the paging if the UE detects the WUS). The gap information indicates a time gap from an end of the maximum WUS duration to a first PO associated with the WUS.

A UE in good coverage may have a short WUS duration, but a UE in bad coverage may have a longer WUS duration. Having detected a WUS, a UE does not monitor a WUS until a first PO associated with the WUS. In addition, for a gap duration, a UE does not monitor a WUS. Hence, if a UE fails to detect a WUS for a maximum WUS duration, the UE does not monitor a channel related with the paging in the POs associated with the WUS (or remains in sleep mode). If the UE fails to detect a WUS, the paging monitoring may be skipped (or may not be performed).

The paging may be transmitted by targeting some UEs among UEs belonging to the same UE-group-per-PO according to the determination of MME or eNB. In addition, according to the current standard, since information indicating that the WUS and paging are transmitted by targeting which UE among UEs belonging to the UE-group-per-PO is delivered through NPDSCH that carries traffic of the paging, some UEs may perform unnecessary NPDCCH/NPDSCH decoding.

Particularly, in case of an NB-IOT UE or an MTC UE, PDCCH (or MPDCCH or NPDCCH) or PDSCH (or NPDSCH) for paging reception may be repeatedly transmitted/received tens to thousands of times for the coverage improvement. In case that a paging is transmitted by targeting some UEs among UEs belonging to UE-group-per-PO, a UE failing to receive the paging may be aware of absence of the paging for itself after decoding PDCCH (or MPDCCH or NPDCCH) and the related PDSCH (or NPDSCH) all.

Thus, since such UEs perform the unnecessary operation for the reception of WUS, PDCCH (or MPDCCH or NPDCCH) and related PDSCH (or NPDSCH), unnecessary power consumption may be caused considerably.

Based on the above-described problem, the present disclosure proposes UE sub-grouping based WUS design methods to reduce the unnecessary paging monitoring operations of WUS capable UEs. Preferably, the methods proposed in the present disclosure are related to a method for a WUS capable UE to determine a WUS resource to monitor on a specific condition.

Although the present disclosure described a method proposed with reference to NB-IoT and MTC thereafter, it is obvious that the same principle is generally applicable to a random communication system. Therefore, such a term as NPDCCH or MPDCCH described in the present disclosure may be construed as a general term that refers to a control channel on a physical layer. In addition, although the present disclosure describes a proposed method with reference to a WUS that indicates a presence or non-presence of paging transmission in IDLE mode (or RRC_IDLE state), it is obvious that the same principle is applicable to a random signal (or channel) for the purpose of indicating additional information (e.g., a presence or non-presence of transmission) of a channel (or signal) having a random purpose. For example, it may be used to support a power saving operation of a UE that uses the 3GPP NR standard may be used in connected mode (or RRC_CONNECTED state).

In the present specification, a UE group generated from sub-grouping UE-group-per-PO (or all of a plurality of UEs capable of expecting a paging in the same PO) according to the present disclosure may be referred to as a UE subgroup. In addition, the UE subgroup according to the present disclosure may be referred to as a UE group for clarity. Hence, the UE-group-per-PO may be subgrouped into a plurality of UE subgroups based on a method proposed in the present disclosure. In the present specification, a WUS common to all UE subgroups belonging to UE-group-per-PO may be referred to as a common WUS and a WUS for a specific UE subgroup among all the UE subgroups belonging to the UE-group-per-PO may be referred to as a group WUS. A UE failing to support a group WUS may be referred to as a legacy UE.

In the present specification, a signal or channel related with a paging may be schematically referred to as a paging. For one example, a paging may refer to a control channel (e.g., PDCCH) related to the paging or a control channel (e.g., PDCCH) scrambled with P-RNTI. For another example, a paging may refer to a paging signal or channel that carries a paging message. In addition, a search space for the paging purpose may be substituted with a control channel (e.g., PDCCH) related to the paging or a control channel (e.g., PDCCH) scrambled with P-RNTI.

In addition, although the description is made based on the LTE standard (e.g., 3GPP technical specification 36 series) in the present specification, the present disclosure is applicable to the 5G/NR system identically/similarly. In this case, regarding a frame structure, a term 'subframe' may be substituted with 'slot' (e.g., refer to FIG. 5 and FIG. 9 and the relevant description) of the 5G/NR system.

Hereinafter, although the methods proposed in the present disclosure are operable in independent manners, respectively, they are obviously usable in a manner of combination unless offending against each other.

First of all, a BS operation and a UE operation to which the present disclosure is applicable are described.

(1) Base Station (BS) Operation

Figure 27:
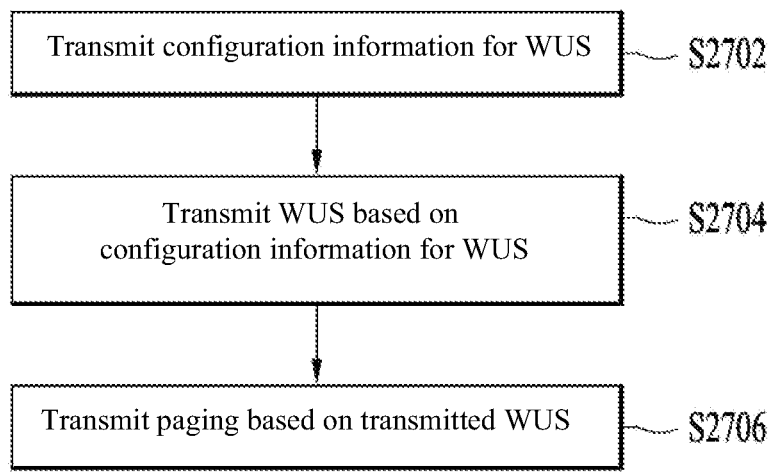
FIG. 27 illustrates a flowchart of a base station operation to which the present disclosure is applicable.

FIG. 27 illustrates a flowchart of a BS operation to which the present disclosure is applicable.

A BS may transmit at least one configuration information for a WUS [S2702]. For example, configuration information for a WUS may be transmitted to a UE through system information (or System Information Block (SIB)) (e.g., SIB1, SIB2, SIB-BR, SIB-NB, etc.) or a higher layer signal (e.g., RRC layer signal).

The BS may transmit a WUS based on the transmitted configuration information [S2704]. For example, the WUS may be transmitted based on a UE subgroup (or one or more UEs belonging to a UE subgroup) according to the present disclosure. Particularly, the WUS may be generated based on one or combination of the methods (e.g., see sections H.1 to H.6 in the following) described in detail in the following and/or mapped/multiplexed to a time/frequency resource and/or indicate the corresponding UE subgroup.

The BS may transmit a paging (or a paging signal or a paging channel) based on the transmitted WUS [S2706]. For example, the paging may be transmitted based on a UE subgroup. Particularly, the paging may be transmitted based on a UE subgroup indicated by the WUS (or to one or more UEs belonging to the UE subgroup).

(2) UE Operation

Figure 28:
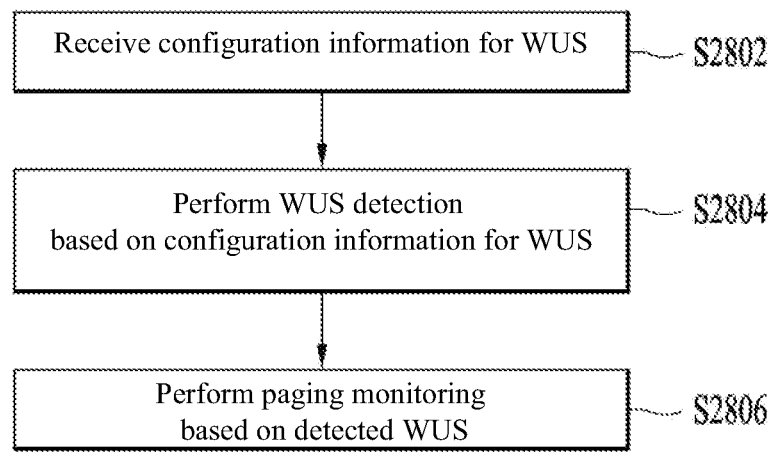
FIG. 28 illustrates a flowchart of a UE operation to which the present disclosure is applicable.
Figure 29:
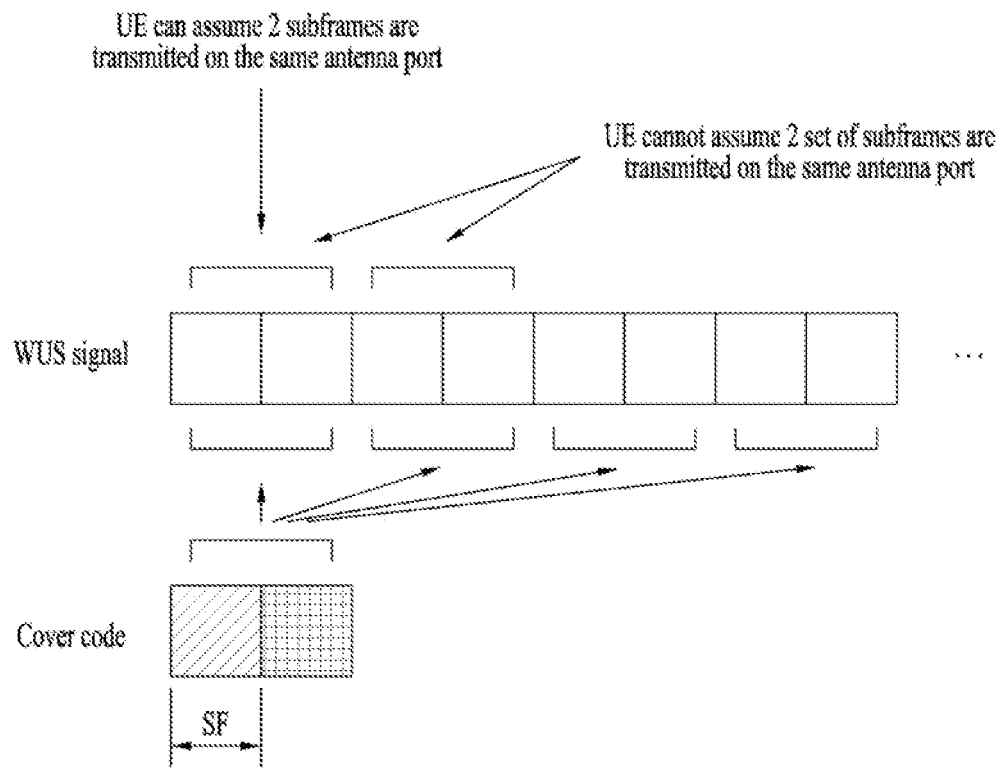
FIGS. 29 to 37 illustrate examples to which the methods proposed by the present disclosure are applied.

FIG. 28 illustrates a flowchart of a UE operation to which the present disclosure is applicable.

A UE may receive at least one configuration information for a WUS [S2802]. For example, configuration information for a WUS may be received from a BS through system information (or System Information Block (SIB)) (e.g., SIB1, SIB2, SIB-BR, SIB-NB, etc.) or a higher layer signal (e.g., RRC layer signal).

The UE may perform WUS detection based on the received configuration information [S2804]. For example, the WUS may be transmitted based on a UE subgroup (or one or more UEs belonging to a UE subgroup) according to the present disclosure. Particularly, the WUS may be generated based on one or combination of the methods (e.g., see sections H.1 to H.6 in the following) described in detail in the following and/or mapped/multiplexed to a time/frequency resource and/or indicate the corresponding UE subgroup. The UE may perform WUS detection based on based on one or combination of the methods (e.g., see sections H.1 to H.6 in the following) described in detail in the following and identify a UE subgroup to which the UE belongs based on the detected WUS.

The UE may perform a paging monitoring based on the detected WUS [S2806]. For example, the paging may be transmitted based on a UE subgroup. Particularly, the paging may be transmitted based on a UE subgroup indicated by the WUS (or to one or more UEs belonging to the UE subgroup).

Term Definition

CDM: code division multiplexing
TDM: time division multiplexing
FDM: frequency division multiplexing
NWUS: narrowband wake up signal
MWUS: MTC (machine type communication) wake up signal
ZC sequence: Zadoff-Chu sequence
FFT: fast Fourier transform
OFDM: orthogonal frequency division multiplexing SIB: system information block (e.g., SIB1, SIB2, SIB-BR, SIB-NB, etc.)

RRC: radio resource control

PO: paging occasion

NPDCCH: narrowband physical downlink control channel

MPDCCH: MTC (machine type communication) physical downlink control channel

MME: Mobility Management Entity

SINR: signal to Interference and Noise Ratio

TAU: tracking area update

Rmax: maximum repetition count of PDCCH (e.g., NPDCCH or MPDCCH), receivable/configurable through higher layer signal (e.g., RRC layer signal)

PRB: physical resource block

DRX: discontinuous reception eDRX: extended/enhanced discontinuous reception

H.1 Code Division Multiplexing (CDM) Based UE Subgrouping

For the purpose of UE subgrouping, a UE subgroup classification scheme using a signal of WUS is available. In the proposed method, each of different UEs expecting a WUS on the same time/frequency resource may be classified through a WUS signal configured for a UE subgroup of its own. Alternatively, when transmissions of different WUSs overlap each other in aspect of time/frequency resource, the proposed method may be used to share or classify a resource. Thus, the classification scheme using the signal of WUS allows different WUSs to share the time/frequency resource entirely or in part, thereby obtaining a gain of reducing resource overhead.

The UE subgrouping through the classification of the WUS may be applicable in a manner of combining one or more methods (i.e., Method-CDM-1, Method-CDM-2, Method-CDM-3, Method-CDM-4, Method-CDM-5, and Method-CDM-6) proposed below.

For reference, in the Rel-15 NB-IoT and eMTC standard (e.g., 3GPP Technical Specification (TS) 36.211 V15.2.0), after a sequence for WUS (or a sequence used in WUS) has been generated, a WUS signal may be transmitted and/or received based on the generated sequence. For example, a sequence w(m) for UE (or used in WUS) may be generated based on Equation 3.

$$w(m) = \theta_{n_f,n_s}(m') \cdot e^{-\frac{j\pi un(n+1)}{131}} \quad \text{[Equation 3]}$$

$$m = 0, 1, \ldots, 131$$

$$m' = m + 132x$$

$$n = m \bmod 132$$

$$\theta_{n_f,n_s}(m') = \begin{cases} 1 & \text{if } c_{n_f,n_s}(2m') = 0 \text{ and } c_{n_f,n_s}(2m'+1) = 0 \\ -1 & \text{if } c_{n_f,n_s}(2m') = 0 \text{ and } c_{n_f,n_s}(2m'+1) = 1 \\ j & \text{if } c_{n_f,n_s}(2m') = 1 \text{ and } c_{n_f,n_s}(2m'+1) = 0 \\ -j & \text{if } c_{n_f,n_s}(2m') = 1 \text{ and } c_{n_f,n_s}(2m'+1) = 1 \end{cases}$$

$$u = (N_{ID}^{Ncell} \bmod 126) + 3$$

In Equation 3, x indicates a WUS transmitted subframe and may have a value of 0 to M−1. M indicates the number of the WUS transmitted subframes and corresponds to a WUS actual duration. In Equation 3, $$e^{-\frac{j\pi un(n+1)}{131}}$$

indicates a ZC sequence, and $\theta_{n_f,n_s}(m')$ indicates a complex value related with a scrambling sequence (e.g., $c_{n_f,n_s}(i)$). $\theta_{n_f,n_s}(m')$ may be obtained in a manner of mapping two bits of a scrambling sequence (e.g., $c_{n_f,n_s}(i)$) to a single complex value. $N_{ID}^{Ncell}$ indicates a physical layer cell identity. $c_{n_f,n_s}(i)$ indicates a scrambling sequence and may have a sample length of 2*132M. And, i may have a value of 0 to 2*132M−1. A scrambling sequence may be given based on a gold sequence. For example, a scrambling g sequence c(n) may be given based on Equation 4, $x_1(n)$ and $x_2(n)$ in Equation 4 indicate a gold sequence of length 31, $x_1(n)$ may be initialized based on $x_1(0)=1$ and $x_1(n)=0$ (where n=1, 2 ... 30, and $x_2(n)$ may be initialized based on $c_{init}=\Sigma_{i=0}^{30} x_2(i) \cdot 2^i$. An initialization value $c_{init}$ of a scrambling sequence may be given based on Equation 5. In Equation 5, $c_{init\_WUS}$ may be usable as $c_{init}$, $n_{f\_start\_PO}$ indicates a first (the very beginning) of a first (the very beginning) PO related with a WUS signal, and $n_{s\_start\_PO}$ indicates a first (the very beginning) slot of a first (the very beginning) PO related with a WUS.

$$c(n) = (x_1(n+N_C) + x_2(n+N_C)) \bmod 2 \quad \text{[Equation 4]}$$
$$x_1(n+31) = (x_1(n+3) + x_1(n)) \bmod 2$$
$$x_2(n+31) = (x_2(n+3) + x_2(n+2) + x_2(n+1) + x_2(n)) \bmod 2$$

$$c_{init\_WUS} = (N_{ID}^{Ncell} + 1) \quad \text{[Equation 5]}$$
$$\left(\left(10 n_{f\_start\_PO} + \left\lfloor \frac{n_{s\_start\_PO}}{2} \right\rfloor\right) \bmod 2048 + 1\right) 2^9 + N_{ID}^{Ncell}$$

[Method-CDM-1] Method of Including UE Subgroup Information in Determining an Initialization Value of a Scrambling Sequence Used for Generation of WUS Proposed in Method-CDM-1 is a method of using a scrambling sequence including UE subgroup information in generating a WUS signal. Since the proposed method follows a predefined basic generation scheme of WUS, it is advantageous in that the increase of complexity barely occurs in aspects of UE and BS implementation and signal generation.

(Specific Method of UE Subgrouping in Method-CDM-1)

As a typical example of Method-CDM-1, an initialization value (e.g., $c_{init\_WUS}$ or $c_{init}$) of a scrambling sequence used for the generation of a WUS signal (e.g., NWUS or MWUS signal) defined in 3GPP TS 36.211 V15.2 (e.g., see Equations 3 to 5 and the relevant description) may be substituted with such an equation as Eq-CDM-1 to include UE subgrouping information. In the equation of Eq-CDM-1, $c_g$ is a parameter used to represent UE subgrouping information and one or more values of {0, 1, 2, 3} are usable. The rest of $N_{ID}^{Ncell}$ (in case of MTC, it is $N_{ID}^{Ncell}$, which is identically applied to the following description without separate description), $n_{f\_start\_PO}$, and $n_{s\_start\_PO}$ follow the definition of 3GPP TS 36.211 V15.2.0 (e.g., see Equations 3 to 5 and the relevant description). It is advantageous in that the method of Eq-CDM-1 may add a sequence for the UE subgrouping purpose with almost no influence on a legacy UE by maintaining the sequence classification capability of Rel-15 WUS.

$$c_{init\_WUS} = c_g \cdot 2^{29} + (N_{ID}^{Ncell} + 1)$$ [Equation Eq-CDM-1]
$$\left(\left(10 n_{f\_start\_PO} + \left\lfloor \frac{n_{s\_start\_PO}}{2} \right\rfloor\right) \bmod 2048 + 1\right)$$
$$2^9 + N_{ID}^{Ncell}$$

As another typical example of Method-CDM-1, an initialization value (e.g., $c_{init\_WUS}$ or $c_{init}$) of a scrambling sequence used for the generation of a WUS signal (e.g., NWUS or MWUS signal) defined in 3GPP TS 36.211 V15.2.0 (e.g., see Equations 3 to 5 and the relevant description) may be substituted with such an equation as Eq-CDM-2 to include UE subgrouping information. In the equation of Eq-CDM-2, $c_g$ is a parameter used to represent UE subgrouping information and one or more values of $\{0, 1, 2, \ldots, 2^{11-\alpha}\}$ are usable. Here, $\alpha$ is a parameter for determining the number of UE subgroups and may use a value predetermined by the standard or include a value configured by higher layer signaling transmitted by a BS. The rest of $N_{ID}^{Ncell}$, $n_{f\_start\_PO}$, and $n_{s\_start\_PO}$ follow the definition of 3GPP TS 36.211 V15.2.0 (e.g., see Equations 3 to 5 and the relevant description). The method of Eq-CDM-2 may add information for the UE subgrouping purpose instead of reducing a quantity of information on PO in a sequence of Rel-15 WUS. In this case, it is advantageous in that a total quantity of information represented using a scrambling sequence can be maintained identically.

$$c_{init\_WUS} = (N_{ID}^{Ncell} + 1)$$ [Equation Eq-CDM-2]
$$\left(\left(10 n_{f\_start\_PO} + \left\lfloor \frac{n_{s\_start\_PO}}{2} \right\rfloor + c_g \cdot 2^\alpha + 1\right)\right.$$
$$\left. \bmod 2048 + 1\right) 2^9 + N_{ID}^{Ncell}$$

(Group Common Indication Method in Method-CDM-1)

In the method of Method-CDM-1, a portion of a UE subgrouping parameter may be used for the purpose of a common indicator to represent information on the entire or a plurality of UE subgroups. For instance, in the examples of Eq-CDM-1 and Eq-CDM-2, $c_g=0$ may be used to provide common information to all UEs that monitor a corresponding WUS transmission position. In the equations of Eq-CDM-1 and Eq-CDM-2, if $c_g=0$, it has the same value as a scrambling sequence initialization value of Rel-15 WUS. In this case, backward compatibility usable for the purpose of awakening a Rel-15 UE is guaranteed. In case that $c_g$ is a different value except a constant of a common indicator purpose, a value of each $c_g$ is used to generate a scrambling sequence of a WUS signal configured per UE subgroup. Each UE may attempt detection of a WUS signal using $c_g$ of a UE subgroup to which the UE belongs and $c_g$ used for the common indicator purpose. If succeeding in the detection of the WUS signal for which one of a plurality of $c_g$ values available for the corresponding UE is used at a specific WUS transmission timing, the corresponding UE performs an operation associated with WUS.

[Method-CDM-2] Method of Including UE Subgroup Information in a ZC Sequence Used for Generation of WUS Method-CDM-2 proposes a method of generating a WUS signal in a manner of including UE subgrouping information in generation of a ZC sequence. Since the proposed method follows the predefined basic generation scheme of WUS (e.g., see Equations 3 to 5 and the relevant description), it is advantageous in that the increase of complexity barely occurs in aspects of UE and BS implementation and signal generation.

(Specific Method of UE Subgrouping in Method-CDM-2)

As one typical example of Method-CDM-2, an equation of generating a 'u' value necessary for an equation $$e^{-\frac{j\pi un(n+1)}{131}}$$

corresponding to a ZC sequence used for the generation of a WUS signal (e.g., NWUS or MWUS signal) defined in 3GPP TS 36.211 V15.2.0 (e.g., see Equations 3 to 5 and the relevant description) may be substituted with such an equation as Eq-CDM-3 to include UE subgrouping information. In the equation of Eq-CDM-3, $c_g$ is a parameter used to represent UE subgrouping information and one or more values of $\{1, 2 \ldots \alpha\}$ are usable. Here, a is a parameter for determining the number of UE subgroups and may use a value predetermined by the standard or include a value configured by higher layer signaling transmitted by a BS. For example, a may have a value of 2 or 3. $N_{ID}^{Ncell}$ follows the definition of 3GPP TS 36.211 V15.2.0 (e.g., see Equations 3 to 5 and the relevant description). The method of Eq-CDM-3 may add information for the UE subgrouping purpose instead of reducing a quantity of information on Cell ID in an expression formula of a ZC sequence. In this case, information on Cell ID may be guaranteed through a scrambling sequence of a WUS signal.

$$u=(N_{ID}^{Ncell} \bmod 126) \cdot c_g/\alpha+3$$ [Equation Eq-CDM-3]

(Group Common Indication Method in Method-CDM-2)

In the method of Method-CDM-2, a portion of a UE subgrouping parameter may be used for the purpose of a common indicator to represent information on the entire or a plurality of UE subgroups. For instance, in the example of Eq-CDM-3, $c_g=\alpha$ may be used to provide common information to all UEs that monitor a corresponding WUS transmission position. In the equation of Eq-CDM-3, if $c_g=\alpha$, it has the same expression as a ZC sequence of Rel-15 WUS. In this case, backward compatibility usable for the purpose of awakening a Rel-15 UE is guaranteed. In case that $c_g$ is a different value except a constant of a common indicator purpose, a value of each $c_g$ is used to generate a ZC sequence of a WUS signal configured per UE subgroup. Each UE may attempt detection of a WUS signal using $c_g$ of a UE subgroup to which the UE belongs and $c_g$ used for the common indicator purpose. If succeeding in the detection of the WUS signal for which one of a plurality of $c_g$ values available for the corresponding UE is used at a specific WUS transmission timing, the corresponding UE performs an operation associated with WUS.

[Method-CDM-3] Method of Including UE Subgroup Information Using RE Level Cover Code Method-CDM-3 proposes a method of applying an RE level cover code to include UE subgroup information in a WUS signal. Since the proposed method follows the basic generation scheme of the predefined WUS (e.g., see Equations 3 to 5 and the relevant description), it is advantageous in that the increase of complexity barely occurs in aspects of UE and BS implementation and signal generation. In addition, the classification by a cover code may facilitate the simultaneous blind detection of two or more informations without the increase of complexity in case that a UE performs signal detection after Fourier transform (e.g., FFT) operation.

(Specific Method of UE Subgrouping in Method-CDM-3)

As one typical example of Method-CDM-3, it may be able to use a method of adding an RE level cover code in order to apply UE subgrouping to a WUS signal (e.g., NWUS or MWUS signal) defined in 3GPP TS 36.211 V15.2.0. Here, the cover code may use a binary sequence $b_q(m)$ used for the generation of Narrowband Secondary Synchronization Signal (NSSS) defined in 3GPP TS 36.211 V15.2.0. In this case, a sequence w(m) for WUS may be generated based on a complex value related to a scrambling sequence, a ZC sequence, and a cover code (or multiplication thereof). For example, an equation of generating a sequence w(m) for WUS may be substituted with an equation Eq-CDM-4 and Table 13 illustrates $b_q(m)$.

$$w(m) = b_q(m) \cdot \theta_{n_f,n_s}(m') \cdot e^{-\frac{j\pi un(n+1)}{131}} \quad \text{[Equation Eq-CDM-4]}$$

TABLE 13

| q | $b_q(0), ..., b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 -1 -1 1-1 1 1 1-1 -1 1 1-1 1-1 -1 1 1-1 1-1 -1 1 1-1 1-1 -1 1 1 -1 -1 1-1 1 1 1-1 -1 1 1 1-1 -1 1 1-1 1-1 -1 1-1 1 1-1 1 1 1-1 -1 1-1 1 1 1-1 1-1 -1 1 1-1 1-1 -1 1 1-1 -1 1-1 1 1 1-1 -1 1 1 1-1 -1 1 -1 1-1 -1 1-1 1 1 1-1 -1 1 1 1-1 -1 1 1-1 -1 1-1 1 1 1-1 -1 1 1 1 1 -1] |
| 2 | [1-1 -1 1-1 1 1 1-1 -1 1 1-1 1-1 -1 1 1 -1 -1 1-1 1 1-1 1 1 1-1 -1 1-1 1 1 1-1 -1 1 1 1-1 -1 1-1 1 1 1-1 -1 1 1 1-1 -1 1-1 1 1 1-1 -1 1 1-1 -1 1-1 1 1 1-1 -1 1 1 1-1 -1 1-1 1 1 1-1 -1 1 1-1 -1 1-1 1 1 1-1 -1 1 1 1-1 -1 1-1 1 1 1-1 -1 1 1 1-1 -1 1 1-1 -1 1 1-1 -1 1-1 1 1 1-1 -1 1 1 -1 1 1] |
| 3 | [1-1 -1 1-1 1 1 1-1 -1 1 1-1 1-1 -1 1 1 -1 -1 1 1 1-1 -1 1 1-1 1-1 -1 1 1-1 1-1 -1 1 1-1 -1 1 1 1-1 -1 1 1-1 -1 1 1 1-1 -1 1 1-1 -1 1 1 1-1 -1 1-1 1 1 1-1 -1 1-1 -1 1-1 1 1 1-1 -1 1 1 1-1 -1 1 1 1 1 -1 1 1-1 -1 1-1 1 1 1-1 -1 1 1 1 1 -1 1 1-1 -1 1-1 1 1 1-1 -1 1 1 1-1 -1 1 -1 1-1 -1 1 1 -1] |

Alternatively, a cover code may be available in a manner of applying the principle of the formula $e^{-j2\pi\theta_f n}$ for the application of a cyclic shift used for the generation of NSSS defined in 3GPP TS 36.211 V15.2.0. In this case, a sequence w(m) for WUS may be generated based on a complex value related to a scrambling sequence, a ZC sequence, and a cyclic shift. For example, the equation of generating the sequence w(m) for WUS of Equation 3 may be substituted with the equation Eq-CDM-5. In the equation Eq-CDM-5, $\theta_f$ indicates a value (or size) of a cyclic shift.

$$w(m) = \theta_{n_f,n_s}(m') \cdot e^{-\frac{j\pi un(n+1)}{131}} \cdot e^{-j2\pi\theta_f n} \quad \text{[Equation Eq-CDM-5]}$$

(Group Common Indication Method in Method-CDM-2)

In the method of Method-CDM-3, a portion of a UE subgrouping parameter may be used for the purpose of a common indicator to represent information regarding the entire or a plurality of UE subgroups. For instance, if a cover code uses a binary sequence $b_q(m)$ used for the generation of NSSS defined in 3GPP TS 36.211 V15.2.0, a binary sequence (e.g., all one sequence in Table 13) corresponding to q=0 may be usable for the purpose of a common indicator. Hence, a WUS sequence generated based on the all one sequence (e.g., a binary sequence corresponding to q=0 in Table 13) may be usable for a common WUS (or a WUS common to all UE subgroups related to the same PO or a WUS common to all UE subgroups belonging to UE-group-per-PO). On the other hand, the rest of the binary sequences (e.g., a binary sequence corresponding to q that is not 0 in Table 13) except the all one sequence may be usable for a group WUS (or a WUS for a specific UE subgroup to which a UE belongs among all UE subgroups or a WUS for a specific UE subgroup among all UE subgroups belonging to UE-group-per-PO). In this case, a UE may attempt to detect a common WUS based on a WUS sequence generated based on the all one sequence (e.g., a binary sequence corresponding to q=0 in Table 13) or a group WUS based on the rest of the binary sequences (e.g., a binary sequence corresponding to q that is not 0 in Table 13) except the all one sequence [e.g., see S2804 in FIG. 28]. ABS may transmit a common WUS based on a WUS sequence generated based on the all one sequence (e.g., a binary sequence corresponding to q=0 in Table 13) or a group WUS based on the rest of the binary sequences (e.g., a binary sequence corresponding to q that is not 0 in Table 13) except the all one sequence [e.g., see S2704 in FIG. 27].

A value of 'q' indicating a binary sequence may be indicated explicitly or implicitly through configuration information for WUS (e.g., see S2702 in FIG. 27 or S2802 in FIG. 28). For example, configuration information for WUS may include information indicating the number of UE subgroups related to PO, and the q value may be implicitly indicated based on the number of UE subgroups and/or UE identification information (e.g., UE_ID). Alternatively, for example, configuration information for WUS may include information explicitly indicating the q value.

For another example, when a cover code is used in a manner of applying the principle of the formula $e^{-j2\pi\theta_f n}$ of a cyclic shift used for the generation of NSSS defined in 3GPP TS 36.211 V15.2.0, a case that a value of the cyclic shift is $\theta_{f=0}$ may be used for the purpose of a common indicator. Hence, a WUS sequence in which a cyclic shift value $\theta_{f=0}$ may be used for a common WUS (or a WUS common to all UE subgroups related to the same PO or a WUS common to all UE subgroups belonging to UE-group-per-PO). On the other hand, a WUS in which a cyclic shift value $\theta_f$ is not 0, may be used for a group WUS (or a WUS for a specific UE subgroup to which a UE belongs among all UE subgroups related to PO or a WUS for a specific UE subgroup among all UE subgroups belonging to UE-group-per-PO). In this case, a UE may attempt to detect a common WUS based on a WUS sequence with a cyclic shift value $\theta_{f=0}$ or may attempt to detect a group WUS based on a WUS sequence with a cyclic shift value $\theta_f$ is not 0 [e.g., see S2804 in FIG. 28]. A BS may transmit a common WUS based on a WUS sequence generated based on a WUS sequence with a cyclic shift value $\theta_{f=0}$ or may transmit a group WUS based on a WUS sequence with a cyclic shift value $\theta_f$ is not 0 [e.g., see S2704 in FIG. 27].

The value $\theta_f$ of a cyclic shift may be explicitly or implicitly indicated through configuration information for WUS (e.g., see S2702 in FIG. 27 or S2802 in FIG. 28). For example, configuration information for WUS may include information indicating the number of UE subgroups related to PO, and the cyclic shift value $\theta_f$ may be implicitly indicated based on the number of UE subgroups and/or UE identification information (e.g., UE_ID). Alternatively, for example, configuration information for WUS may include information explicitly indicating the cyclic shift value $\theta_f$.

In case of the above example (e.g., in case of being used for the purpose of a common indicator), backward compatibility usable for the purpose of awakening an Rel-15 UE is guaranteed.

[Method-CDM-4] Method of Including UE Subgroup Information Using OFDM Symbol Level Cover Code Method-CDM-4 proposes a method of applying an OFDM symbol level cover code to include UE subgroup information in a WUS signal. Since the proposed method follows the basic generation scheme of the predefined WUS (e.g., see Equations 3 to 5 and the relevant description), it is advantageous in that the increase of complexity barely occurs in aspects of UE and BS implementation and signal generation. In addition, the symbol level cover code has an advantage that a UE can perform two or more blind detections simultaneously with low complexity even in a signal detection process that skips a Fourier transform (e.g., FFT) operation.

(Specific Method of UE Subgrouping in Method-CDM-4)

As one typical example of Method-CDM-4, it may be able to use a method of adding an OFDM symbol level cover code to apply UE subgrouping to a WUS signal (e.g., NWUS or MWUS signal) defined in 3GPP TS 36.211 V15.2.0.

(Group Common Indication Method in Method-CDM-4)

In a method of Method-CDM-4, all one sequence (e.g., q=0 in Table 13) may be used as a cover code for the purpose of representing information on the entire or a plurality of UE subgroups. In this case, when all one sequence is used, backward compatibility usable for the purpose of awakening an Rel-15 UE is guaranteed.

[Method-CDM-5] Method of Including UE Subgroup Information Using Subframe Level Cover Code Method-CDM-5 proposes a method of applying a subframe level cover code to include UE subgroup information in a WUS signal. Since the proposed method follows the basic generation scheme of the predefined WUS (e.g., see Equations 3 to 5 and the relevant description), it is advantageous in that the increase of complexity barely occurs in aspects of UE and BS implementation and signal generation. Particularly, when a subframe level cover code is used, since a signal detection process in a single subframe is identical irrespective of a presence or non-presence of application of a cover code, a considerable gain can be obtained in aspect of complexity.

(Specific Method of UE Subgrouping in Method-CDM-5)

Type of applying a cover code in Method-CDM-5

When Method-CDM-5 is used, a cover code of $N_{cover}$ length is applicable in unit of $N_{cover}$ subframes from a subframe in which transmission of WUS starts. If an actual transmission length of WUS is $N_T$, the WUS is applied in a manner that the same cover code is repeated $N_T/N_{cover}$ times.

Antenna port assumption in Method-CDM-5

In this case, a UE may assume that a WUS uses the same antenna port during a subframe to which a cover code of minimum $N_{cover}$ length is applied to recognize a cover code. On the other hand, after the application of the cover code of the $N_{cover}$ length has ended, if the repetition of the cover code starts again, the antenna port may be changed. The following description will be made in consideration of a general case. The same antenna port assumption of a signal or channel (or a time, frequency, space and/or code domain resource in which an antenna port can be assumed as the same in a signal or channel transmitted duration) may be changed between different UEs, which may be determined by a capability difference of UE or a difference of configuration by a BS.

In case of Rel-15 WUS, a UE is unable to assume that a WUS transmitted in two consecutive subframes may be transmitted through the same antenna port. Hence, due to the nature of Method-CDM-5 that requires assumption of the same antenna port for the classification of US subgroups, a Rel-15 UE may recognize all per-UE subgroup WUSs to which Method-CDM-5 is applied are indication to itself. Hence, in case that Method-CDM-5 is applied, backward compatibility for a legacy WUS capable UE is satisfied.

Additionally, if a beam related operation is applied to WUS, the WUS may have the same beam direction with other Reference Signal (RS), Synchronization Signal (SS), PDCCH, PDSCH and the like, and may be configured therefor.

In particular, WUS may have the spatially Quasi-CoLocation (QCL) relationship with other RS, SS, PDCCH, PDSCH and the like (in aspect of specific spatial Rx parameter).

In case that the large-scale property of a symbol carried channel on one antenna port is inferable from a symbol carried channel on another antenna port, the two antenna ports may be regarded as having Quasi Co-located/Quasi Co-Location (QC/QCL) relationship. Here, the large-scale property includes one or more of delay spread, Doppler spread, frequency shift, average received power, and receiving timing.

Example of a case that a length of a cover code is 2 in Method-CDM-5

Figure 40:
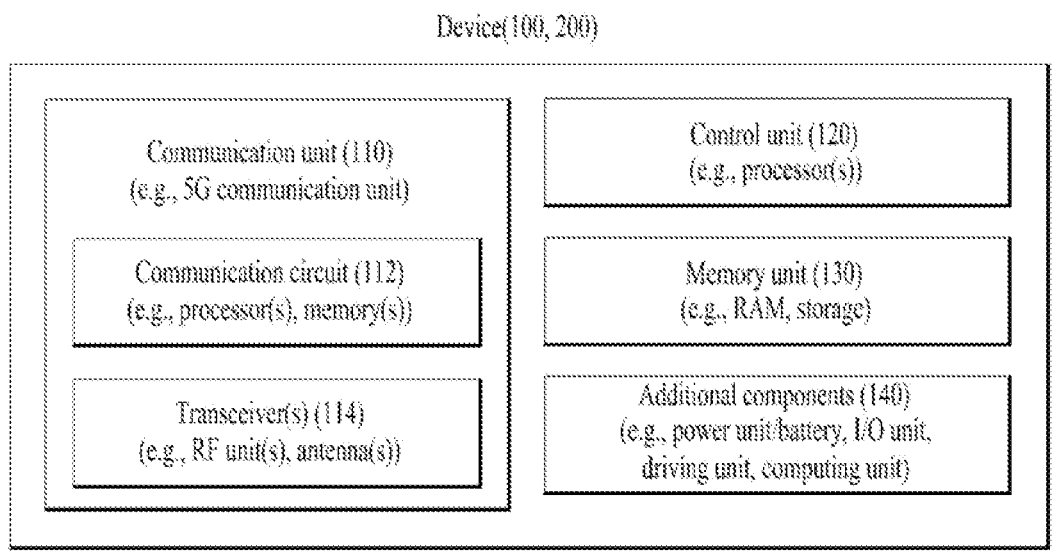

For one typical example, in case of $N_{cover}=2$, a UE may apply a cover code in unit of 2 subframes from a subframe in which transmission of WUS starts. In this case, the number of available cover codes may be equal to the number of UE subgroups that can be classified and operated by a BS. FIG. 40 diagrammatizes one example of a structure of applying the method of Method-CDM-5 according to the above example. Although the example of FIG. 40 assumes a case that a length of a cover code is 2 ($N_{cover}=2$) to help the understanding, the present disclosure is non-limited by such a case and applicable to a case of using a cover code of a different length without restriction.

In the following Ex-CDM-5-1, Ex-CDM-5-2, Ex-CDM-5-3, and Ex-CDM-5-4, examples of specific cover code settings in case that a length of a cover code is 2 in Method-CDM-5 are illustrated.

(Ex-CDM-5-1) In case of $N_{cover}=2$, for example, a cover code may be determined to operate 2 UE subgroups using the form of an orthogonal cover code. If the two cover codes used in this example are $[S_{2n}, S_{2n+1}]$ and $[S_{2n}, S^*_{2n+1}]$, respectively, a UE determines whether the relationship of WUS signal in a pair of two subframes to which the cover code is applied meets the conjugate complex form, thereby confirming a UE subgroup index. $S^*_{2n+1}$ indicates a conjugate complex number of $S_{2n+1}$.

(Ex-CDM-5-2) For example, it is able to consider a case of intending to operate 3 UE subgroup indicators when $N_{cover}=2$. In this case, since it is unable to represent all combinations with the conjugate complex relationship of signals, a cover code of a 2-dimensional vector form may be operated in a manner of performing a multiplication operation in subframe unit. In doing so, the cover code may use the forms of $[1,\exp(j2\pi/3\cdot 0)]$, $[1,\exp(j2\pi/3\cdot 1)]$, and $[1,\exp(j2\pi/3\cdot 2)]$ which may intend to uniformly maximize the classification of the cover codes between UE subgroup indexes.

(Ex-CDM-5-3) For example, it is able to consider a case of intending to operate 3 UE subgroup indicators when $N_{cover}=2$. In this case, since it is unable to represent all combinations with the conjugate complex relationship of signals, a cover code of a 2-dimensional vector form may be operated in a manner of performing a multiplication operation in subframe unit. In doing so, regarding the cover codes, two cover codes maintain orthogonal relationship with each other and the other one may have a π/2 deviation in its phase, and for example, such forms as [1, 1], [1, −1], and [1, exp(jπ/2)] may be used. Namely, the two cover codes in the orthogonal relationship may intend to maintain orthogonality for the purpose of independently indicating each UE subgroup and the other one cover code may intend to indicate 2 UE subgroups all.

(Ex-CDM-5-4) For example, it is able to consider a case of intending to operate 4 UE subgroup indicators when $N_{cover}=2$. In this case, since it is unable to represent all combinations with the conjugate complex relationship of signals, a cover code of a 2-dimensional vector form may be operated in a manner of performing a multiplication operation in subframe unit. In doing so, the cover codes may use such forms as [1,exp(j2π/4·0)], [1,exp(j2π/4·1)] [1,exp(j2π/4·2)], and [1,exp(j2π/4·3)] which may intend to uniformly maximize the classification of the cover codes between UE subgroup indexes.

(Group Common Indication Method in Method-CDM-5)

In case that such a cover code as Ex-CDM-5-2 is used, two of three cover codes may be used for the purpose of classifying 2 UE subgroups and the other may be used for the purpose of a common indicator to give indication of information to all UEs that monitor a corresponding WUS transmission position.

In case that such a cover code as Ex-CDM-5-3 is used, two cover codes (e.g., [1, 1] and [1, −1]) in orthogonal relationship may be used for the purpose of classifying 2 UE subgroups and the other may be used for the purpose of a common indicator to give indication of information to all UEs that monitor a corresponding WUS transmission position.

In case that such a cover code as Ex-CDM-5-4 is used, two cover code pairs in orthogonal relationship may be used for the purpose of classifying 2 UE subgroups, one cover code may be used for the purpose of a common indicator to give indication of information to all UEs that monitor a corresponding WUS transmission position, and the other may be used for an Rel-15 WUS capable UE only. In case of a UE having capability of UE subgrouping WUS, using a cover code corresponding to a UE subgroup of the UE and a cover code for the purpose of a common indicator to give indication to all UEs, the UE may determine whether information is indicated to the UE itself.

[Method-CDM-6] Method of Including UE Subgroup Information by Differentiating Initialization Values of a ZC Sequence Used for Generation of WUS and/or a Scrambling Sequence at the Subframe Level Method-CDM-6 proposes a method of performing re-initialization of a ZC sequence or a scrambling sequence at a subframe level to include UE subgroup information in a WUS signal. Since the proposed method follows the basic generation scheme of the predefined WUS (e.g., see Equations 3 to 5 and the relevant description), it is advantageous in that the increase of complexity barely occurs in aspects of UE and BS implementation and signal generation. In addition, it is advantageous in that the proposed method may easily increase the number of expressible UE subgroups in a manner of applying to a case that the number of the expressible UE subgroups is limited due to the shortage of the number of ZC sequences and the scrambling initialization value (e.g., $c_{init\_WUS}$).

(Specific Method of UE Subgrouping in Method-CDM-6)

Method of changing a ZC sequence periodically

As a typical example of Method-CDM-6, it is able to consider a method of periodically changing a value 'u' necessary for a formula $$e^{-\frac{j\pi un(n+1)}{131}}$$

corresponding to a ZC sequence used for the generation of a WUS signal (e.g., NWUS or MWUS signal) defined in 3GPP TS 36.211 V15.2.0. Here, the period may be a value predetermined by the standard or a value configured by a BS. The period may be determined as $N_{S-SF1}$ subframes. Here, the ZC sequence of the WUS signal may be maintained identically in $N_{S-SF1}$ consecutive subframes of every period. For example, the $N_{S-SF1}$ value may be determined as 2. In addition, a reference for a start of the period may be determined as a starting subframe in which transmission of WUS starts, and the calculation of $N_{S-SF1}$ may be determined as an absolute subframe (e.g., the absolute subframe refers to a subframe index calculated with reference to the time that has progressed, whether or not it is used for actual transmission). This may intend to determine that the same ZC sequence is used between subframes that use the same antenna port in consideration of the antennae port assumption defined in the current Rel-15 NB-IoT/MTC standard, which may be the purpose of facilitating coherent combining between subframes for which the same antenna port assumption is possible.

In the current Rel-15 NB-IoT/MTC standard, the u value for determining the ZC sequence is set to be determined by a cell ID (e.g., $N_{ID}^{Ncell}$) only [see Equation 3]. In case that Method-CDM-6 is applied, the u value may be set to reflect information of an absolute subframe together with information of cell ID. For example, the information of the absolute subframe may be set to a value resulting from taking a modular (or modulo) operation on an absolute subframe interval, which is spaced apart from a starting subframe of WUS, with $N_{S-SF1}$.

Method of periodically performing initialization of a scrambling sequence

As a typical example of Method-CDM-6, it is able to consider a method of periodically reconfiguring an initialization value (e.g., $c_{init\_WUS}$) of a WUS signal defined in 3GPP TS 36.211 V15.2.0. Here, the period may be a value predetermined by the standard or a value configured by a BS. The period may be determined as $N_{S-SF2}$ subframes. Here, the scrambling sequence of the WUS signal may be set to have a continuous value in $N_{S-SF2}$ consecutive subframes of every period. In addition, a reference for a start of the period may be determined as a starting subframe in which transmission of WUS starts.

H.2 Time Division Multiplexing (TDM) Based UE Subgrouping

For the purpose of UE subgrouping, a UE subgroup classification scheme using a time resource for transmitting a signal of WUS may be available. In the proposed method, different UEs expecting WUS on the same frequency resource can be classified by a WUS transmission interval determined based on a UE subgroup. If a TDM based method is used, since a WUS signal can be maintained identical to an existing WUS to which UE subgrouping is not applied, it is advantageous in that the increase of complexity can be reduced in aspects of UE and BS implementation and signal generation. In addition, since the number of WUS signals transmitted at the same timing is not increased, a size of power consumed for the transmission of WUS can be maintained advantageously.

UE subgrouping through a transmission interval of a WUS signal is applicable in a manner of combining one or more methods including Method-TDM-1, Method-TDM-2, Method-TDM-3, Method-TDM-4, Method-TDM-5, Method-TDM-6, and Method-TDM-7, proposed below.

[Method-TDM-1] Method of Independently Indicating Information on a Gap Between WUS and PO to Each UE Subgroup Method-TDM-1 proposes a method of indicating information on a gap for configuring a WUS transmitted position independently per UE subgroup. As the proposed method is a method of reusing the configuration scheme of a Rel-15 WUS defined in the existing standard, since a size of an applied gap is changed only in aspect of a UE, complexity may be reduced in aspect of implementation.

(Specific Method of UE Subgrouping in Method-TDM-1)

As a typical example of Method-TDM-1, it is able to consider a method of delivering gap indication information independent per UE subgroup using System Information Block (SIB) or higher layer signaling such as RRC signaling. A UE may acquire information of a gap size fitting a UE subgroup of its own through higher layer signaling and then determine a WUS transmission interval for which the UE will monitor a WUS in a manner of reflecting the acquired information. For example, when a size of a gap configurable by a BS is {40 ms, 80 ms, 160 ms, 240 ms}, each UE subgroup may be configured to use a value of one of the 4 kinds of gaps. In this case, sizes of gaps allocated to the UE subgroups respectively may overlap each other.

[Method-TDM-2] Method of Determining a Gap Between WUS and PO as a Combination of a Common Gap Value and a UE Subgroup Specific Offset Method-TDM-2 proposes a method of indicating information on a gap for configuring a WUS transmitted position as common information for all UE subgroups and applying a size of an actual gap applied per UE subgroup by combining a UE subgroup specific offset. As the proposed method is a method of reusing the configuration scheme of Rel-15 defined in the existing standard, since a size of an applied gap is changed only in aspect of a UE, complexity may be reduced in aspect of implementation.

(Specific Method of UE Subgrouping in Method-TDM-2)

As a typical example of Method-TDM-2, it is able to consider a case that a gap between an ending subframe of a maximum duration of WUS and PO is cell-commonly (or by reference independent from a UE subgroup, e.g., common per carrier, common per narrow band, etc.) indicated using System Information Block (SIB) or higher layer signaling (e.g., RRC signaling).

In this case, a size of a UE subgroup specific offset designated per UE subgroup may be configured independently per UE subgroup using SIB or higher layer signaling such as RRC signaling. A UE may acquire information of an offset fitting a UE subgroup of its own through higher layer signaling and then determine a WUS transmission interval for which the UE will monitor a WUS in a manner of reflecting the acquired information. For example, the relationship between an ending subframe position $g_0$ of a maximum WUS duration, which is calculated using a gap calculated using the above-described method, and $n_{PO}$ that is a position (PO) at which the transmission of paging PDCCH (e.g., NPDCCH) starts may be expressed as such an equation as Eq-TDM-1. In the equation Eq-TDM-1, $L_{common}$ means a size of a gap configured in common to all UE subgroups and $L_{group,i}$ means a size of an offset configured by targeting an $i^{th}$ UE subgroup. Regarding the above-proposed method, if a size of a gap configured in common to all UE subgroups in the example of Eq-TDM-1 is a size of a gap configured for a Rel-15 WUS capable UE and $L_{group,i}=0$, $g_0$ represents an ending subframe of a maximum Rel-15 WUS duration.

$$g_0 = n_{PO} - (L_{common} + L_{group,i} + 1) \quad \text{[Equation Eq-TDM-1]}$$

Alternatively, in this case, a size of a UE subgroup specific offset designated per UE subgroup may be determined in form of a function of combining a size of an offset determined in predetermined size and a UE subgroup index together. In this case, since a UE can be implicitly aware of a size of an offset applied to a UE subgroup to which the UE belongs without separate signaling, overhead can be reduced advantageously. For example, the relationship between an ending subframe position $g_0$ of a maximum WUS duration, which is calculated using a gap calculated using the above-described method, and $n_{PO}$ that is a position (PO) at which the transmission of paging PDCCH (e.g., NPDCCH) starts may be expressed as such an equation as Eq-TDM-2. In the equation Eq-TDM-2, $L_{common}$ means a size of a gap configured in common to all UE subgroups, $L_{group}$ means a size of an offset set to a predetermined size, and $c_g$ is an integer value that means a UE subgrouping parameter configured by targeting a specific UE subgroup. Regarding the above-proposed method, if a size of a gap configured in common to all UE subgroups in the example of Eq-TDM-2 is a size of a gap configured for a Rel-15 WUS capable UE and $c_g=0$, $g_0$ represents an ending subframe of a maximum Rel-15 WUS duration.

$$g_0 = n_{PO} - (L_{common} + L_{group} \cdot c_g + 1) \quad \text{[Equation Eq-TDM-2]}$$

[Method-TDM-3] Method of Generating a Scrambling Sequence of a WUS Signal in Consideration of a TDM Structure Method-TDM-3 proposes a method of if a plurality of transmission positions of a WUS corresponding to one PO exist, determining that a scrambling sequence generation rule of a WUS signal at a different WUS signal transmission position uses the same reference timing point. Namely, if transmission intervals of WUSs having different transmission start points overlap each other, it may intend to guarantee the transmission of all overlapping WUSs without a collision problem. Although the proposed method may be applicable to a WUS transmission interval overlapping problem in a UE subgrouping structure using TDM, it is obvious that the proposed method is generally applied to an overlap problem between WUSs having different transmission positions while indicating information on the same PO.

(Specific Method of Scrambling Sequence Generation in Method-TDM-3)

As a typical example of Method-TDM-3, the generation rule of a scrambling sequence may be set to apply to a plurality of WUS signals having different transmission intervals while indicating information on the same PO with reference to the same timing point. For example, when a subframe in which the transmission of UE subgroup-1 starts and a subframe in which the transmission of UE subgroup-2 starts are spaced apart from each other by $n_{diff}$ WUS transmittable subframes, both of the UE subgroup-1 and the UE subgroup-2 may apply the generation rule of the scrambling sequence with reference to the subframe in which the transmission of the UE subgroup-1 starts.

Regarding the proposed scrambling sequence generation rule with reference to a WUS signal (e.g., NWUS or MWUS signal) defined in 3GPP TS 36.211 V15.2.0, the scrambling sequence generation rule of the UE subgroup-1 may be set to follow the generation rule defined in 3GPP TS 36.211 V15.2.0 exactly [e.g., see Equations 3 to 5 and the relevant description], and the scrambling sequence generation rule of the UE subgroup-2 may be set to start after counting an index of a scrambling sequence usable for $n_{diff}$ WUS transmittable subframes.

Eq-TDM-3 represents the typical example in form of an equation. In Eq-TDM-3, $c_{init\_WUS,i}$ means an initialization value of a scrambling sequence of an $i^{th}$ UE subgroup and $c_{init\_WUS,0}$ means an initialization value of a scrambling sequence of a reference timing point. $N_{WUS\_RE}$ means the number of Res to which a WUS sequence (e.g., w(m) of Equation 3) is mapped with reference to a single subframe, and $n_{diff,i}$ means the number of subframes usable for the purpose of WUS transmission until a point at which WUS transmission of an $i^{th}$ UE subgroup starts after a reference timing point. In this case, if the WUS transmission of the $i^{th}$ UE subgroup precedes the reference timing point, $n_{diff,i}$ may be represented as a negative value.

$$c_{init\_WUS,i} = c_{init\_WUS,0} + N_{WUS\_RE} \cdot n_{diff,i}$$ [Equation Eq-TDM-3]

[Method-TDM-4] Method of Reinitializing a Scrambling Sequence if a Transmission of Another WUS Signal Starts within a Transmission Interval of a Specific WUS Signal Method-TDM-4 proposes a method of if a plurality of transmission positions of a WUS corresponding to one PO exist, reinitializing a scrambling sequence at a starting subframe position of a WUS transmission in which a WUS transmission interval of a relatively advanced timing point is relatively late. Namely, if transmission intervals of a WUS having different transmission start points overlap each other, it may intend to guarantee the transmission of all overlapping WUSs without a collision problem. Although the proposed method may be applicable to a WUS transmission interval overlapping problem in a UE subgrouping structure using TDM, it is obvious that the proposed method is generally applied to an overlapping problem between WUSs having different transmission positions while indicating information on the same PO.

(Specific Method of Scrambling Sequence Generation in Method-TDM-4)

As a typical example of Method-TDM-4, all information on transmission start positions of a plurality of WUS signals having different transmission intervals while indicating information on the same PO may be obtained through System Information Block (SIB) or higher layer signaling such as RRC signaling, and re-initialization of a scrambling sequence used for transmission of a WUS signal may be set to be performed at every transmission start timing point existing in the transmission interval of the WUS signal. In this case, re-initialization of a scrambling sequence may be set to be skipped at a transmission start timing point for another PO.

Regarding the proposed scrambling sequence generation rule with reference to a WUS signal (e.g., NWUS or MWUS signal) defined in 3GPP TS 36.211 V15.2.0, a UE may initialize a scrambling sequence of a WUS to monitor with reference to a transmission start timing point of a UE subgroup to which the UE belongs, count scrambling sequence indexes by accumulating them while repetition of a subframe level is in progress, initialize a scrambling sequence index at a WUS transmission starting subframe position of another UE subgroup sharing the same PO, and restart the scrambling sequence with the first initialization value.

[Method-TDM-5] Method of Configuring a Maximum WUS Duration Different Per UE Subgroup Method-TDM-5 proposes a method that a maximum WUS duration applied per UE subgroup is configured different per UE subgroup. The proposed method is advantageous in that when transmission of WUS for UEs in different coverages is classified by Time Division Multiplexing (TDM), the maximum WUS duration can be configured without the increase of a time domain resource necessary for the transmission of the WUS. Particularly, when the method of Method-TDM-5 is used by being combined with the methods of Method-TDM-3 and Method-TDM-4, it is advantageous in that UEs of several UE groups can be simultaneously indicated using the same WUS.

In case of applying Method-TDM-5, as one example of a reference for classifying a UE group, it may be able to use a presence or non-presence of capability (e.g., enhanced coverage restricted UE) of determining whether a UE camps on a cell in an enhanced coverage state. The capability is the information that can be delivered to a BS from an MME and does not change according to time, whereby it is profitable in that the capability can be equally understood by the BS and the UE.

(Specific Method of UE Subgrouping in Method-TDM-5)

As a typical example of Method-TDM-5, it is able to consider a method of configuring a maximum WUS duration different for each UE subgroup using SIB or higher layer signaling such as RRC signaling. This may intend to support a different coverage for each UE subgroup.

Figure 30:
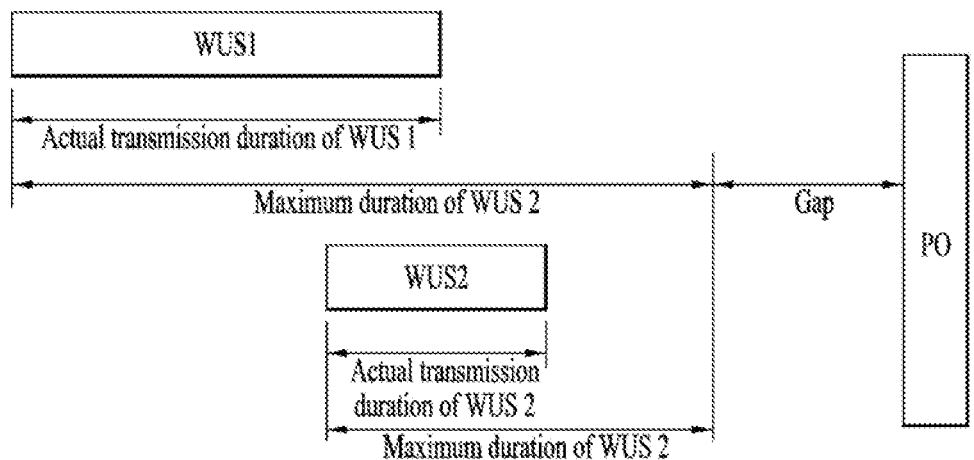

In this case, with respect to a size of a gap between the used WUS and PO, all UE subgroups may be set to acquire the common information using the same higher layer signaling. In doing so, each UE subgroup may have a different WUS starting subframe like the example of FIG. 30 due to a common gap and a different maximum WUS duration. In the example of FIG. 30, a UE subgroup expecting WUS2 in general may be provided for the purpose of UEs having a low coverage level (or UEs capable of detection of WUS with short repetition owing to a high Signal-to-Interference-plus-Noise Ratio (SINR) of a channel) in comparison to a UE subgroup expecting WUS1. In case that the proposed method is used, it is advantageous in reducing an operation that the UEs expecting the WUS2 wake up unnecessarily due to the transmission of WUS1.

(Specific Method of Indicating a Maximum WUS Duration Per UE Subgrouping in Method-TDM-5)

As one typical example of Method-TDM-5, it is able to consider a method of separately configuring a scaling factor to determine a maximum WUS duration using SIB or higher layer signaling such as RRC signaling. For example, when a maximum WUS duration of WUS is expressed as a multiplication of an Rmax, which is a parameter to determine a repetition level of a paging PDCCH (e.g., NPDCCH), and a scaling factor, a BS may configure independent scaling factors for UEs that use maximum WUS durations in different sizes and then inform the UEs of the configured factors. The UE may select a scaling factor corresponding to its UE group from the scaling factors received from the BS and then perform a monitoring operation of WUS. If this method is used, since additional UE grouping for the WUS is performed while the definition and operation for the existing paging are maintained, influence on a legacy UE can be reduced advantageously.

As another typical example of Method-TDM-5, it is able to consider a method of separately configuring an Rmax value to determine a repetition level of a paging PDCCH (e.g., NPDCCH) used by a UE using SIB or higher layer signaling such as RRC signaling. For example, when a maximum WUS duration of WUS is expressed as a multiplication of an Rmax, which is a parameter to determine a repetition level of a paging PDCCH (e.g., NPDCCH), and a scaling factor, a BS may configure an independent Rmax value for UEs that use maximum WUS durations in different sizes and then inform the UEs of the configured value. The UE may select a scaling factor corresponding to its UE group from the scaling factors received from the BS and then perform a monitoring operation of WUS. If this method is used, it is advantageous in that UEs expecting a WUS of a short length may be made to expect a paging of a short length only likewise.

An actual transmission length of a paging PDCCH (e.g., NPDCCH) may be short in comparison to Rmax, and information indicating an actually and repeatedly transmitted length of the paging PDCCH (e.g., NPDCCH) is included in a DCI format transmitted through the paging PDCCH (e.g., NPDCCH). A UE may estimate a timing point of an actual end of the transmission of the paging PDCCH (e.g., NPDCCH) with reference to the information included in the DCI with reference to the Rmax value, and obtain a start timing point of a transmission of NPDSCH using the estimated timing point. Yet, like the example of the proposed method, in case that UEs of different UE groups expect Rmax values in different sizes, a transmission end point of PDCCH (e.g., NPDCCH) and a PDSCH (e.g., NPDSCH) transmission start point, which are understood per UE, may be different from each other. In case that UEs sharing the same PO use different Rmax values, simultaneous scheduling of two groups may be restricted. To solve such a problem, even if different Rmax values are used for the different UE groups expecting the paging for the same PO, an Rmax value used in common by all UE groups may be determined as a single value in the process for calculating an ending timing point of transmission of PDCCH (e.g., NPDCCH). For example, with reference to an Rmax value for supporting a legacy UE incapable of classification for UE grouping, the above calculation may be set to be executed. This may be intended to maintain the probability for the legacy UE to receive a paging. Alternatively, by taking a biggest Rmax among different Rmax values as a reference all the time, the above calculation may be set to be executed. In case that different Rmax values are user, it may be intended to support the very last timing point at which PDCCH (e.g., NPDCCH) may be ended.

[Method-TDM-6] Method of Configuring a Skipping WUS Duration Different for Each UE Subgroup Method-TDM-6 proposes a method that a skipping WUS duration applied for each UE subgroup is configured differently for each UE subgroup. The skipping WUS duration is defined as an interval in which a UE skips the monitoring of WUS and may be set to be applied from a starting subframe of WUS transmission. The proposed method is advantageous in that it can be configured without the increase of a time domain resource necessary for transmission of WUS when the transmission of the WUS for UEs in different coverages is classified by TDM. Particularly, when the method of Method-TDM-6 is used in a manner of being combined with the methods of Method-TDM-3 and Method-TDM-4, it is advantageous in simultaneously giving indication to UEs of several UE groups using the same WUS.

(Specific Method of UE Subgrouping in Method-TDM-6)

As one typical example of Method-TDM-6, it is able to consider a method of configuring a skipping WUS duration different for each UE subgroup using System Information Block (SIB) or higher layer signaling such as RRC signaling. This may intend to support a different coverage for each UE subgroup.

As another typical example of Method-TDM-6, it may be able to use a method of using an enhanced coverage restricted parameter defined in Rel-14. When a UE reports restriction of an enhanced coverage in an Attach/TAU Request step and receives configuration in an enhanced coverage restricted state through a higher layer of an Attach/TAU Accept step (or if a value of an enhanced coverage restricted parameter RestricEC is 1), only if the UE generally stays in normal coverage, both of the BS and UE may identically expect that the UE will attempt transmission and reception in a corresponding cell. Therefore, the BS and UE may assume the information on the coverage of the corresponding UE similarly. Particularly, an enhanced coverage restricted parameter may be used to classify a UE having an enhanced coverage restricted parameter RestrictEC configured as 1 and other UEs and support an operation of a separate coverage based grouping for UEs in the enhanced coverage restricted state. The specific method may be used identically for the purpose of performing the UE classification based on the coverage in the method of Method-TDM-5.

In doing so, a size of a WUS-to-PO gap to be used and a size of a maximum WUS duration may be designed to enable all UE subgroups may be set to acquire common information using the same higher layer signaling. For example, sizes of a gap and maximum WUS duration configured for a legacy WUS capable UE failing to have UE subgrouping capability may be usable as common information shared by all UE subgroups.

Figure 31:
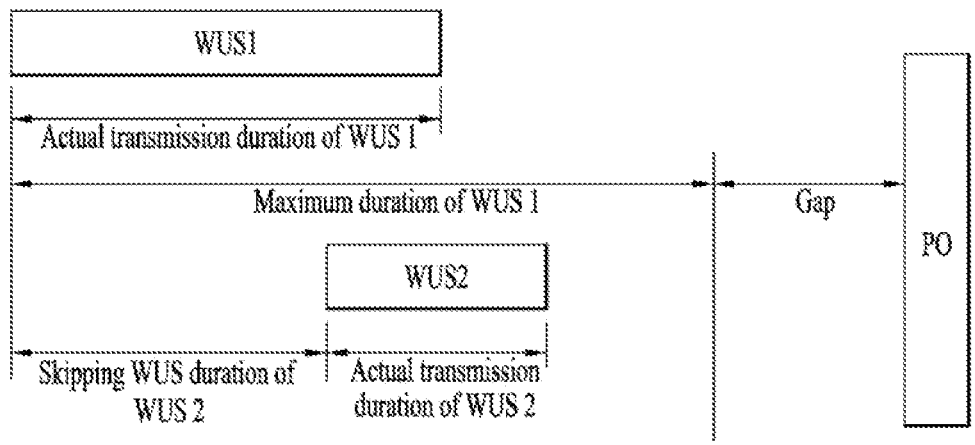

Here, in case of a legacy WUS capable UE failing to have UE subgrouping capability or a UE failing to have a skipping WUS duration configured therefor, a starting subframe of WUS may be calculated as a combination of a gap and a maximum WUS duration. In case that a UE is UE subgrouping capable and has a skipping WUS duration configured therefor, a subframe located behind the skipping WUS duration from the subframe calculated as the combination of a gap and a maximum WUS duration may be set as a starting subframe of WUS. FIG. 31 diagrammatizes the proposed method. In case of using the proposed method, it is advantageous in reducing an operation that UEs expecting WUS2 wake up unnecessarily due to the transmission of WUS1.

The method of Method-TDM-6 may be interpreted as a method that an actual transmission duration for a UE to perform monitor is applied differently depending on the classification according to a coverage state of a UE. For example, general UEs may be set to perform monitoring of WUS at a position from which a maximum WUS duration starts according to the definition of an actual transmission duration described in the current standard. And, in case of UEs designated to perform a normal coverage operation (e.g., UEs having a value of an enhanced coverage restricted parameter RestrictEC configured as 1), all candidates of an actual transmission duration may be set to start from a middle section of a maximum WUS duration.

[Method-TDM-7] Method of Determining a WUS Ending/Starting Subframe of a Specific UE Subgroup as a Position Associated with a WUS Starting/Ending Subframe of Another UE Subgroup Method-TDM-7 proposes a method that a position of an ending subframe in which a WUS transmission of a specific US subgroup may end is determined as a position relative to a starting subframe in which a WUS transmission of another UE subgroup starts. On the contrary, it may be able to use a method that a position of a starting subframe in which a WUS transmission of a specific US subgroup starts is determined as a position relative to an ending subframe in which a WUS transmission of another UE subgroup may end. The method of Method-TDM-7 is advantageous in preventing an overlapping problem between TDMed WUSs as well as having a low overhead necessary for signaling.

(Specific Method of UE Subgrouping in Method-TDM-7)

Figure 32:
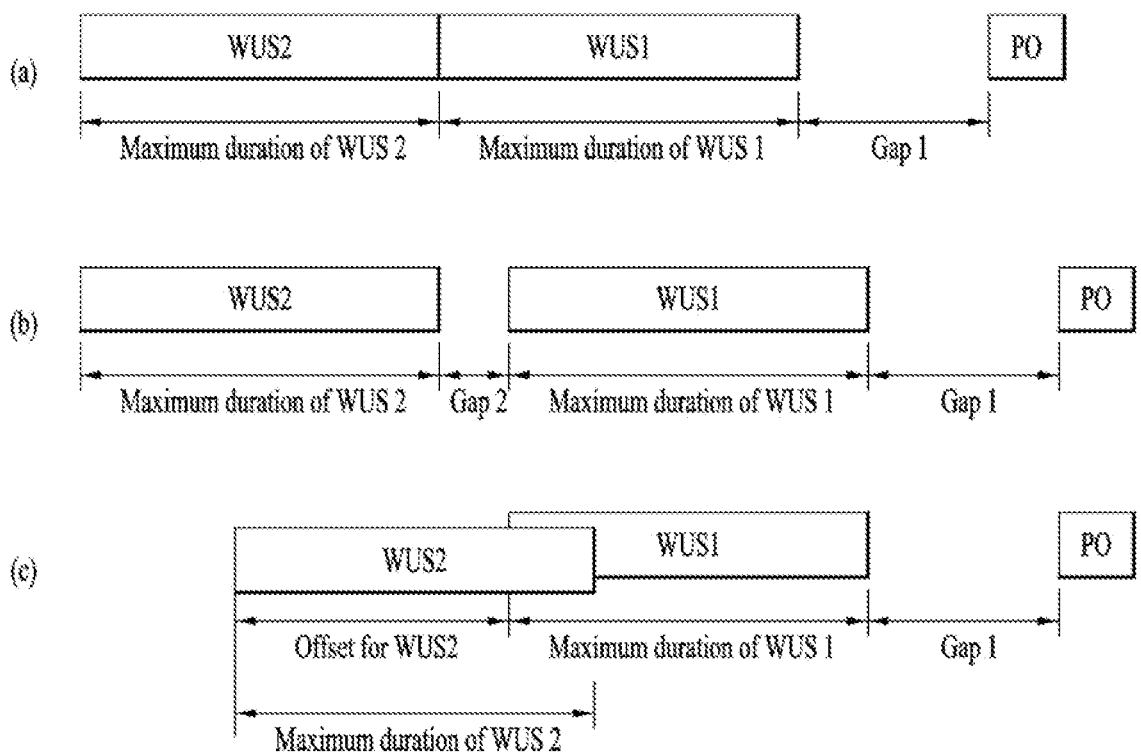

As one typical example of Method-TDM-7, as shown in FIG. 32 (*a*), an ending subframe of a maximum WUS duration of a specific UE subgroup may be set to match a WSU starting subframe of another UE subgroup. In this case, as shown in the example of FIG. 32 (*a*), if a starting subframe of WUS1 is determined through a gap 1 and a maximum duration of WUS1, a starting subframe of WUS2 may be determined through the starting subframe of the WUS1 and a maximum duration of the WUS2. In case of using such a method as shown in FIG. 32 (*a*), it is advantageous in that a separate overhead for designating a starting subframe of WUS for each UE subgroup does not occur and that unnecessary resource waste can be prevented owing to the absence of a gap between the WUS1 and the WUS2.

As another typical example of Method-TDM-7, as shown in FIG. 32 (*b*), an ending subframe of a maximum WUS duration of a specific UE subgroup may be set to a position spaced apart from a WUS starting subframe of another UE subgroup by a gap in predetermined size. In this case, as shown in the example of FIG. 32 (*b*), if a starting subframe of WUS1 is determined through a gap 1 and a maximum duration of WUS1, a starting subframe of WUS2 may be determined through the starting subframe of the WUS1, a maximum duration of the WUS2 and a gap 2. An object of an interval of the gap 2 may be to solve a problem of interference that may be caused by adjacent transmission positions of different WUSs. For example, if a UE has a mismatch of timing synchronization in a DRX interval, it may be intended to prevent unnecessary power consumption by detecting a transmission of WUS for another UE subgroup of an adjacent subframe. Here, a size of the gap 2 may include a value predefined in the standard or a value signaled through SIB or higher layer signaling such as RRC signaling.

As further typical example of Method-TDM-7, as shown in FIG. 32 (*c*), a starting subframe of a maximum WUS duration of a specific UE subgroup may be set to a position spaced apart from a WUS starting subframe of another UE subgroup by an offset over a predetermined size. In this case, as shown in the example of FIG. 32 (*c*), if a starting subframe of WUS1 is determined through a gap 1 and a maximum duration of WUS1, a starting subframe of WUS2 may be determined using the starting subframe of the WUS1 and an offset value for the WUS2. In this case, if a size of the offset is smaller than a maximum duration of WUS2, the maximum durations of the WUS1 and WUS2 may overlap each other in part. This may intend to reduce a size of a time domain resource consumed in performing subgrouping of WUS through TDM. A size of the offset may include a value predetermined by the standard, which may intend to fix the consumption of the time domain resource due to TDM without generating separate signaling overhead. Alternatively, the size of the offset may be expressed as a function for maximum duration of WUS or the maximum repetition number Rmax of the paging PDCCH (e.g., NPDCCH). For example, the size of the offset may be determined as a rate for the maximum duration (or Rmax) value of the WUS. This may intend to support WUSs in various lengths while a rate of the overlapping section of WUSs of different TDMed UE subgroups is maintained at a predetermined level. Here, the rate may include a value predetermined by the standard or a value indicated by higher layer signaling such as RRC signaling.

H.3 Frequency Division Multiplexing (FDM) Based UE Subgrouping

For the purpose of UE subgrouping, a UE subgroup classification scheme using a frequency resource for transmitting a signal of WUS may be available. In the proposed method, different UEs expecting WUS on the same time resource can be classified by a WUS transmission position determined based on a UE subgroup. If an FDM based method is used, since a WUS signal can be maintained identical to a legacy WUS to which UE subgrouping is not applied, it is advantageous in that the increase of complexity can be reduced in aspects of UE and BS implementation and signal generation. In addition, in case that PRBs exist in Narrow Band (NB) not used at a transmission timing point of MWUS like MTC, it is advantageous in increasing use efficiency of a frequency resource by reutilizing them.

The methods described in the following proposals are applicable to FDM scheme that considers both a legacy WUS for UEs to which UE subgrouping is not applied and UE subgroup WUSs for UEs to which UE subgrouping is applied, or may be usable for the purpose of selecting a frequency domain resource of a UE subgroup WUS even if such a scheme as TDM and the like is applied between a legacy WUS and a UE subgroup WUS.

UE subgrouping through a transmission position of a WUS signal may be applicable in a manner of combining one or more methods of Method-FDM-1, Method-FDM-2, and Method-FDM-3, proposed below.

[Method-FDM-1] UE Subgrouping Method Using a Position of a Frequency Resource Used for Mapping of WUS Method-FDM-1 proposes a method of classifying UE subgroup information using a position of a frequency resource used for mapping of WUS. Since the proposed method reuses a signal of a legacy WUS (particularly, MWUS), it is advantageous that implementation complexity of a UE for signal detection can be maintained.

(Frequency Resource Position Per UE Subgroup in Method-FDM-1)

Figure 33:
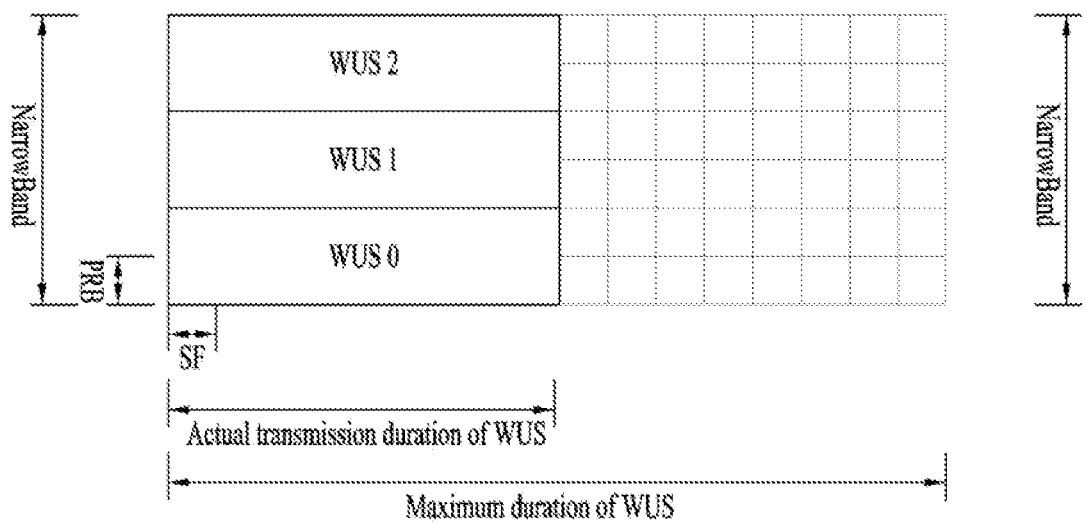

As one typical example of Method-FDM-1, regarding a PRB position within a narrowband to which an MWUS defined in 3GPP TS 36.211 V15.2.0 is mapped, as shown in FIG. 33, a narrowband may be divided into 3 zones in unit of 2 PRBs and the 3 zones may be then divided for each UE subgroup. This may intend to obtain a UE subgrouping effect by transmitting an additional MWUS while reusing the frequency resource allocation scheme of Rel-15 MWUS as it is. More specifically, an index of a starting PRB to which an MWUS per UE subgroup is mapped may be set to one of {0, 2, 4}.

Figure 34:
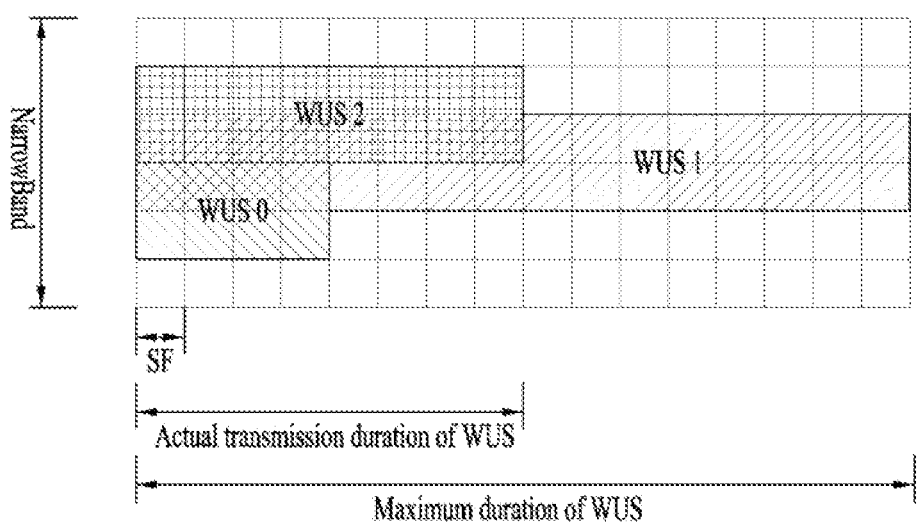

As another typical example of Method-FDM-1, regarding a PRB position within a narrowband to which an MWUS defined in 3GPP TS 36.211 V15.2.0 is mapped, as shown in FIG. 34, a narrowband may be divided for each UE subgroup in a manner of indicating a starting PRB in unit of 1 PRB. This may intend to increase the number of UE subgroups. For example, in case of classifying a WUS by an interval of 2PRBs like Rel-15, the maximum number of operable UE subgroups is 3. Yet, according to the proposed method, maximum 5 starting PRBs may be operated. Alternatively, a size of a full PRB bandwidth on which a WUS is transmitted is decreased by generating a PRB region shared between WUSs, by which an effect of power boosting may be further facilitated. For example, in case of operating 3

WUSs, as shown in FIG. 34, total 4 PRBs are used. This is advantageous in saving 2 PRBs in comparison to the configuration scheme of a Rel-15 MWUS.

(Method of Determining a Frequency Resource Position Per UE Subgroup in Method-FDM-1)

(1) As a typical example of Method-FDM-1, a PRB position within a narrowband to which an MWUS defined in 3GPP TS 36.211 V15.2.0 is mapped may be explicitly configured for each UE subgroup through an SIB or higher layer signal such as RRC signaling. Here, a PRB position information provided through the higher layer signal may include information of a starting PRB to which a WUS is mapped.

(2) As a typical example of Method-FDM-1, a PRB position within a narrowband to which an MWUS defined in 3GPP TS 36.211 V15.2.0 is mapped may be determined implicitly by a UE subgrouping index. A WUS per UE subgroup is mapped with reference to a predetermined starting PRB index, and a UE may be aware of PRB information of a WUS, which is to be transmitted to the UE, using a UE subgrouping index to which the UE belongs. When this method is used, a BS may determine the number of UE subgroups to operate and inform UEs of this information through SIB or higher layer signaling such as RRC signaling. If such information exists, the UE may be aware of starting PRB information of a WUS, which is to be monitored by the UE, using a UE subgrouping starting PRB determining method predetermined by the standard and the number of UE subgroups in a narrowband.

A. If a transmission PRB of WUS is determined implicitly, a WUS PRB used by a legacy WUS capable UE having no UE subgrouping capability may be set not to be used by UEs for the purpose of UE subgrouping. A UE subgrouping capable UE may check WUS starting PRB allocation information configured for a legacy UE through SIB or RRC signaling, and may use a method of excluding a corresponding position from an available list of its WUS starting PRB. This may intend to prevent UE subgrouping incapable UEs from obtaining incorrect information due to a WUS for a subgrouping capable UE. If a BS is able to select a presence or non-presence of applicability of the above operation, the BS may transmit the signaling indicating whether a resource of a legacy WUS is usable together for this in a manner of including the signaling in WUS configuration information and UE subgrouping applied UEs may determine whether the legacy WUS resource is available using the above information.

3) As another typical example of Method-FDM-1, a PRB position within a narrowband to which an MWUS defined in 3GPP TS 36.211 V15.2.0 is mapped may be determined using a position of a common starting PRB and information on a relative offset per UE subgroup. In this case, a UE determines a starting PRB position of a WUS, on which the UE will perform monitoring, by combining information of an offset corresponding to a UE subgroup to which the UE belongs and information of a common starting PRB.

The information on the offset may be explicitly configured by a BS using SIB or higher layer signaling such as RRC signaling. Alternatively, the information on the offset may be a value that a UE may know implicitly using a UE subgroup index and/or the number of UE subgroups operated in a narrowband.

In this case, regarding a position of a starting PRB, a PRB having a WUS transmitted thereon should be included in the narrowband entirely. For example, when a position of a WUS PRB is as shown in FIG. 33, a position of a starting PRB may be determined by Eq-FDM-1. Here, f means a starting PRB of an $i^{th}$ UE subgroup, $f_0$ means a starting PRB of a legacy UE (e.g., a Rel-15 MWUS capable UE), and $f_{offset,i}$ means an offset value of an $i^{th}$ UE subgroup.

$$f_i = (f_0 + f_{offset,i}) \bmod 6 \quad \text{[Equation Eq-FDM-1]}$$

A. If a size of the offset is implicitly determined and the maximum number of UE subgroups that can be FDMed is 2, the size $f_{offset,i}$ of the offset may be set to be determined within the set of {0, 2} or {0, −2}. This may intend to prevent the occurrence of simultaneous WUS transmission exceeding 4 PRBs within a single narrowband despite applying a UE subgrouping WUS of FDM type.

i. In this case, a size $f_{offset,i}$ of the offset, which is used if there is a single FDM resource of a UE subgroup (or, if FDM is used for the purpose of classifying a legacy WUS and a UE subgroup WUS only and the same PRB pair is used between UE subgroup WUSs), may be set to 2 or −2. Namely, when the number of small-size UE subgroups is configured, a legacy WUS and a UE subgroup WUS are FDMed to each other, whereby it may be intended to avoid each other's effects.

ii. In this case, a size $f_{offset,i}$ of the offset, which is used if there is a single FDM resource of a UE subgroup (or, if FDM is used for the purpose of classifying a legacy WUS and a UE subgroup WUS only and the same PRB pair is used between UE subgroup WUSs), may be set to 0. This may intend to raise Energy Per Resource Element (EPRE) of WUS by minimizing the number of PRBs necessary for transmission of the WUS.

iii. In this case, a size set of offset configurable for a UE in DRX state and a size set of offset configurable for a UE in eDRX state may be set different from each other. For example, an offset size $f_{offset,i}$ may be allocated to a UE in DRX state within a set of {0, 2}, but an offset size $f_{offset,i}$ may be allocated to a UE in eDRX state within a set of {0, −2}. Namely, when a WUS-to-PO gap of a DRX UE and a WUS-to-PO gap of an eDRX UE are equal to or adjacent to each other, it may be intended to transmit WUSs for the two UEs respectively or simultaneously. The same principle of the above method may be applicable to another situation (e.g., a case that both an eDRX long gap and an eDRX short gap are supported) that WUS-to-PO gaps in different sizes corresponding to the same PO can be configured.

[Method-FDM-2] Method of Dividing a Frequency Resource Used for Mapping of Legacy WUS and Using it for UE Subgrouping Method-FDM-2 proposes a method of designing UE subgroup information to use a partial frequency resource of a legacy WUS (or a UE subgrouping incapable WUS (or a not UE subgrouping capable WUS)) for a frequency resource used for mapping of WUS. Since a PRB resource of a legacy Rel-15 MWUS is reusable identically, the proposed method is advantageous in that a transmission power level of MWUS can be maintained greater than or equal to the existing one.

(Specific Method of UE Subgrouping in Method-FDM-2)

Figure 35:
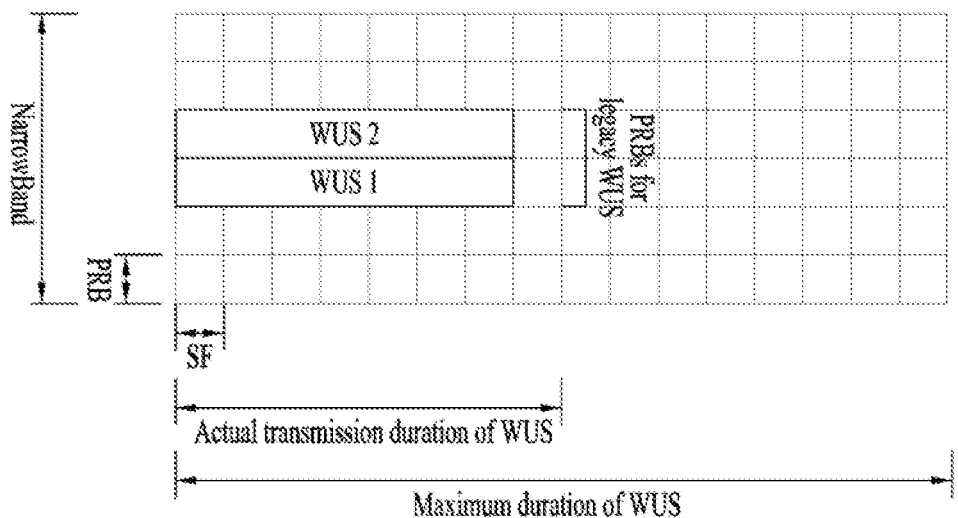

As a typical example of Method-FDM-2, it is able to use a method of dividing 2 consecutive PRBs to which MWUS for the purpose of Rel-15 defined in 3GPP TS 36.211 V15.2.0 into two 1-PRB regions, as shown in FIG. 35, and then allocating them to each UE subgroup. In this case, a UE may estimate a position of a PRB, which matches its own UE subgroup, using such an equation as Eq-FDM-2. Here, $f_{subgroup1}$ and $f_{subgroup2}$ mean PRB indexes in a narrow band used by the subgroups, respectively, and $f_0$ means a starting PRB of a legacy UE (e.g., a Rel-15 MWUS capable UE).

$$\begin{cases} f_{subgroup1} = f_0 \\ f_{subgroup2} = f_0 + 1 \end{cases} \quad \text{[Equation Eq-FDM-2]}$$

A BS may explicitly configure PRB allocation information of a WUS that a UE will monitor using SIB or higher layer signaling such as RRC signaling. Alternatively, PRB allocation information of a WUS that a UE will monitor may include a value that the UE may be implicitly aware of using a UE subgroup index.

The proposed method has an advantage that the number of PRBs used due to a WUS can be identically maintained in comparison with a legacy WUS. In addition, there is an advantage that a BS only needs the same PRB as a legacy WUS for the transmission of a common WUS for both of a legacy UE and a UE subgroup capable UE.

[Method-FDM-3] Method of Using a Different Hopping Pattern for Each UE Subgroup

Method-FDM-3 proposes a method of generating a frequency hopping pattern in PRB unit of a WUS using UE subgroup information. Here, one object of frequency hopping is to obtain frequency diversity and/or another object of the frequency hopping may be to classify different UE subgroups. The proposed method is advantageous in obtaining a diversity gain through frequency hopping and reducing interference occurring between different cells.

(Specific Method of Frequency Hopping in Method-FDM-3)

Figure 36:
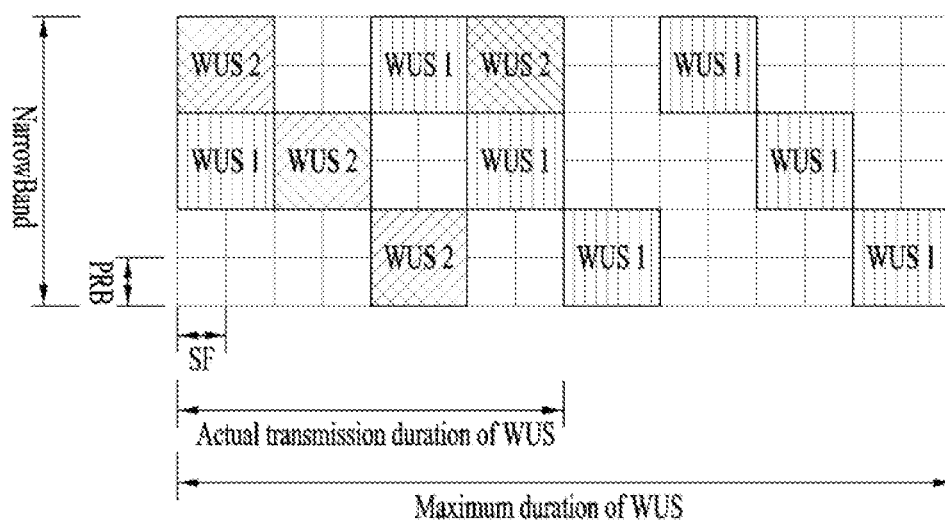

(1) As a typical example of Method-FDM-3, it is able to use a method of applying hopping in PRB unit, as shown in FIG. 36, to a PRB to which MWUS for the purpose of Rel-15 defined in 3GPP TS 36.211 V15.2.0 is mapped. In the example of FIG. 36, a WUS transmission starts per UE subgroup from a different PRB and hopping in PRB unit is performed according to time within a WUS transmission duration.

As a specific method, a PRB used at the starting timing point of a transmission of a WUS (or a reference PRB from which PRB hopping starts) may be determined by a UE subgroup index. This may intend to classify different UE subgroups in frequency domain.

As a specific method, a PRB hopping pattern of WUS may be determined as a function by a UE subgroup index, and different UE subgroups may have different PRB hopping patterns, respectively.

(2) As a typical example of Method-FDM-3, a PRB to which MWUS for the purpose of Rel-15 defined in 3GPP TS 36.211 V15.2.0 is mapped may use a hopping pattern in narrowband unit operated in a full cell bandwidth.

H.4 CDM+TDM Based UE Subgrouping

For the purpose of UE subgrouping, a UE subgroup classification scheme using a signal of WUS and a UE subgroup classification scheme using a time resource for transmitting a signal of WUS may be used in a manner of being combined. In the proposed method, each of different UEs expecting the same WUS may be classified through a WUS signal configured for its own UE subgroup and a time domain resource on which a WUS signal is transmitted.

Method-C/TDM-1 proposed below is applicable to UE subgrouping through WUS signal classification.

[Method-C/TDM-1] Method of Adding a Section of an Additional Actual Transmission Duration in Case of a UE Subgroup Capable UE by Including UE Subgroup Information Through Classification of a WUS Signal Method-C/TDM-1 proposes a method of performing UE subgrouping in a manner of designing UE subgroup information to be included in generating a WUS signal and adding an actual transmission duration section. The proposed method is advantageous in scheduling multiple UEs simultaneously as well as reutilizing a resource of a legacy Rel-15 WUS.

(Specific Method of UE Subgrouping in Method-C/TDM-1)

As a typical example of Method-C/TDM-1, a generation scheme of a WUS signal may be used in a manner of combining one or more of the methods proposed in Section H.1.

Figure 37:
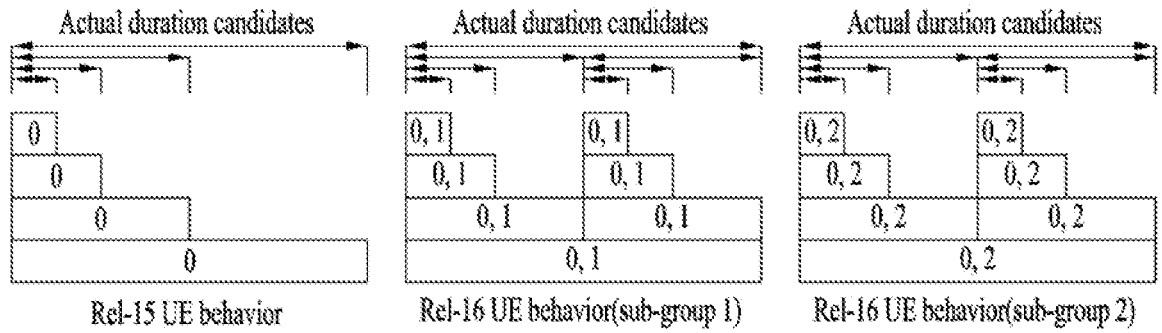

As a typical example of Method-C/TDM-1, the definition of an actual transmission duration in which a WUS signal can be transmitted may use the structure shown in FIG. 37. In the example of FIG. 37, each numeral means an index of a WUS signal a UE intends to detect, '0' means a legacy WUS, and '1' and '2' mean WUSs corresponding to UE subgroup indexes, respectively. In case of a UE having no UE subgrouping capability (e.g., a legacy WUS capable UE expecting Rel-15 WUS (e.g., NWUS or MWUS)), an actual transmission duration may be set to be always aligned with a position at which a maximum duration starts. On the other hand, in case of a UE subgrouping capable UE, a plurality of start positions of an actual transmission duration may be set to exist within a maximum duration. For example, as shown in the example of FIG. 37, in case of a UE subgrouping capable UE, a random starting point (e.g., a point corresponding to ½ of a maximum duration) within a maximum duration may be considered as an additional starting point of an actual transmission duration. In this case, the UE subgrouping capable UE may consider both a starting point of the maximum duration and an additional starting point of an added actual transmission as available targets of the actual transmission duration.

(Scrambling Re-Initialization Method in Method-C/TDM-1)

(1) As a typical example of Method-C/TDM-1, initialization of a scrambling sequence used for the generation of a WUS signal (e.g., NWUS or MWUS signal) defined in 3GPP TS 36.211 V15.2.0 may be designed to be performed with reference to a maximum duration starting position (or a starting position of a first actual transmission duration within a maximum duration section). This may intend to maintain backward compatibility according to a WUS transmission rule of a UE subgrouping incapable UE (e.g., a UE supportive of a legacy WUS (e.g., Rel-15 NWUS or MWUS)) and reduce complexity of a UE.

(2) As a typical example of Method-C/TDM-1, initialization of a scrambling sequence used for the generation of a WUS signal (e.g., NWUS or MWUS signal) defined in 3GPP TS 36.211 V15.2.0 may be designed to be performed with reference to a starting position of an actual transmission duration. Here, in case of a WUS transmission for which initialization has been performed already at a specific position, although a subsequent actual transmission duration position existing in the same maximum duration is met, it may be designed not to be reinitialized. Namely, in case that a BS intends to provide information for a UE subgroup capable UE only, and transmits a WUS signal using a starting point of an actual transmission duration except a starting point of a maximum duration, it may be intended to prevent UEs having no UE subgrouping capability from recognizing the transmission of WUS.

[Method-C/TDM-2] Method of Applying CDM and TDM Sequentially According to the Number of UE Subgroups in Case of Using Both CDM and TDM Method-C/TDM-2 proposes a method of determining a code-domain/time-domain resource applied to each UE subgroup according to the number of UE subgroups operated by a BS in case that both CDM and TDM are usable to classify UE subgroup information. When the number of UE subgroups can be determined by a BS, the proposed method is usable for the purpose of enabling a UE and the BS to recognize it identically.

A specific method may include one of the following options.

(Option-C/TDM-2-1) CDM First Subgroup Allocation

When the number of UE subgroups that can be classified through CDM on the same time/frequency domain resource is Nc and the number of UE subgroups configured by a BS is M, regarding an integer n that meets the condition of (n−1)·Nc<M≤n·Nc, a TDM scheme using n time domain resources may be used and classification using a CDM scheme may be set to be applied to each TDMed time domain resource in a manner that UE subgroups are dispersed as equally as possible. As a specific method, when a size of n is defined by the above condition and an index of a UE subgroup to which a UE belongs is Mi, the UE may be set to select a time domain resource of $(Mi \bmod n)^{th}$ index. Here, 'mod' indicates a modulo operation. For example, on the condition of Nc≥M, UE subgrouping using a method of CDM only may be designed to be performed. In this case, all UE subgroups share the same time domain resource. In case of the condition of Nc<M≤2Nc, two time domain resources are used for the purpose of UE subgrouping. In this case, M/2 UE subgroups may be included in each time domain resource. The method of the proposed option is advantageous in reducing the overhead due to WUS by minimizing a use of a time domain resource within classification capability of a code domain resource.

(Option-C/TDM-2-2) TDM First Subgroup Allocation

When the number of UE subgroups that can be classified through TDM is Nt and an index of a UE subgroup is Mi, a UE may be set to use a $(Mi \bmod Nt)^{th}$ time domain resource. This may intend to minimize the number of code domain resources configurable on each time domain resource simultaneously.

It is obvious that the same principle of the method proposed in Method-C/TDM-2 is applicable to a case of using FDM instead of TDM. In this case, the time domain resource in the above description may be applicable in a manner of being replaced by a frequency domain resource.

[Method-C/TDM-3] WUS Signal Generating Method Considering a Presence or Non-Presence of a Group Common WUS if an Overlap Occurs Between WUSs of Different UE Subgroups in a TDM Structure Method-C/TDM-3 proposes a following method. Namely, TDM is used to classify a UE subgroup of WUS. In doing so, if maximum durations of TDMed WUSs overlap each other in part, a WUS generation rule for the purpose of group common indication and a WUS generation rule for the purpose of UE subgroup indication are made different from each other. In case that TDM is used to classify a UE subgroup, it may happen that WUSs of different UE subgroups overlap each other due to the shortage of a time domain resource or for the purpose of restricting a WUS-to-PO gap size, etc.

(Specific Method of WUS Generation in Method-C/TDM-3)

As a typical example of Method-TDM-8, in case that a WUS classification scheme is used between UE subgroups using TDM, it is able to consider a method that a WUS generation scheme of a WUS for the purpose of group common indication and a WUS generation scheme of a WUS for the UE subgroup specific purpose are applied differently. This is generally applicable to a case that a plurality of UE subgroups are additionally classified by CDM in a single TDMed WUS transmission interval. In this case, a UE subgroup specific WUS may be set to be classified on a code domain from another WUS overlapped on a time domain. In this case, a generation scheme of a scrambling sequence of WUS may be independently determined for each UE subgroup, which may intend to expect different WUS signals between different UE subgroups in a WUS overlapped subframe. For example, a scrambling sequence of a UE subgroup specific WUS may be designed to be generated by applying the proposed method of Method-CDM-1. On the other hand, in case of a WUS for the purpose of group common indication, a reference WUS signal that becomes a reference is determined and all UE subgroups in the overlapped interval may be set to expect the reference WUS signal identically. Namely, in case of intending to give indication to all UE groups, it may be intended to prevent a transmission of a WUS of a specific group from being interrupted by a WUS of another UE group due to the overlapped interval. For example, a WUS for the purpose of group common indication may be designed to use the proposed scheme of Method-TDM-3 or Method-TDM-4. In this case, the reference WUS signal may be set to become a legacy WUS to which UE subgrouping is not applied. Namely, it is intended that a group common indication operation of aa UE subgrouping incapable UE can avoid being interrupted by a UE subgrouping capable UE.

H.5 CDM+FDM Based UE Subgrouping

For the purpose of UE subgrouping, a UE subgroup classification scheme using a signal of WUS and a UE subgroup classification scheme using a frequency resource for transmitting a signal of WUS may be used in a manner of being combined. In the proposed method, each of different UEs expecting the same WUS may be classified through a WUS signal configured for its own UE subgroup and a frequency domain resource on which a WUS signal is transmitted. Method-C/TDM-1 proposed below is applicable to UE subgrouping through WUS signal classification.

[Method-C/FDM-1] Method of Including UE Subgrouping Information Using a WUS Signal when a Frequency Resource Used for Mapping of a Legacy WUS is Used for UE Subgrouping in a Manner of being Divided Method-C/FDM-1 proposes a method of designing UE subgroup information to be included in generating a WUS signal and designing a partial region of a legacy WUS (or a UE subgrouping incapable WUS (i.e., a not UE subgrouping capable WUS)) to be used as a frequency resource for a WUS of a UE subgroup capable UE. In case that restriction on an available resource exists in aspect of CDM or FDM, the proposed method may intend to support more UE groups by combining it.

(Specific Method of UE Subgrouping in Method-C/FDM-1)

As a typical example of Method-C/FDM-1, a generation scheme of a WUS signal may be used in a manner of combining one or more of the methods proposed in Section H.1. In this case, the above-used WUS signal may include a WUS signal for the UE-subgroup purpose and a WUS signal for the common indicator purpose. The WUS signal for the common indicator purpose may be used to provide information to all WUS capable UEs, and may follow the generation scheme of a legacy WUS (e.g., Rel-15 WUS that uses 2 PRBs according to 3GPP TS 36.211 V15.2.0 [e.g., see Equations 3 to 5 and the relevant description]. The WUS signal for the UE subgroup purpose may be set to be classified from the legacy WUS, and the same WUS signal may be allowed to be used between UE subgroups that use different PRBs. On the contrary, UE subgroup classification through a WUS signal is set to be enabled between different UE subgroups that use the same PRB.

As a typical example of Method-C/FDM-1, a position of a PRB used for transmission of a WUS signal may use the method proposed in Method-FDM-2.

In the method of Method-C/FDM-1, a UE may be designed to monitor both a UE subgroup specific WUS signal and a WUS signal for the common indication purpose at a position of a PRB corresponding to a UE subgroup.

H.6 Selecting WUS Multiplexing Resource Based on WUS Parameters

The inter-UE subgroup WUS multiplexing methods proposed above may have different advantages and disadvantages depending on situations. Hence, it is able to consider a method of defining various WUS multiplexing schemes and allowing a BS to select and use a WUS signal available depending on a situation.

To this end, it is able to consider a method that a BS determines a WUS resource to use actually among predefined available WUS resources with explicit expression on SIB or a higher layer signal such as RRC signaling. This may be advantageous in that a BS is allowed to select a WUS resource operation scheme suitable for a situation by guaranteeing scheduling flexibility of the BS. On the contrary, since explicit information delivery is necessary, it may be disadvantageous in increasing the necessary signaling overhead.

In order to decrease signaling overhead, it is able to consider a scheme of implicitly estimating WUS resource configuration using parameters supposed to be transmitted for other purposes instead of the explicit information expression scheme. Particularly, WUS related parameters may become major factors for determining advantages and disadvantages of the WUS resource operation scheme and the respective WUS multiplexing schemes. The present disclosure proposes methods of determining a WUS resource for the UE subgrouping purpose according to parameters related to a WUS using such characteristics.

A method of determining WUS resources to be used depending on WUS related parameters and differentiating WUS multiplexing schemes between UE subgroups through it is applicable in a manner of combining one or more of the below-proposed methods including Method-RSEL-1, Method-RSEL-2, Method-RSEL-3, Method-RSEL-4, and Method-RSEL-5.

[Method-RSEL-1] Method of Determining a WUS Resource to be Used According to Rmax or a Maximum Duration of WUS Method-RSEL-1 proposes a method that a WUS resource to be used is determined by a maximum duration of WUS or a maximum repetition value (Rmax) of a paging PDCCH (e.g., NPDCCH). As a specific method, one or more of the following options is applicable.

(Option-RSEL-1-1) Method of Determining a TDM Scheme According to Rmax or a Maximum Duration of WUS The method proposed in the present disclosure may include a method of determining the number of available time domain resources according to Rmax or a maximum duration (hereinafter WUSmax) of WUS like Option-RSEL-1-1. In case of a WUS defined in the current Rel-15 NB-IoT/MTC, repetition for the purpose of coverage extension or enhancement is applied, and repetition of bigger size is necessary to support a wider coverage. If a value of WUSmax is large, a wider coverage may be supported but a quantity of a necessary time domain resource is greatly increased as well. In addition, as the use of a time domain resource for TDM increases more, heavier network overhead is induced. Hence, an additional use of a time domain resource may not be appropriate for a large WUSmax value. Rmax is a value of determining a maximum repetition of a paging. Generally, if the Rmax gets larger, the bigger overhead for the paging is necessary. Hence, as a time domain resource for WUS multiplexing of TDM increases more, collision between a transmission position of a paging and a transmission position of WUS may occur with higher probability. In addition, since a value of Rmax is used as a parameter directly used to determine WUSmax, a bigger value of Rmax may include a larger WUSmax.

As a typical example to which Option-RSEL-1-1 is applied, it is able to consider a method of dividing values of WUSmax (or Rmax) into several sections and then determining the number of time domain resources used according to each of the sections. For example, if a value of WUSmax (or Rmax) is equal to or greater than (or exceeds) a specific value, a single time domain resource used without application of TDM may be determined. If the value of WUSmax (or Rmax) is smaller than (or equal to or smaller than) the specific value, two or more time domain resources to be used may be determined and TDM scheme may be applied thereto.

(Option-RSEL-1-2) Method of Determining a CDM Scheme According to Rmax or a Maximum Duration of WUS The method proposed in the present disclosure may include a method of determining the number of available code domain resources according to Rmax or a maximum duration (hereinafter WUSmax) of WUS like Option-RSEL-1-1. Generally, a power saving gain based on WUS may be more important to UEs that need higher bigger repetition. In this case, if the number of UE subgroups is increased, an effect of a power saving gain can be raised by preventing an unnecessary wakeup operation of a UE. In addition, if a time domain resource, which is used when WUSmax or Rmax is large according to the application of Option-RSEL-1-1, is reduced, a method for supplementing the number of insufficient UE subgroups may be necessary. In this case, since a time domain resource is limited according to a predetermined rule, a method of additionally selecting a relatively available code domain resource may be considered.

As a typical example of applying Option-RSEL-2, it is able to consider a method of dividing values of WUSmax (or Rmax) into several sections and determining the number of code domain resources to use according to each section. For example, as a value of WUSmax (or Rmax) increases, the number of applied code domain resources may be set to increase.

[Method-RSEL-2] Method of Determining a Presence or Non-Presence of Use of a Specific Time Domain Resource for WUS According to a Size of a Gap Between WUS and PO Method-RSEL-2 proposes a method of determining a WUS resource on a time domain according to a gap size between WUS and PO. The proposed method is advantageous in controlling performance degradation, which may occur as a partial time domain resource has an excessively increased gap with PO in applying a TDM scheme, without separate signaling.

(Specific Method of Method-RSEL-2)

As a typical example of Method-RSEL-2, in a system having a plurality of predetermined configurable time domain resources, it is able to consider a method that a time domain resource of WUS, in which a WUS-to-PO gap size determined by WUS configuration parameters is equal to or greater than a specific value, is determined not to use. In this case, a gap between WUS and PO (i.e., a WUS-to-PO gap) may be calculated with reference to either a starting subframe of the WU or an ending subframe of the WUS. For example, in a system defined to configure 2 time domain resources of WUS, it is able to consider a case that one time domain WUS resource (hereinafter WUS2 resource) is determined as a relative position for a starting subframe of the other time domain WUS resource (hereinafter WUS1 resource). Here, if a gap between the WUS2 resource and a PO is equal to or smaller than (or smaller than) a specific size, both of the WUS1 resource and the WUS2 resource may be designed to be used. If the gap is greater than (or equal to or greater than) the specific size, the WUS1 resource may be designed to be used only.

If the gap between the WUS and the PO is excessively increased, as a time for a UE to stand by until receiving a paging after acquiring WUS becomes too long, unnecessary power consumption may occur disadvantageously. In addition, it may be disadvantageous in that a latency, which is expected when paging information is delivered to eNB from MME, becomes considerably high. From this perspective, if a gap is limited to a size equal to or smaller than a predetermined size, there may be a gain. And, the proposed method of Method-RSEL-2 is advantageously applicable without separate signaling overhead.

[Method-RSEL-3] Method of Determining a Multiplexing Scheme Between UE Subgroups According to UE's WUS Capability Method-RSEL-3 proposes a method of determining a multiplexing scheme between UE subgroups according to WUS capability of a UE. Typically, the WUS capability may include a gap size between WUS and PO, which is necessary for a UE. When WUS capability is a difference in implementation related to WUS detection and subsequent operations of a UE, the proposed method may be advantageous in that selection of an appropriate multiplexing scheme is possible in consideration of UE's implementation features.

{Specific Method of Method-RSEL-3}

As a typical example of Method-RSEL-3, it is able to consider a situation that there exist capability for a long gap having a relatively large value like gap capability for the eDRX purpose defined in Rel-15 NB-IoT/MTC and capability for a short gap having a relatively small value. In this case, the long gap capability may be defined by targeting receivers requiring relatively low complexity and low power consumption, but the short gap capability may be defined by targeting receivers requiring relatively high complexity and high power consumption. Here, in case of CDM applied multiplexing not for the purpose of classification of gap capability but for the purpose of UE subgrouping, a UE may need to simultaneously perform Blind Detection (BD) of a WUS for the group common indication purpose and a WUS for the purpose of UE subgroup specific indication. On the other hand, in case that only TDM (or FDM) is applied not for the purpose of classification of gap capability but for the purpose of UE subgrouping, there is a single WUS resource a UE should monitor and the increase of BD may be unnecessary. Considering such property, only the multiplexing between UE subgroups using TDM (or FDM) is possible at a position of a gap for a long gap capable UE. In this case, classification of a UE subgroup of a CDM scheme may be designed not to be supported. On the contrary, at a position of a gap for a short gap capable UE, a UE subgrouping operation using CDM may be designed to be allowed.

[Method-RSEL-4] Method of Determining how to Operate a WUS Resource Depending on an Extent that UE_ID is Dispersed Per PO Method-RSEL-4 proposes a method of determining how to operate a WUS resource depending on an extent that UE_ID is dispersed per PO. Here, the dispersed extent of UE_ID may be set as a value estimated based on configuration information a BS signals for a paging related operation, and may be different from the number of UEs expecting paging by accessing a corresponding cell actually. In this case, for example, the configuration information for the paging related operation may include the number of paging carriers used in NB-IoT, information of weight given per paging carrier, DRX cycle of PO, the number of POs for different UE_ID groups existing in DRX cycle, etc., and the above parameters may be used to estimate the maximum number of UE_ID estimated to expect paging in one PO. For example, when a function of estimating a dispersed extent of UE_ID is defined and some of the above-described configuration informations are used as parameters of this function, the number of WUS resources to be used may be set to be defined according to a result value of the function. The proposed method uses the dispersed extent of UE_ID as prior information, so it can somewhat predict and reflect the number of actually necessary WUS resources, thereby avoiding unnecessary waste of WUS resources advantageously.

[Method-RSEL-5] Method of Determining how to Operate a WUS Resource Depending on an Operation Mode Method-RSEL-5 proposes a method of determining how to operate a WUS resource depending on an operation mode used in a system in which a plurality of operation modes exist like NB-IoT. Namely, as there exists a difference of the number of OFDM symbols used per subframe depending on an operation mode of NB-IoT, it may be intended to use a performance difference attributed to the former difference. Typically, in case of an in-band operation mode (e.g., see FIG. 19 (a)), the number of OFDM symbols available in a single subframe is 11 and Resource Element (RE) puncturing for securing transmission of Common or Cell-specific Reference Signal (CRS) may be included. On the other hand, in case of a guard-band and standard operation modes (e.g., see FIG. 19 (b) and FIG. 19 (c)), since 14 OFDM symbols are available all and it is not affected by an RE puncturing caused by CRS, assuming that the same power is used, detection performance of WUS may be relatively good. By considering such property, is able to consider a method of differentiating the number of code domain resources to be used depending on an operation mode. For example, the number of code domain resources used for inter-UE subgroup multiplexing of CDM type is designed to be fixed by the standard, and the fixed number in case of the guard-band/standalone operation mode may be set greater than that in case of the in-band operation mode.

[Method-RSEL-6] WUS Resource Selection Scheme in Consideration of a Case that a WUS Parameter for a UE in eDRX State is Optionally Configurable Method-RSEL-6 proposes methods that a WUS parameter determines whether to apply optional configuration depending on a presence or non-presence of DRX/eDRX of a UE and a gap size. In the proposed method, if UE subgrouping for a WUS is applied, at least one WUS parameter configuration for UE subgrouping applied UEs should be configured, and a structure capable of establishing configuration of an additional WUS parameter in optional form depending on a selection made by a BS may be considered. In the following description, for clarity, one WUS parameter configuration guaranteed at least is defined as WUS-Con-A and an additionally configurable WUS parameter configuration is defined as WUS-Con-B. If two additionally configurable WUS parameter configurations exist, they are classified and represented as WUS-Con-B1 and WUS-Con-B2, respectively and combined together to be referred to as WUS-Con-B representatively.

The specific method proposed in Method-RSEL-6 may be used in a manner of combining one or more of the following options. If one or more methods that can be supported by a BS exist, the BS may select one method and inform a UE of the selected method.

(Option-RSEL-6-0)

A WUS parameter to which Method-RSEL-6 is applied may be determined as a number of time-frequency resource of a WUS and/or the number of UE subgroups. Here, the time-frequency resource of the WUS may include whether TDM or FDM is applied.

(Option-RSEL-6-1)

As a specific method to which Method-RSEL-6 is applied, Option-RSEL-6-1 considers a method that WUS-Con-B is applied to a UE in eDRX state only. Here, WUS-Con-A may be set to apply to a UE in DRX state. If WUS-Con-A exists only but WUS-Con-B is not configured, all UEs to which UE subgrouping is applied may be designed to operate with reference to the WUS-Con-A.

In Option-RSEL-6-1, if a WUS-to-PO gap size for DRX and a WUS-to-PO gap size for an eDRX short gap are configured equal to each other, UEs applying the UE subgrouping that uses the eDRX short gap may be designed to use WUS-Con-A irrespective of a presence or non-presence of WUS-Con-B. In this case, if WUS-Con-B exists, the UEs using the eDRX long gap may be designed to use the WUS-Con-B.

In the method proposed by Option-RSEL-6-1, as UEs using the same WUS-to-PO gap are configured to expect the same WUS irrespective of a presence or non-presence of DRX/eDRX, it may be intended to prevent a WUS overlapping problem that different WUSs are transmitted on the same WUS resource.

(Option-RSEL-6-2)

As a specific method to which Method-RSEL-6 is applied, Option-RSEL-6-2 considers a method that WUS-Con-B is applied to a UE in eDRX state only. Here, WUS-Con-A may be set to apply to a UE in DRX state. If WUS-Con-A exists only but WUS-Con-B is not configured, all UEs to which UE subgrouping is applied may be designed to operate with reference to the WUS-Con-A.

In Option-RSEL-6-2, if WUS-Con-B is configured, an eDRX UE may be designed to operate with reference to the WUS-Con-B all the time. In this case, although a WUS-to-PO gap size for DRX and a WUS-to-PO gap size for an eDRX short gap are configured equal to each other, a UE that uses the eDRX short gap is designed to operate with reference to the WUS-Con-B. If a BS intends to handle a UE in DRX state and a UE in eDRX short gap state equally, it may not configure WUS-Con-B.

The method proposed in Option-RSEL-6-2 may be designed to allow a BS to support additional optimization for a UE for an eDRX short gap.

(Option-RSEL-6-3)

As a specific method to which Method-RSEL-6 is applied, Option-RSEL-6-3 considers a method that WUS-Con-B is applied to a UE in eDRX state only. Here, regarding the WUS-Con-B, WUS-Con-B1 for an eDRX short gap and WUS-Con-B2 for an eDRX long gap may be configured independently.

In the method of Option-RSEL-6-3, if WUS-Con-A is configured only but WUS-Con-B1 and WUS-Con-B2 fail to exist, all UEs performing UE subgrouping may be designed to operate with reference to the WUS-Con-A. If WUS-Con-A and WUS-Con-B1 are configured and WUS-Con-B2 fails to be configured, a UE in DRX state may be designed to operate with reference to the WUS-Con-A and UEs in eDRX state may be designed to operate with reference to WUS-Con-B1. If WUS-Con-A and WUS-Con-B2 are configured and WUS-Con-B1 fails to be configured, a UE in DRX state and a UE in eDRX short gap state may be designed to operate with reference to the WUS-Con-A and a UE in eDRX long state may be designed to operate with reference to the WUS-Con-B. If WUS-Con-A, WUS-Con-B1 and WUS-Con-B2 are configured all, a UE in DRX state, a UE in eDRX short gap state and a UE in DRx long gap state may be designed to operate with reference to the WUS-Con-A, the WUS-Con-B1 and the WUS-Con-B2, respectively.

The method of Option-RSEL-6-3 may obtain a gain of raising network flexibility in aspect that WUS parameters for an eDRX shot gap and an eDRX long gap can be configured independently and also have an advantage that a UE may determine a WUS parameter that becomes a reference of UE subgrouping even if some WUS parameters are configured only.

(Option-RSEL-6-4)

As a specific method to which Method-RSEL-6 is applied, Option-RSEL-6-4 proposes a method of applying WUS-Con-B2 to a UE in eDRX long gap state only and enabling a WUS parameter of the WUS-Con-B2 to be determined by configuration of another WUS parameter (e.g., WUS-Con-A or WUS-Con-B1). Here, if an eDRX long gap is not configured in a corresponding cell, WUS-Con-B2 is not configured.

In the method of Option-RSEL-6-4, only if a BS supports an eDRX long gap configurable optionally, WUS-Con-B2 is configured and a UE in EDRX long gap state may be designed to operate with reference to the WUS-Con-B2. In this case, a UE in DRX state and UEs in eDRX short gap state may be designed not to apply the WUS-Con-B2. The UEs in eDRX short gap state may be designed to follow WUS-Con-B1 in case of a presence of the WUS-Con-B1. If WUS-Con-B1 fails to exist, the UEs may be designed to follow WUS-Con-A.

In the method of Option-RSEL-6-4, WUS-Con-B2 may be determined as a subset of a WUS parameter configured in WUS-Con-A. For one example, if WUS-Con-B1 fails to exist and two TDMed WUS resources are configured in WUS-Con-A, WUS-Con-B2 may be set to follow the rest of WUS parameters in the WUS-Con-A except TDM (or select a single time domain WUS resource only) identically. For another example, if WUS-Con-B1 is configured to have two TDMed WUS resources, WUS-Con-B2 may be set to follow the rest of WUS parameters in the WUS-Con-A except TDM (or select a single time domain WUS resource only) identically. In the above examples, if a single time domain WUS resource is configured in WUS-Con-A or WUS-Con-B1 only (or a WUS resource of TDM type is not configured), information of WUS-Con-B2 may be set identical to the WUS-Con-A or the WUS-Con-B1.

If such a method is applied, since information of WUS-Con-B can be represented in a manner of sharing signaling information of WUS-Con-A, singling overhead can be reduced advantageously. In addition, in case of an eDRX long gap, since a size of a WUS-to-PO gap is large, additional application of TDM may be inappropriate. And, it may be intended to prevent the increase of paging delay due to addition of a time domain WUS resource.

I. Communication System and Apparatus to which the Proposal of the Present Disclosure is Applicable Various descriptions, function, procedures, proposals, methods and/or operation flowcharts disclosed in the present document are applicable to various fields that require device-to-device wireless communication/connection, by which the present disclosure is non-limited.

The following is exampled in detail with reference to the drawing. The same reference numbers in the following drawing/description may refer to the same or corresponding hardware, software or function blocks.

Figure 38:
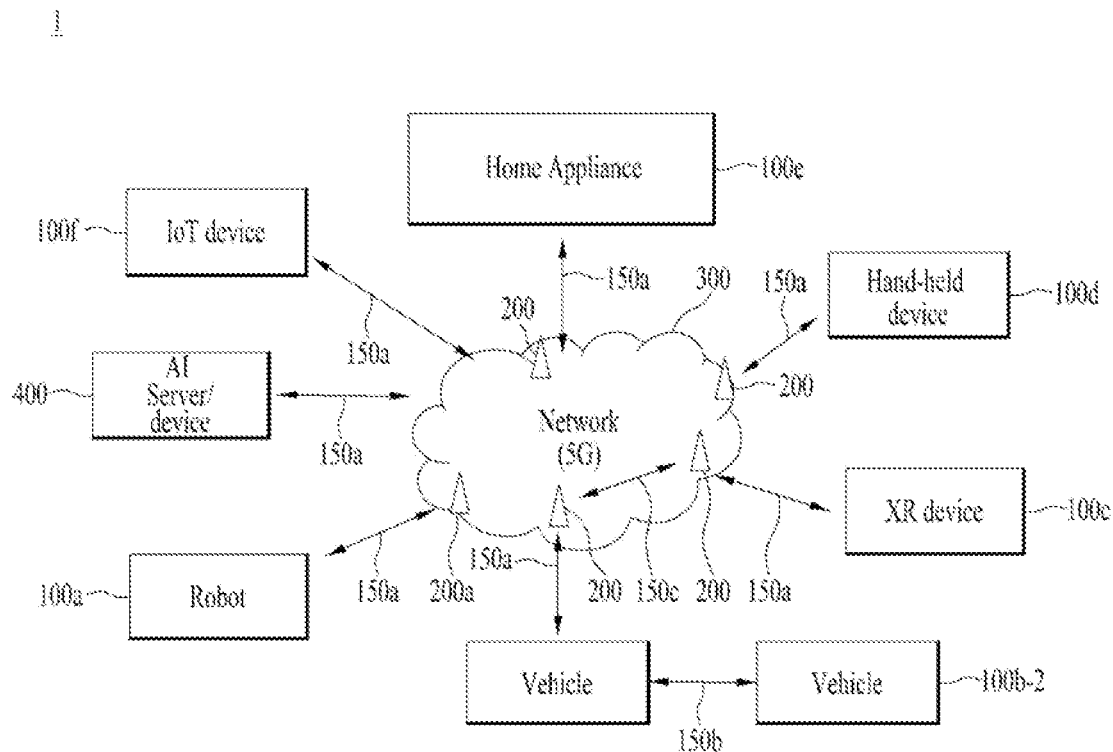
FIGS. 38 to 43 illustrate a system and communication device to which the methods proposed by the present disclosure are applicable.

FIG. 38 illustrates a communication system 1 applied to the present disclosure.

Referring to FIG. 38, the communication system 1 applied to the present disclosure includes wireless devices, BSs, and a network. The wireless devices refer to devices performing communication by radio access technology (RAT) (e.g., 5G New RAT (NR) or LTE), which may also be called communication/radio/5G devices. The wireless devices may include, but no limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle equipped with a wireless communication function, an autonomous driving vehicle, and a vehicle capable of performing vehicle-to-vehicle (V2V) communication. The vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smart glasses), and a computer (e.g., a laptop). The home appliance may include a TV, a refrigerator, and a washing machine. The IoT device may include a sensor and a smart meter. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured by using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f and the BSs 200, or between the BSs 200. Herein, the wireless communication/connections may be established through various RATs (e.g., 5G NR) such as UL/DL communication 150a, sidelink communication 150b (or, D2D communication), or inter-BS communication 150c (e.g. relay, integrated access backhaul (IAB)). A wireless device and a BS/a wireless devices, and BSs may transmit/receive radio signals to/from each other through the wireless communication/connections 150a, 150b, and 150c. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 39:
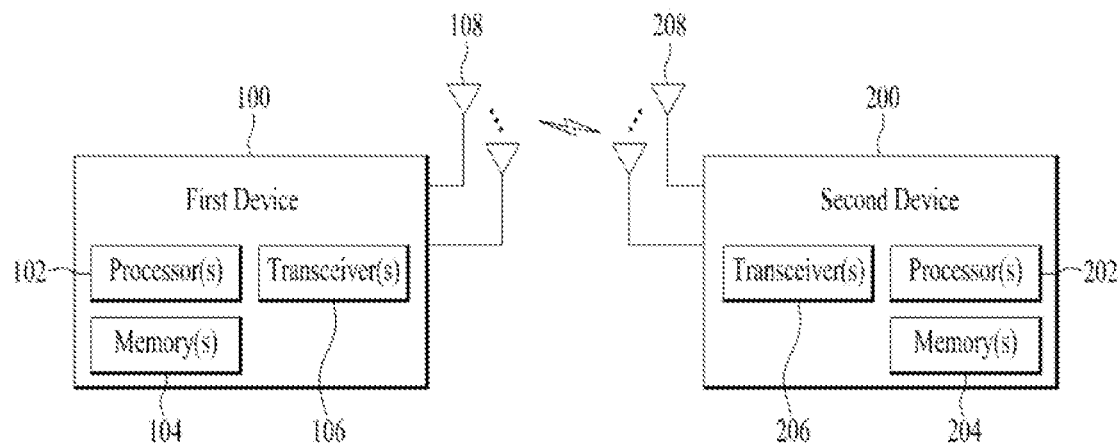

FIG. 39 illustrates wireless devices applicable to the present disclosure.

Referring to FIG. 39, a first wireless device 100 and a second wireless device 200 may transmit radio signals through a variety of RATs (e.g., LTE and NR). Herein, {the first wireless device 100 and the second wireless device 200} may correspond to {the wireless devices 100a to 100f and the BSs 200} and/or {the wireless devices 100a to 100f and the wireless devices 100a to 100f} of FIG. 38.

The first wireless device 100 may include at least one processor 102 and at least one memory 104, and may further include at least one transceiver 106 and/or at least one antenna 108. The processor 102 may control the memory 104 and/or the transceiver 106 and may be configured to implement the descriptions, functions, procedures, proposals, methods, and/or operational flowcharts disclosed in this document. For example, the processor 102 may process information within the memory 104 to generate first information/signal and then transmit a radio signal including the first information/signal through the transceiver 106. The processor 102 may receive a radio signal including second information/signal through the transceiver 106 and then store information obtained by processing the second information/signal in the memory 104. The memory 104 may be coupled to the processor 102 and store various types of information related to operations of the processor 102. For example, the memory 104 may store software code including commands for performing a part or all of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement an RAT (e.g., LTE or NR). The transceiver 106 may be coupled to the processor 102 and transmit and/or receive radio signals through the at least one antenna 108. The transceiver 106 may include a transmitter and/or a receiver. The transceiver 106 may be interchangeably used with an RF unit. In the present disclosure, a wireless device may refer to a communication modem/circuit/chip.

The second wireless device 200 may include at least one processor 202 and at least one memory 204, and may further include at least one transceiver 206 and/or at least one antenna 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signal and then transmit a radio signal including the third information/signal through the transceiver 206. The processor 202 may receive a radio signal including fourth information/signal through the transceiver 206 and then store information obtained by processing the fourth information/signal in the memory 204. The memory 204 may be coupled to the processor 202 and store various types of information related to operations of the processor 202. For example, the memory 204 may store software code including commands for performing a part or all of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement an RAT (e.g., LTE or NR). The transceiver 206 may be coupled to the processor 202 and transmit and/or receive radio signals through the at least one antenna 208. The transceiver 206 may include a transmitter and/or a receiver. The transceiver 206 may be interchangeably used with an RF unit. In the present disclosure, a wireless device may refer to a communication modem/circuit/chip.

Hereinafter, hardware elements of the wireless devices 100 and 200 will be described in greater detail. One or more protocol layers may be implemented by, but not limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented in hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented in firmware or software, which may be configured to include modules, procedures, or functions. Firmware or software configured to perform the descriptions, functions, procedures, proposals, methods, and/or operational flowcharts disclosed in this document may be included in the one or more processors 102 and 202, or may be stored in the one or more memories 104 and 204 and executed by the one or more processors 102 and 202. The descriptions, functions, procedures, proposals, methods, and/or operational flowcharts disclosed in this document may be implemented as code, instructions, and/or a set of instructions in firmware or software.

The one or more memories 104 and 204 may be coupled to the one or more processors 102 and 202 and store various types of data, signals, messages, information, programs, code, instructions, and/or commands. The one or more memories 104 and 204 may be configured as read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be coupled to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be coupled to the one or more processors 102 and 202 and transmit and receive radio signals. For example, the one or more processors 102 and 202 may control the one or more transceivers 106 and 206 to transmit user data, control information, or radio signals to one or more other devices. The one or more processors 102 and 202 may control the one or more transceivers 106 and 206 to receive user data, control information, or radio signals from one or more other devices. The one or more transceivers 106 and 206 may be coupled to the one or more antennas 108 and 208 and configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

FIG. 40 illustrates another example of wireless devices applied to the present disclosure. The wireless devices may be implemented in various forms according to use-cases/services (refer to FIG. 38).

Referring to FIG. 40, wireless devices 100 and 200 may correspond to the wireless devices 100 and 200 of FIG. 39 and may be configured as various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 39. For example, the transceiver(s) 114 may include the one or more transceivers 106 and 206 and/or the one or more antennas 108 and 208 of FIG. 39. The control unit 120 is electrically coupled to the communication unit 110, the memory unit 130, and the additional components 140 and provides overall control to operations of the wireless devices. For example, the control unit 120 may control an electric/mechanical operation of the wireless device based on programs/code/commands/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to the types of wireless devices. For example, the additional components 140 may include at least one of a power unit/battery, an input/output (I/O) unit, a driver, and a computing unit. The wireless device may be configured as, but not limited to, the robot (100a of FIG. 38), the vehicles (100b-1 and 100b-2 of FIG. 38), the XR device (100c of FIG. 38), the hand-held device (100d of FIG. 38), the home appliance (100e of FIG. 38), the IoT device (100f of FIG. 38), a digital broadcasting terminal, a hologram device, a public safety device, an MTC device, a medicine device, a FinTech device (or a finance device), a security device, a climate/environment device, the AI server/device (400 of FIG. 38), the BSs (200 of FIG. 38), a network node, etc. The wireless device may be mobile or fixed according to a use-case/service.

In FIG. 40, all of the various elements, components, units/portions, and/or modules in the wireless devices 100 and 200 may be coupled to each other through a wired interface or at least a part thereof may be wirelessly coupled to each other through the communication unit 110. For example, in each of the wireless devices 100 and 200, the control unit 120 and the communication unit 110 may be coupled wiredly, and the control unit 120 and first units (e.g., 130 and 140) may be wirelessly coupled through the communication unit 110. Each element, component, unit/portion, and/or module within the wireless devices 100 and 200 may further include one or more elements. For example, the control unit 120 may be configured as a set of one or more processors. For example, the control unit 120 may be configured as a set of a communication control processor, an application processor, an electronic control unit (ECU), a graphical processing unit, and a memory control processor. In another example, the memory unit 130 may be configured as a random access memory (RAM), a dynamic RAM (DRAM), a read only memory (ROM), a flash memory, a volatile memory, a non-volatile memory, and/or a combination thereof.

An implementation example of FIG. 40 will be described in detail with reference to the drawings.

Figure 41:
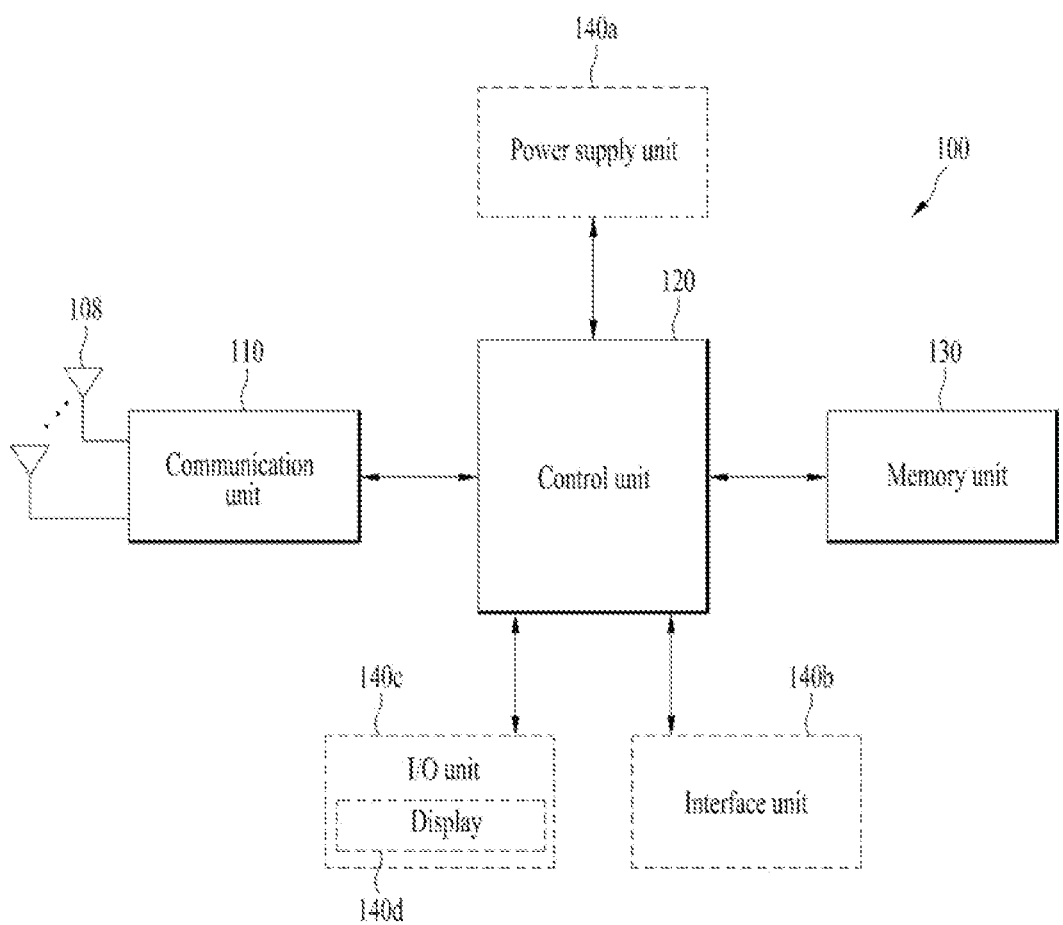

FIG. 41 illustrates a portable device applied to the present disclosure. The portable device may include a smartphone, a smartpad, a wearable device (e.g., a smart watch and smart glasses), and a portable computer (e.g., a laptop). The portable device may be referred to as a mobile station (MS), a user terminal (UT), a mobile subscriber station (MSS), a subscriber station (SS), an advanced mobile station (AMS), or a wireless terminal (WT).

Referring to FIG. 41, a portable device 100 may include an antenna unit 108, a communication unit 110, a control unit 120, a power supply unit 140a, an interface unit 140b, and an I/O unit 140c. The antenna unit 108 may be configured as a part of the communication unit 110. The blocks 110 to 130/140a to 140c correspond to the blocks 110 to 130/140 of FIG. 40, respectively.

The communication unit 110 may transmit and receive signals (e.g., data and control signals) to and from another wireless device and a BS. The control unit 120 may perform various operations by controlling elements of the portable device 100. The control unit 120 may include an application processor (AP). The memory unit 130 may store data/parameters/programs/code/commands required for operation of the portable device 100. Further, the memory unit 130 may store input/output data/information. The power supply unit 140a may supply power to the portable device 100, and include a wired/wireless charging circuit and a battery. The interface unit 140b may include various ports (e.g., an audio I/O port and a video I/O port) for connectivity to external devices The I/O unit 140c may acquire information/signals (e.g., touch, text, voice, images, and video) input by a user, and store the acquired information/signals in the memory unit 130. The communication unit 110 may receive or output video information/signal, audio information/signal, data, and/or information input by the user. The I/O unit 140c may include a camera, a microphone, a user input unit, a display 140d, a speaker, and/or a haptic module.

For example, for data communication, the I/O unit 140c may acquire information/signals (e.g., touch, text, voice, images, and video) received from the user and store the acquired information/signal sin the memory unit 130. The communication unit 110 may convert the information/signals to radio signals and transmit the radio signals directly to another device or to a BS. Further, the communication unit 110 may receive a radio signal from another device or a BS and then restore the received radio signal to original information/signal. The restored information/signal may be stored in the memory unit 130 and output in various forms (e.g., text, voice, an image, video, and a haptic effect) through the I/O unit 140c.

Figure 42:
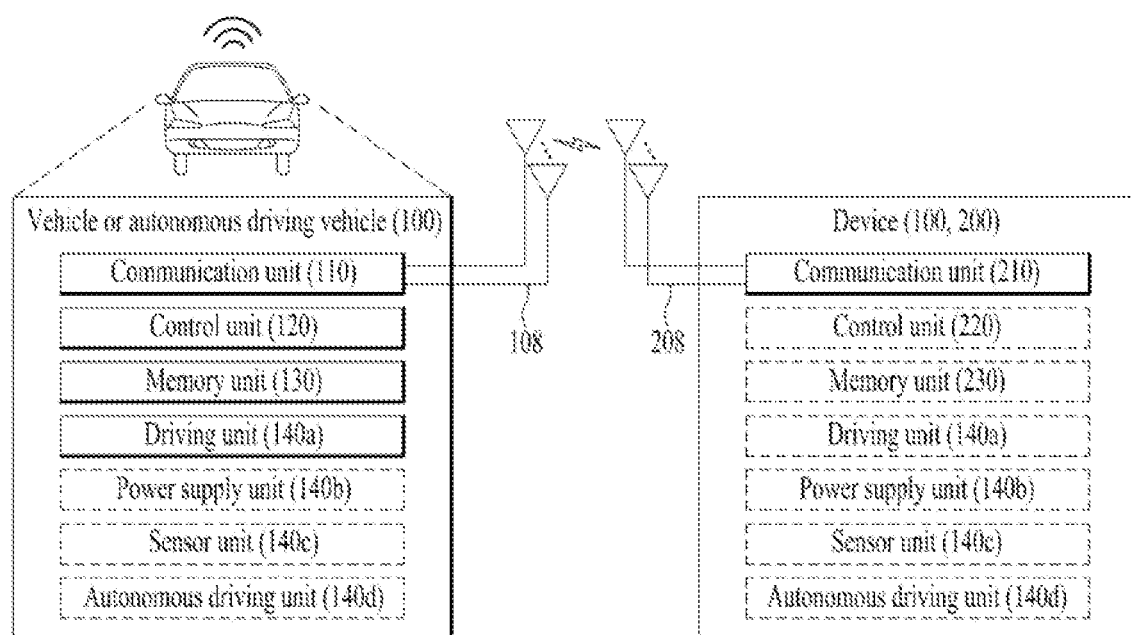

FIG. 42 illustrates a vehicle or an autonomous driving vehicle applied to the present disclosure. The vehicle or autonomous driving vehicle may be configured as a mobile robot, a car, a train, a manned/unmanned aerial vehicle (AV), a ship, or the like.

Referring to FIG. 42, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 40, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to travel on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire vehicle state information, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement a technology for maintaining a lane on which a vehicle is driving, a technology for automatically adjusting speed, such as adaptive cruise control, a technology for autonomously traveling along a determined path, a technology for traveling by automatically setting a path, when a destination is set, and the like.

For example, the communication unit 110 may receive map data, traffic information data, and so on from an external server. The autonomous driving unit 140d may generate an autonomous driving path and a driving plan from the obtained data. The control unit 120 may control the driving unit 140a such that the vehicle or autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain vehicle state information and/or ambient environment information. The autonomous driving unit 140d may update the autonomous driving path and the driving plan based on the newly obtained data/information. The communication unit 110 may transmit information about a vehicle position, the autonomous driving path, and/or the driving plan to the external server. The external server may predict traffic information data using AI technology or the like, based on the information collected from vehicles or autonomous driving vehicles and provide the predicted traffic information data to the vehicles or the autonomous driving vehicles.

Figure 43:
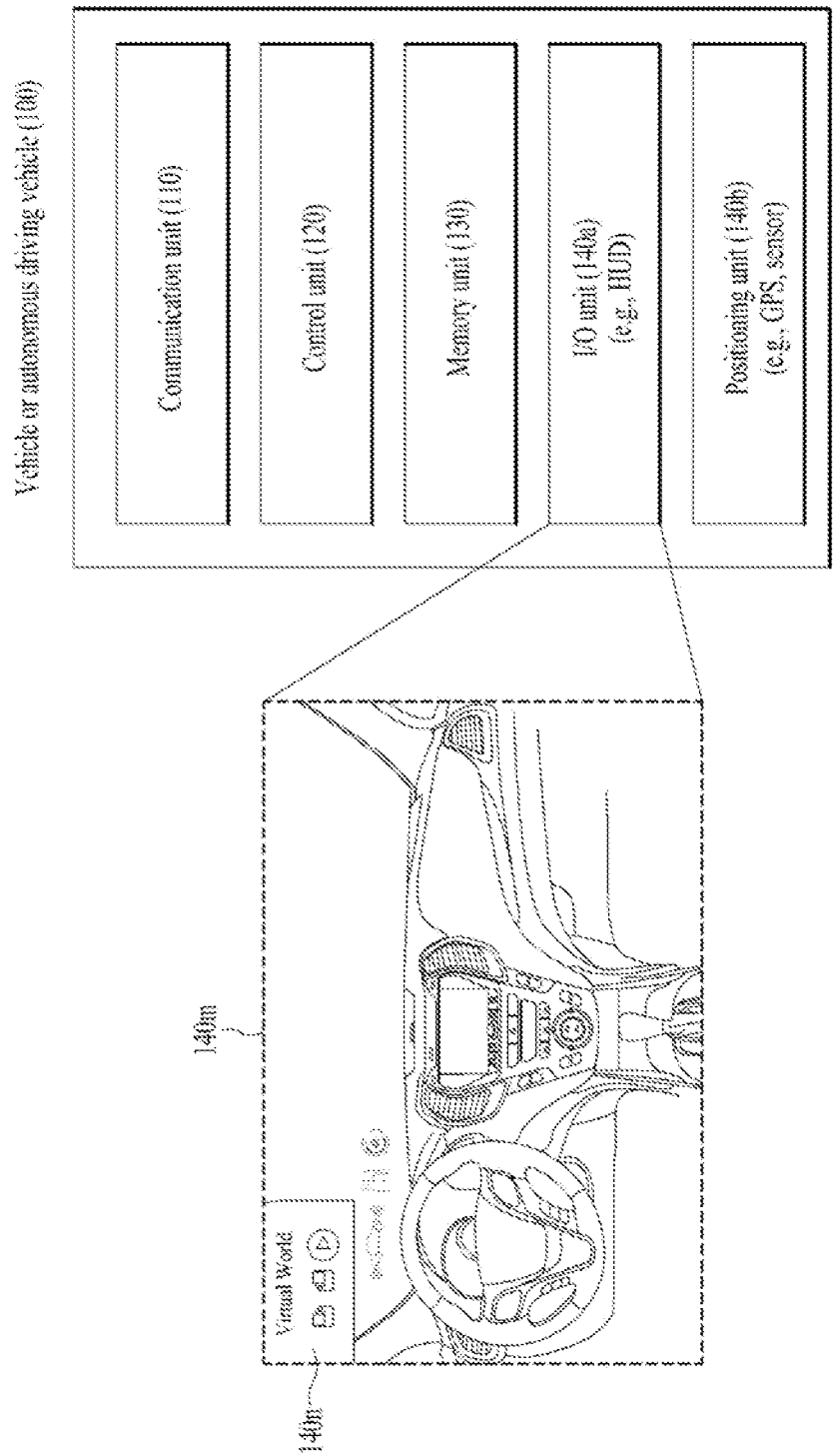

FIG. 43 illustrates a vehicle applied to the present disclosure. The vehicle may be implemented as a transport means, a train, a flying object, a ship, etc.

Referring to FIG. 43, a vehicle 100 may include a communication unit 110, a control unit 120, a memory unit 130, an Input/Output (I/O) unit 1401 and a positioning unit 140b. here, the blocks 110~130/140a~140b correspond to the blocks 110~130/140 of FIG. 40, respectively.

The communication unit 110 may transmit and receive signals (e.g., data, control signal, etc.) with external devices such as other vehicles, BSs and the like. The control unit 120 may perform various operations by controlling components of the vehicle 100. The memory unit 130 may store data/parameters/programs/codes/commands for supporting various functions of the vehicle 100. The I/O unit 140a may output AR/VR objects based on information in the memory unit 130. The I/O unit 140a may include HUD. The positioning unit 140b may obtain position information of the vehicle 100. The position information may include absolute position information of the vehicle 100, position information of the vehicle 100 within a driveline, acceleration information of the vehicle 100, position information of the vehicle 100 with a surrounding vehicle, and the like. The positioning unit 140b may include GPS and various sensors.

For example, the communication unit 110 of the vehicle 100 may receive map information, traffic information and the like from an external server and then save them to the memory unit 130. The positioning unit 140b may obtain vehicle position information through the GPS and various sensor and then save it to the memory unit 130. The control unit 120 may generate a virtual object based on the map information, the traffic information, the vehicle position information and the like, and the I/O unit 140a may display the generated virtual object on a glass window in the vehicle [140m, 140n]. In addition, based on the vehicle position information, the control unit 120 may determine whether the vehicle 100 is normally driven on the driveline. If the vehicle 100 deviates from the driveline abnormally, the control unit 120 may display a warning on the glass window in the vehicle through the I/O unit 140a. In addition, the controller 120 may broadcast a warning message about the abnormal driving to surrounding vehicles through the communication unit 110. Depending on the circumstances, the control unit 12) may transmit information about the position of the vehicle and information about the driving/vehicle abnormality to the relevant agencies through the communication unit 110.

The methods described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in the methods of the present disclosure may be rearranged. Some constructions of any one method may be included in another method and may be replaced with corresponding constructions of another method. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to wireless communication devices such as a User Equipment (UE) and a Base Station (BS) operating in various wireless communication systems including 3GPP LTE/LTE-A/5G (or New RAT (NR)).

What is claimed is:

1. A method for receiving a signal by a user equipment (UE) in a wireless communication system, the method comprising:
receiving a primary synchronization signal (PSS) and a secondary synchronization signal (SSS);
attempting to detect at least one wake up signal (WUS), based on (i) a first complex value which is determined based on a scrambling sequence, (ii) a Zadoff-Chu sequence and (iii) a cyclic shift for a WUS sequence,
wherein the cyclic shift for the WUS is related to a second complex value and the second complex value is fixed to a predetermined imaginary value; and monitoring a paging signal in a paging occasion (PO) associated with the at least WUS, based on the at least on WUS, wherein the SSS is related to a sequence $b_{q\_}(m)$ which is defined as:

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 -1 -1 1 -1 1 1 -1 -1 1 1 -1 1 -1 -1 1 -1 1 1 -1 1 1 -1 -1 1 1 1 -1 1 1 -1 1 1 -1 1 1 -1 1 -1 -1 1 1 -1 1 -1 -1 1 1 -1 1 1 -1 1 -1 -1 1 -1 1 1 -1 -1 1 1 1 -1 -1 1 1 -1 1 -1 -1 1 1 -1 1 -1 -1 1 -1 1 1 -1 1 1 -1 -1 1 1 1 -1 1 1 -1 1 1 -1 1 -1 -1 1 1 -1 1 -1 -1 1 -1 1 1 -1 -1 1 1 1 -1 1 1 -1 1 -1 -1 1 1 -1 1 1 1 -1] |
| 2 | [1 -1 -1 1 -1 1 1 -1 1 1 1 -1 -1 1 -1 1 -1 1 1 1 -1 1 -1 -1 1 -1 1 1 1 -1 1 1 -1 1 -1 -1 1 1 1 -1 -1 1 -1 1 -1 1 1 1 -1 1 -1 -1 1 -1 1 1 1 -1 1 -1 -1 1 -1 1 1 1 -1 -1 1 1 -1 1 -1 -1 1 1 -1 1 -1 1 1 1 -1 -1 1 1 -1 1 -1 -1 1 1 1 -1 1 -1 -1 1 1 -1 -1 -1 1 1 1 -1 1 1 -1 1 -1 -1 1 1 1 -1 -1 1 1 -1 1 -1 -1 1 1 -1 -1 1 1]|
| 3 | [1 -1 -1 1 -1 1 1 -1 -1 1 1 -1 1 -1 -1 1 -1 1 1 -1 1 1 -1 -1 1 1 1 -1 1 1 -1 1 1 -1 1 1 -1 1 -1 -1 1 1 1 -1 1 1 -1 1 -1 -1 1 1 1 -1 -1 1 1 -1 1 -1 -1 1 -1 1 1 -1 -1 1 -1 1 1 -1 1 -1 -1 1 1 -1 1 1 1 -1 -1 -1 -1 1 1 1 -1 1 1 -1 1 -1 1 1 1 -1 -1 1 1 1 -1 1 1 1 -1 -1 -1 1 1 1 -1 -1 1 1 1 -1 1 -1 -1 1 1 1 -1 1 1 1 -1 1]. |

2. The method according to claim 1, wherein the attempting to detect the at least on WUS comprises:
attempting to detect a first WUS common to all UE groups associated with the PO, based on a zero cyclic shift value.

3. The method according to claim 1, wherein the attempting to detect the at least on WUS comprises:
attempting to detect a second WUS common to all UE groups associated with the PO, based on a non-zero cyclic shift value.

4. The method of claim 1, further comprising:
receiving configuration information for the WUS, wherein the configuration information includes information indicating a value of a cyclic shift for a UE group to which the UE belongs.

5. The method of claim 4, wherein the configuration information is received through Radio Resource Control (RRC) layer signaling.

6. The method of claim 4, wherein the configuration information is received through a System Information Block (SIB).

7. A non-transitory processor readable medium recorded thereon instructions for performing the method of claim 1.

8. A User Equipment (UE) configured to receive a signal in a wireless communication system, the UE comprising:
a Radio Frequency (RF) transceiver; and
a processor connected to the RF transceiver operatively, wherein the processor is configured to receive a primary synchronization signal (PSS) and a secondary synchronization signal (SSS), attempt to detect at least one wake up signal (WUS), based on (i) a complex value which is determined based on a scrambling sequence, (ii) a Zadoff-Chu sequence and (iii) a cyclic shift for a WUS sequence,
wherein the cyclic shift for the WUS is related to a second complex value and the second complex value is fixed to a predetermined imaginary value and monitor a paging signal in a Paging Occasion (PO) associated with the at least one WUS based on the at least on WUS, wherein the SSS is related to a sequence $b_{q\_}(m)$ which is defined as:

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1]|
| 1 | [1 -1 -1 1 -1 1 1 -1 -1 1 1 -1 1 -1 -1 1 -1 1 1 -1 1 1 -1 -1 1 1 1 -1 1 1 -1 1 1 -1 1 1 -1 1 -1 -1 1 1 -1 1 -1 -1 1 1 -1 1 1 -1 1 -1 -1 1 -1 1 1 -1 -1 1 1 1 -1 -1 1 1 -1 1 -1 -1 1 1 -1 1 -1 -1 1 -1 1 1 -1 1 1 -1 -1 1 1 1 -1 1 1 -1 1 1 -1 1 -1 -1 1 1 -1 1 -1 -1 1 -1 1 1 -1 -1 1 1 1 -1 1 1 -1 1 -1 -1 1 1 -1 1 1 1 -1]|
| 2 | [1 -1 -1 1 -1 1 1 -1 -1 1 1 -1 1 -1 -1 1 -1 1 1 -1 1 1 -1 -1 1 1 1 -1 1 1 -1 1 1 -1 1 1 -1 1 -1 -1 1 1 -1 1 -1 -1 1 1 -1 1 1 -1 1 -1 -1 1 -1 1 1 -1 -1 1 1 1 -1 -1 1 1 -1 1 -1 -1 1 1 -1 1 -1 -1 1 -1 1 1 -1 1 1 -1 -1 1 1 1 -1 1 1 -1 1 1 -1 1 -1 -1 1 1 -1 1 -1 -1 1 -1 1 1 -1 -1 1 1 1 -1 1 1 -1 1 -1 -1 1 1 -1 -1 1 1] |
| 3 | [1 -1 -1 1 -1 1 1 -1 -1 1 1 -1 1 -1 -1 1 -1 1 1 -1 1 1 -1 -1 1 1 1 -1 1 1 -1 1 1 -1 1 1 -1 1 -1 -1 1 1 1 -1 1 1 -1 1 -1 -1 1 1 1 -1 -1 1 1 -1 1 -1 -1 1 -1 1 1 -1 -1 1 -1 1 1 -1 1 -1 -1 1 1 -1 1 1 1 -1 -1 -1 -1 1 1 1 -1 1 1 -1 1 -1 1 1 1 -1 -1 1 1 1 -1 1 1 1 -1 -1 -1 1 1 1 -1 -1 1 1 1 -1 1 -1 -1 1 1 1 -1 1 1 1 -1 1].|

9. A method for transmitting a signal by a base station (BS) in a wireless communication system, the method comprising:
transmitting a primary synchronization signal (PSS) and a secondary synchronization signal (SSS);
generating at least one wake up signal (WUS) sequence; and
transmitting at least on WUS based on the generated WUS sequence,
wherein the WUS sequence is generated based on (i) a complex value which is determined based on a scrambling sequence, (ii) a Zadoff-Chu sequence and (iii) a cyclic shift related to a second complex value and the second complex value is fixed to a predetermined imaginary value, and
wherein the SSS is related to a sequence $b_{q\_}(m)$ which is defined as:

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1]|
| 1 | [1 -1 -1 1 -1 1 1 -1 -1 1 1 -1 1 -1 -1 1 -1 1 1 -1 1 1 -1 -1 1 1 1 -1 1 1 -1 1 1 -1 1 1 -1 1 -1 -1 1 1 -1 1 -1 -1 1 1 -1 1 1 -1 1 -1 -1 1 -1 1 1 -1 -1 1 1 1 -1 -1 1 1 -1 1 -1 -1 1 1 -1 1 -1 -1 1 -1 1 1 -1 1 1 -1 -1 1 1 1 -1 1 1 -1 1 1 -1 1 -1 -1 1 1 -1 1 -1 -1 1 -1 1 1 -1 -1 1 1 1 -1 1 1 -1 1 -1 -1 1 1 -1 1 1 1 -1]|
| 2 | [1 -1 -1 1 -1 1 1 -1 -1 1 1 -1 1 -1 -1 1 -1 1 1 -1 1 1 -1 -1 1 1 1 -1 1 1 -1 1 1 -1 1 1 -1 1 -1 -1 1 1 -1 1 -1 -1 1 1 -1 1 1 -1 1 -1 -1 1 -1 1 1 -1 -1 1 1 1 -1 -1 1 1 -1 1 -1 -1 1 1 -1 1 -1 -1 1 -1 1 1 -1 1 1 -1 -1 1 1 1 -1 1 1 -1 1 1 -1 1 -1 -1 1 1 -1 1 -1 -1 1 -1 1 1 -1 -1 1 1 1 -1 1 1 -1 1 -1 -1 1 1 -1 -1 1 1]|
| 3 | [1 -1 -1 1 -1 1 1 -1 -1 1 1 -1 1 -1 -1 1 -1 1 1 -1 1 1 -1 -1 1 1 1 -1 1 1 -1 1 1 -1 1 1 -1 1 -1 -1 1 1 1 -1 1 1 -1 1 -1 -1 1 1 1 -1 -1 1 1 -1 1 -1 -1 1 -1 1 1 -1 -1 1 -1 1 1 -1 1 -1 -1 1 1 -1 1 1 1 -1 -1 -1 -1 1 1 1 -1 1 1 -1 1 -1 1 1 1 -1 -1 1 1 1 -1 1 1 1 -1 -1 -1 1 1 1 -1 -1 1 1 1 -1 1 -1 -1 1 1 1 -1 1 1 1 -1 1].|

10. The method of claim 9, wherein the transmitting the at least one WUS comprises transmitting a first WUS common to all UE groups associated with the PO based on a first WUS sequence in which a cyclic shift value is 0.

11. The method of claim 10, wherein the first WUS is transmitted to UEs failing to support a group WUS.

12. The method of claim 10, wherein the transmitting the at least one WUS comprises transmitting a second WUS common to all UE groups associated with the PO based on a second WUS sequence in which a cyclic shift value is not 0.

13. The method of claim 12, wherein the second WUS is transmitted to UEs supporting a group WUS.

14. The method of claim 9, further comprising transmitting configuration information for the WUS, wherein the configuration information includes information indicating a value of the cyclic shift.

15. The method of claim 14, wherein the configuration information is transmitted through Radio Resource Control (RRC) layer signaling.

16. The method of claim 14, wherein the configuration information is transmitted through a System Information Block (SIB).

17. A base station (BS) for transmitting a signal in a wireless communication system, the BS comprising:
a Radio Frequency (RF) transceiver; and
a processor connected to the RF transceiver operatively,
wherein the processor is configured to transmit a primary synchronization signal (PSS) and a secondary synchronization signal (SSS), generate at least one wake up signal (WUS) sequence and to transmit at least on WUS based on the generated WUS sequence,
wherein the WUS sequence is generated based on (i) a complex value which is determined based on a scrambling sequence, (ii) a Zadoff-Chu sequence and (iii) a cyclic shift related to a second complex value and the second complex value is fixed to a predetermined imaginary value, and wherein the SSS is related to a sequence $b_q\_(m)$ which is defined as:

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 -1 -1 1 -1 1 1 1 -1 -1 1 1 -1 1 -1 -1 1 1 -1 1 -1 -1 1 1 -1 -1 1 -1 1 1 -1 -1 1 1 -1 1 1 -1 1 1 -1 1 -1 -1 1 1 -1 -1 1 -1 -1 1 -1 1 1 -1 1 -1 -1 1 1 -1 1 -1 -1 1 -1 1 1 -1 -1 1 -1 1 1 -1 1 -1 -1 1 1 -1 -1 1 1 -1 -1 1 -1 1 1 -1 -1 1 1 -1 1 -1 -1 1 1 -1 -1 1 -1 1 1 -1 1 -1 -1 1 -1 1 1 -1 -1 1 1 -1 1 -1 -1 1 1 -1] |
| 2 | [1 -1 -1 1 -1 1 1 1 -1 -1 1 1 1 -1 -1 1 1 -1 1 1 -1 -1 -1 1 1 1 -1 -1 1 1 -1 1 -1 -1 1 1 -1 1 1 -1 -1 1 1 -1 -1 1 1 -1 1 -1 1 1 -1 1 1 1 -1 -1 1 1 -1 -1 -1 1 -1 -1 1 1 -1 1 1 -1 -1 1 1 -1 -1 -1 1 -1 1 1 -1 1 -1 -1 1 -1 -1 1 1 -1 1 1 1 -1 -1 1 1 -1 -1 -1 1 1 -1 -1 1 -1 -1 1 1 1 -1 -1 1 1 -1 1 -1 -1 1 -1 1 -1 -1 1 -1 -1 1 1 -1 1 1 -1 -1 -1 1 1] |
| 3 | [1 -1 -1 1 -1 1 1 1 -1 -1 1 1 -1 1 -1 -1 1 1 -1 1 1 1 -1 -1 1 1 -1 -1 1 1-1 1 -1 -1 1 1 1 -1 -1 1 1 -1 1 -1 -1 1 1 -1 -1 1 1 -1 1 -1 -1 1 1 -1 -1 1 1 -1 -1 1 -1 1 1 1-1 -1 1 1 1 -1 -1 -1 1 1 -1 1 -1 -1 1 -1 1 1 -1 -1 1 -1 -1 1 1 1 -1 -1 1 -1 1 1 -1 -1 1 1 -1 1 -1 -1 1 1 1 -1 -1 1 -1 1 -1 -1 1 -1 1 1 1 -1 -1 1 1 -1 1 -1 -1 1 -1 1 1 -1 1 -1 -1 1 -1 1 1 -1 -1 1 1 1 -1 -1 1 -1 -1 1 -1 1 1 1 -1 -1 1 -1 1 1 -1 1 -1 -1 1 -1 -1 1 -1 -1 1 -1 -1 1 1 -1 1 -1 -1 1 1 1 -1 1 -1 -1 1 1 1 -1 -1 1 -1 1 1 -1 -1 -1 1 1 1 -1 1 1 -1]. |

* * * * *